United States Patent
Ichiki

(10) Patent No.: US 12,484,330 B2
(45) Date of Patent: Nov. 25, 2025

(54) SOLID-STATE IMAGING DEVICE

(71) Applicant: SONY SEMICONDUCTOR SOLUTIONS CORPORATION, Kanagawa (JP)

(72) Inventor: Takejiro Ichiki, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 199 days.

(21) Appl. No.: 18/258,295

(22) PCT Filed: Dec. 16, 2021

(86) PCT No.: PCT/JP2021/046627
§ 371 (c)(1),
(2) Date: Jun. 19, 2023

(87) PCT Pub. No.: WO2022/138467
PCT Pub. Date: Jun. 30, 2022

(65) Prior Publication Data
US 2024/0055460 A1 Feb. 15, 2024

(30) Foreign Application Priority Data
Dec. 25, 2020 (JP) ................. 2020-217951

(51) Int. Cl.
*H10F 39/00* (2025.01)
*H04N 25/77* (2023.01)
*H10F 39/18* (2025.01)

(52) U.S. Cl.
CPC .......... *H10F 39/809* (2025.01); *H04N 25/77* (2023.01); *H10F 39/18* (2025.01);
(Continued)

(58) Field of Classification Search
CPC .... H10F 39/809; H10F 39/18; H10F 39/8037; H10F 39/807; H10F 39/811; H10F 39/12;
(Continued)

(56) References Cited

U.S. PATENT DOCUMENTS

| 2005/0205902 A1* | 9/2005 | Hara | H10F 39/813 |
| | | | 257/E27.134 |
| 2015/0179691 A1* | 6/2015 | Yanagita | H10F 39/018 |
| | | | 257/292 |

(Continued)

FOREIGN PATENT DOCUMENTS

| JP | 2010-245506 A | 10/2010 |
| JP | 2018-022905 A | 2/2018 |

(Continued)

OTHER PUBLICATIONS

International Search Report and Written Opinion of PCT Application No. PCT/JP2021/046627, issued on Mar. 15, 2022, 09 pages of ISRWO.

*Primary Examiner* — Albert H Cutler
(74) *Attorney, Agent, or Firm* — CHIP LAW GROUP

(57) ABSTRACT

Provided is a solid-state imaging device that includes a first semiconductor layer and a second semiconductor layer. The first semiconductor layer includes a photoelectric conversion section and an electric charge accumulation section for each of pixels. The electric charge accumulation section accumulates signal charge generated in the photoelectric conversion section. The second semiconductor layer includes a pixel transistor that reads out the signal charge of the electric charge accumulation section. This solid-state imaging device includes a pixel separation section and a shared coupling section. The pixel separation section is provided in the first semiconductor layer. The pixel separation section partitions a plurality of the pixels from each other. The shared coupling section is provided between the (Continued)

second semiconductor layer and the first semiconductor layer. The shared coupling section is provided across the pixel separation section.

8 Claims, 30 Drawing Sheets

(52) U.S. Cl.
CPC ....... *H10F 39/8037* (2025.01); *H10F 39/807* (2025.01); *H10F 39/811* (2025.01)

(58) Field of Classification Search
CPC ..... H10F 39/199; H10F 39/813; H04N 25/77; H10D 84/00; H10D 84/0126; H10D 84/038; H10D 99/00
See application file for complete search history.

(56) References Cited

U.S. PATENT DOCUMENTS

| | | |
|---|---|---|
| 2018/0190694 A1 | 7/2018 | Ihara |
| 2021/0335862 A1* | 10/2021 | Lee ....................... H10F 39/807 |

FOREIGN PATENT DOCUMENTS

| | | |
|---|---|---|
| WO | WO-2019220810 A1 | 11/2019 |
| WO | WO-2019220945 A1 | 11/2019 |
| WO | 2020/059702 A1 | 3/2020 |
| WO | 2020/105713 A1 | 5/2020 |

* cited by examiner

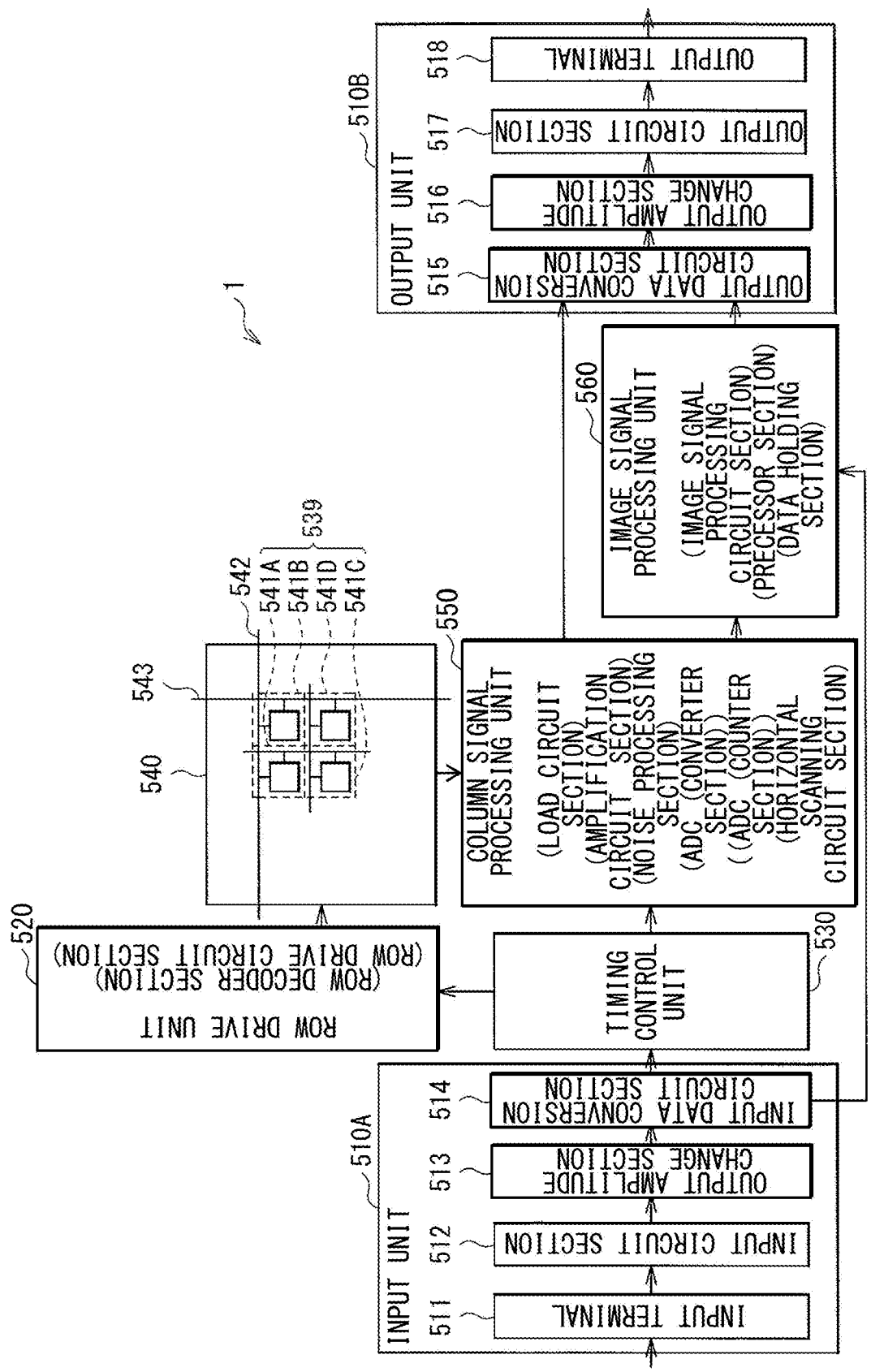
[FIG. 1]

[FIG. 2]
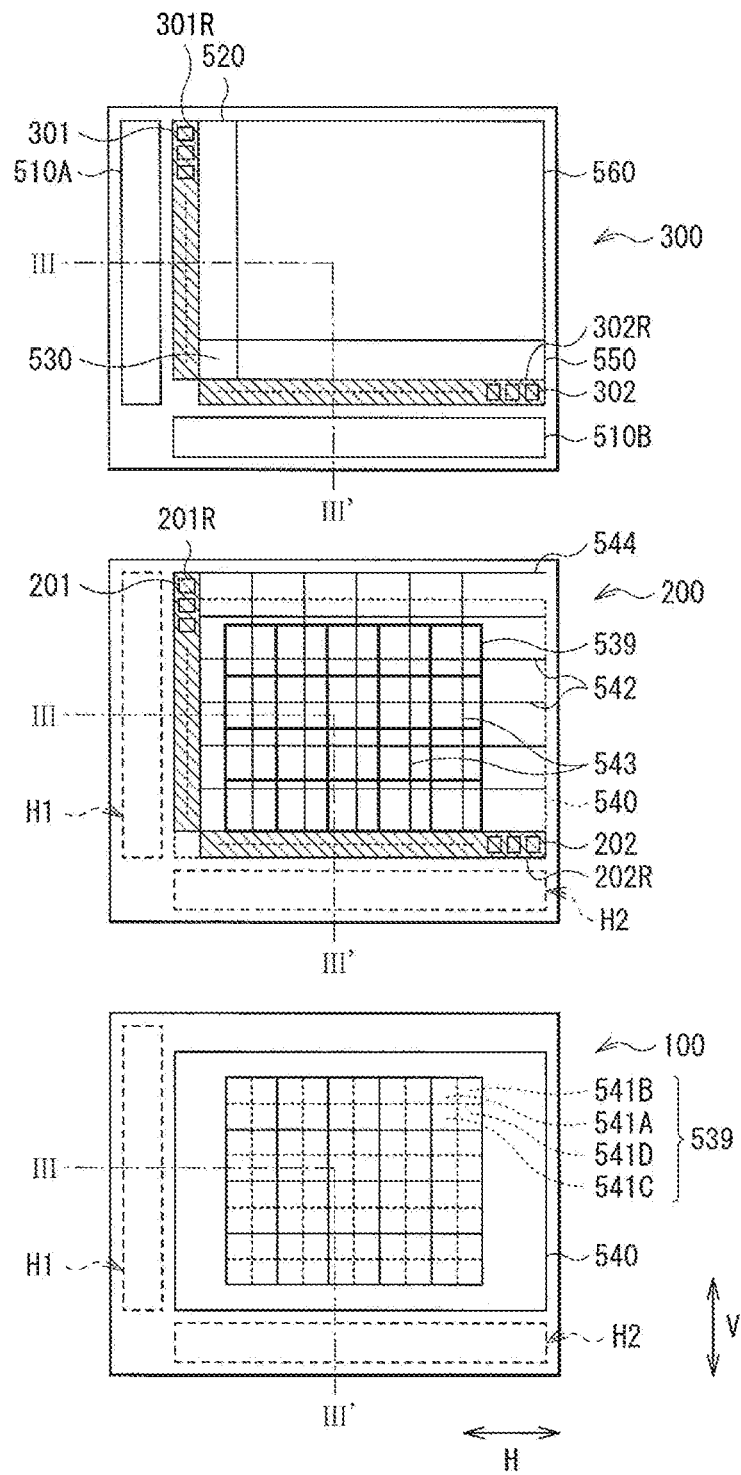

[FIG. 3]
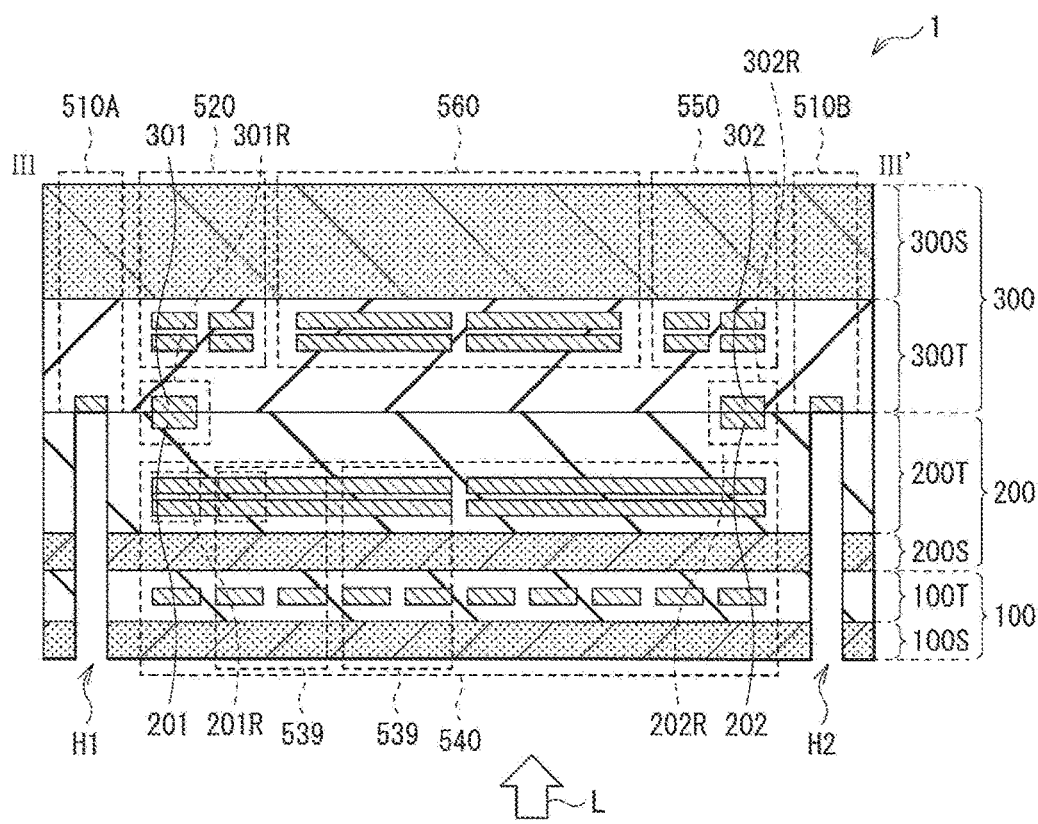

[FIG. 4]
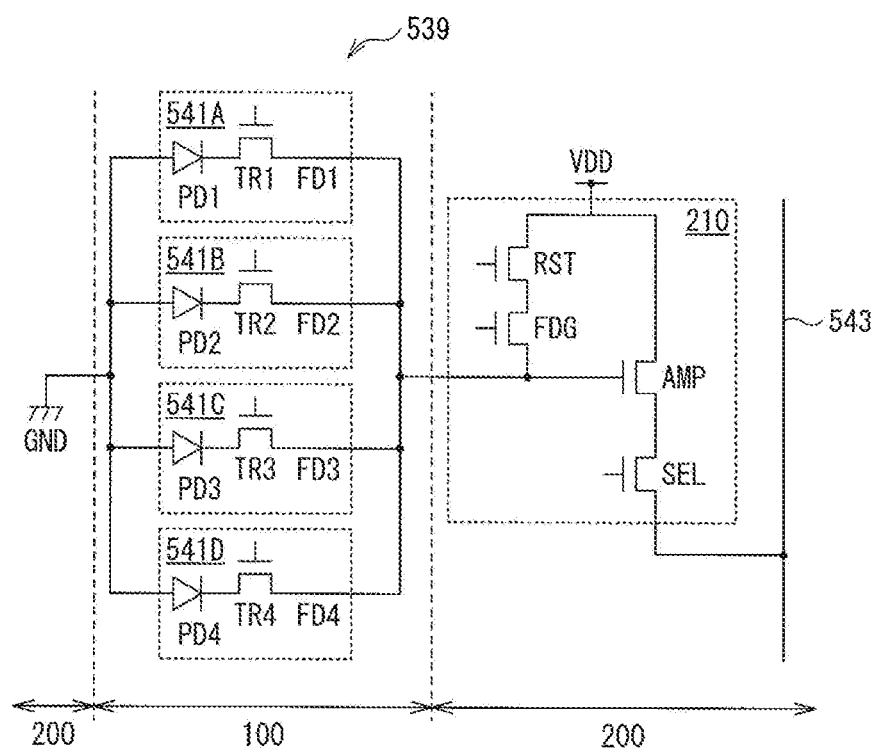

[FIG. 5]
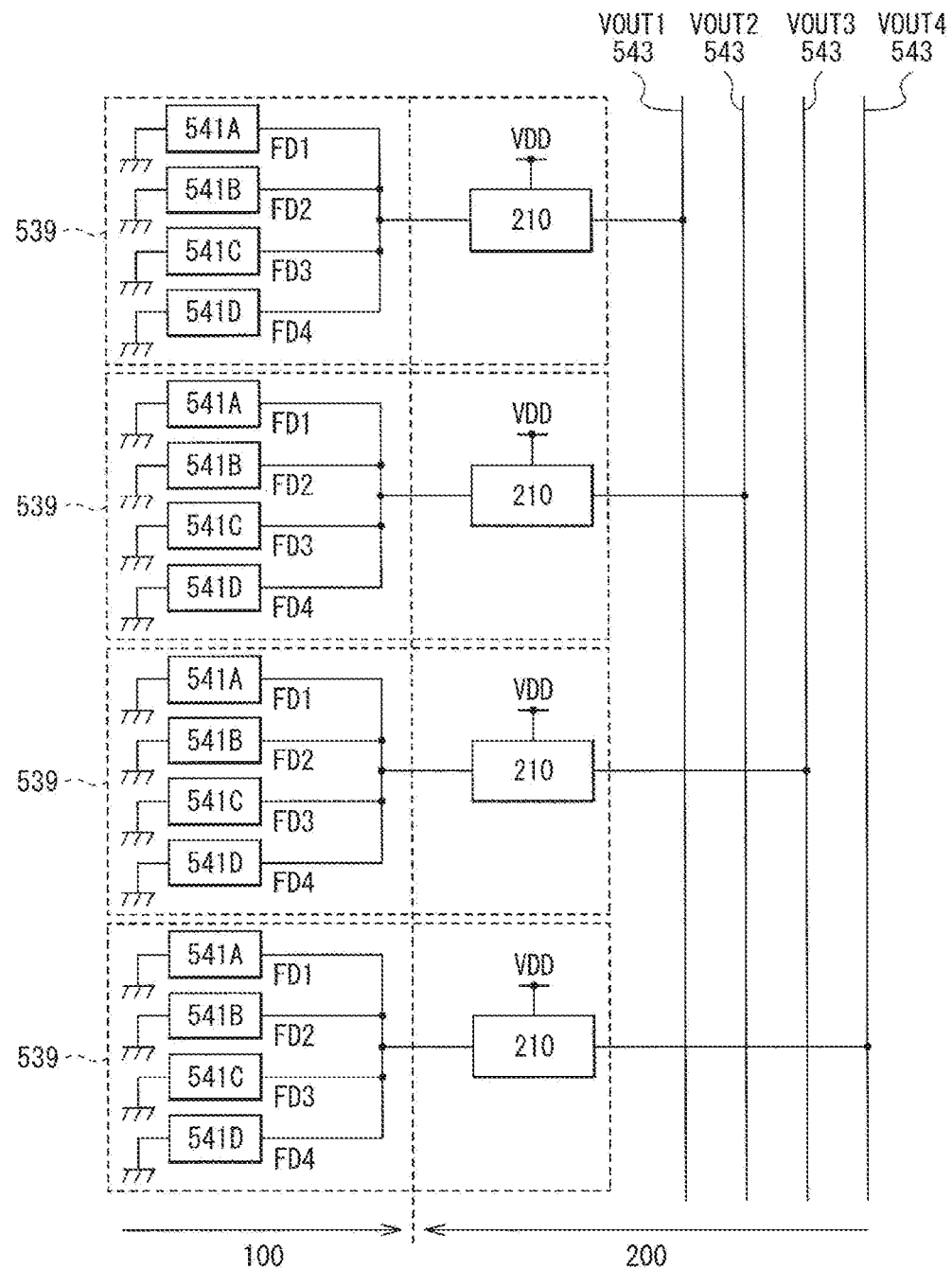

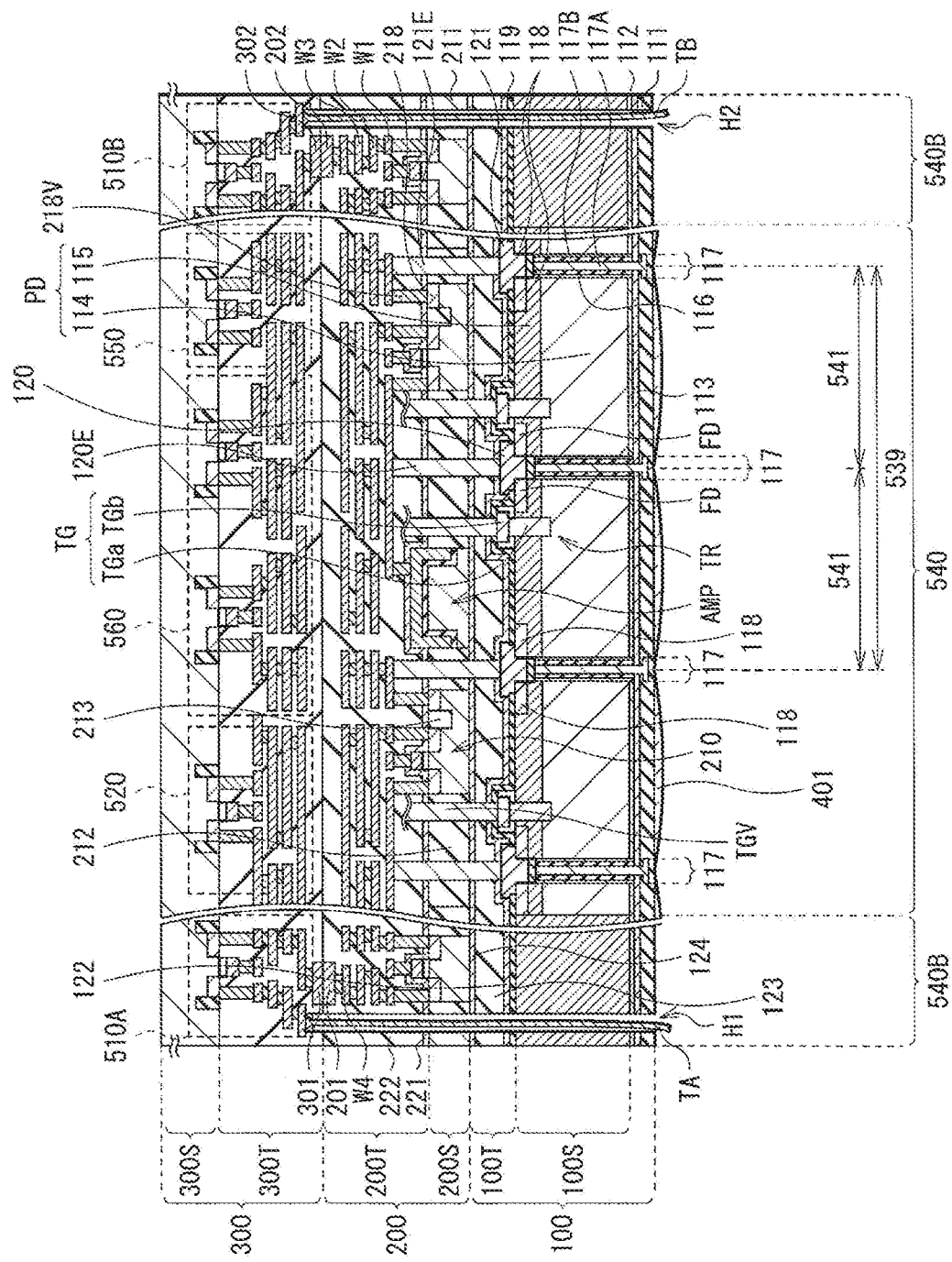
[FIG. 6]

[FIG. 7A]
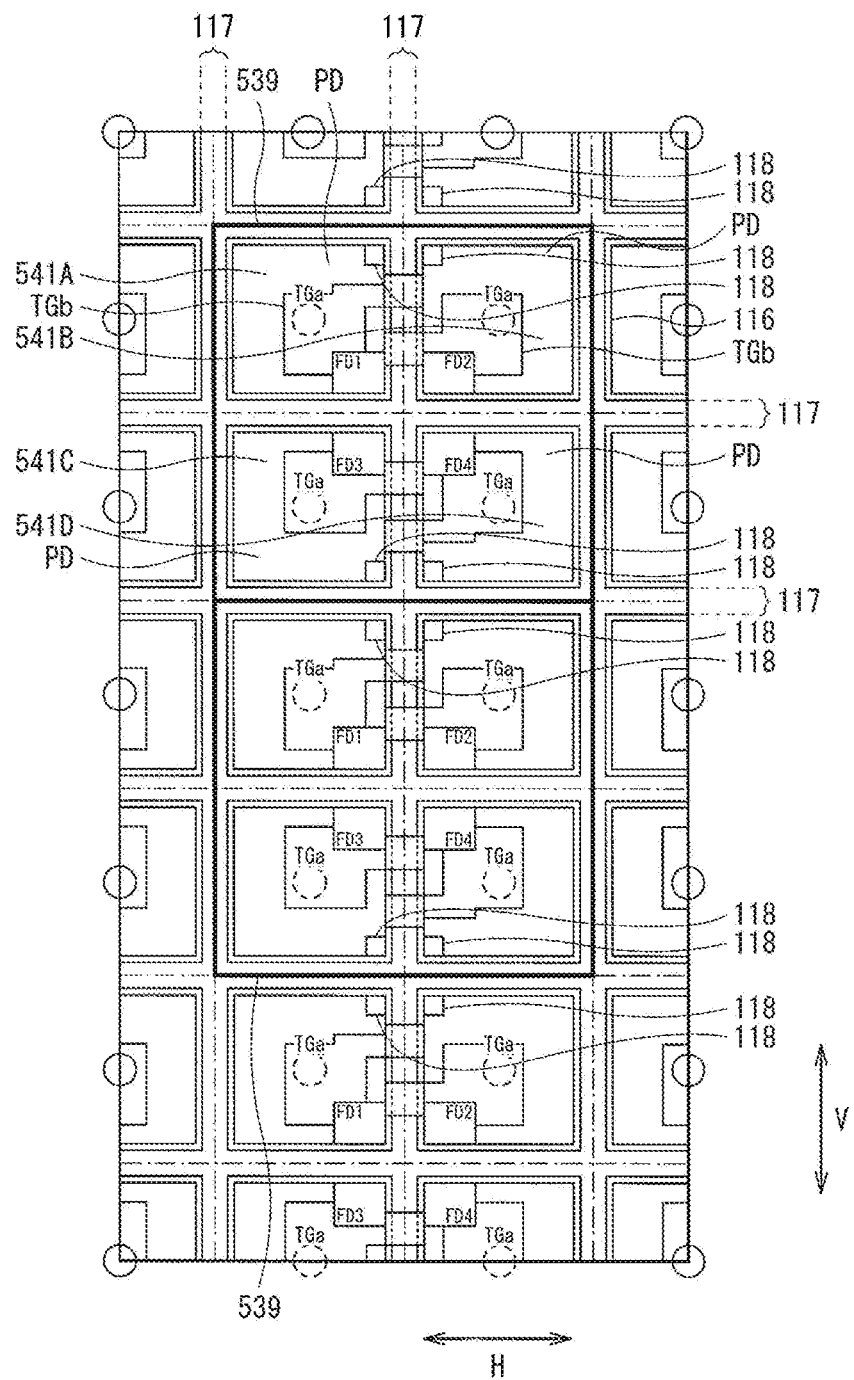

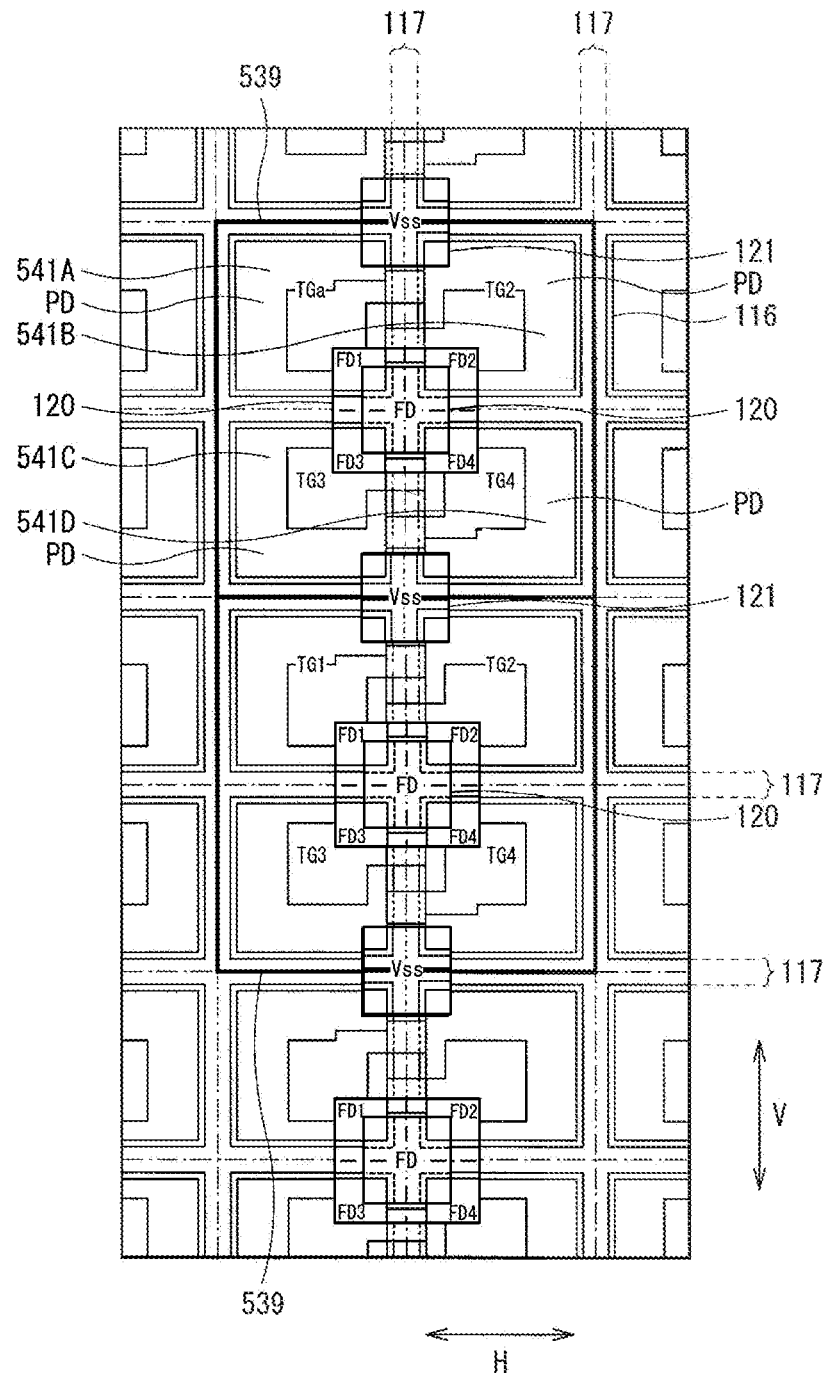
[FIG. 7B]

[FIG. 8A]
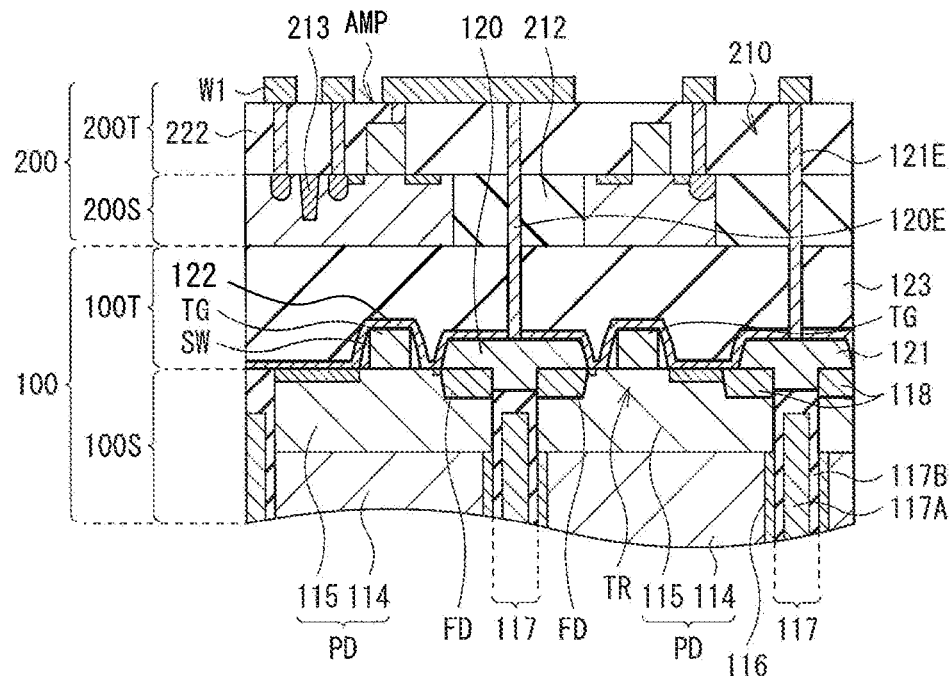
[FIG. 8B]
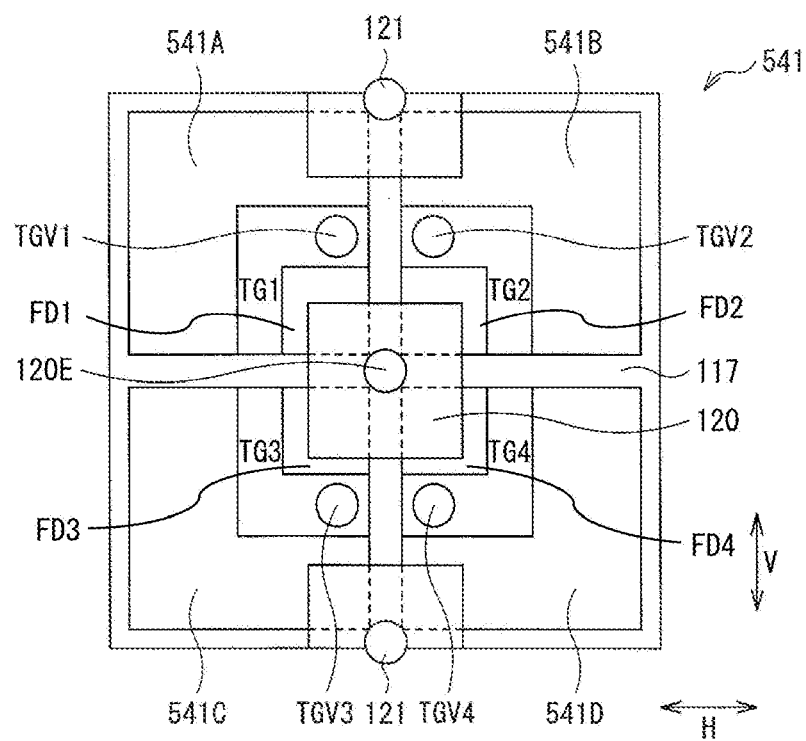

[FIG. 9]
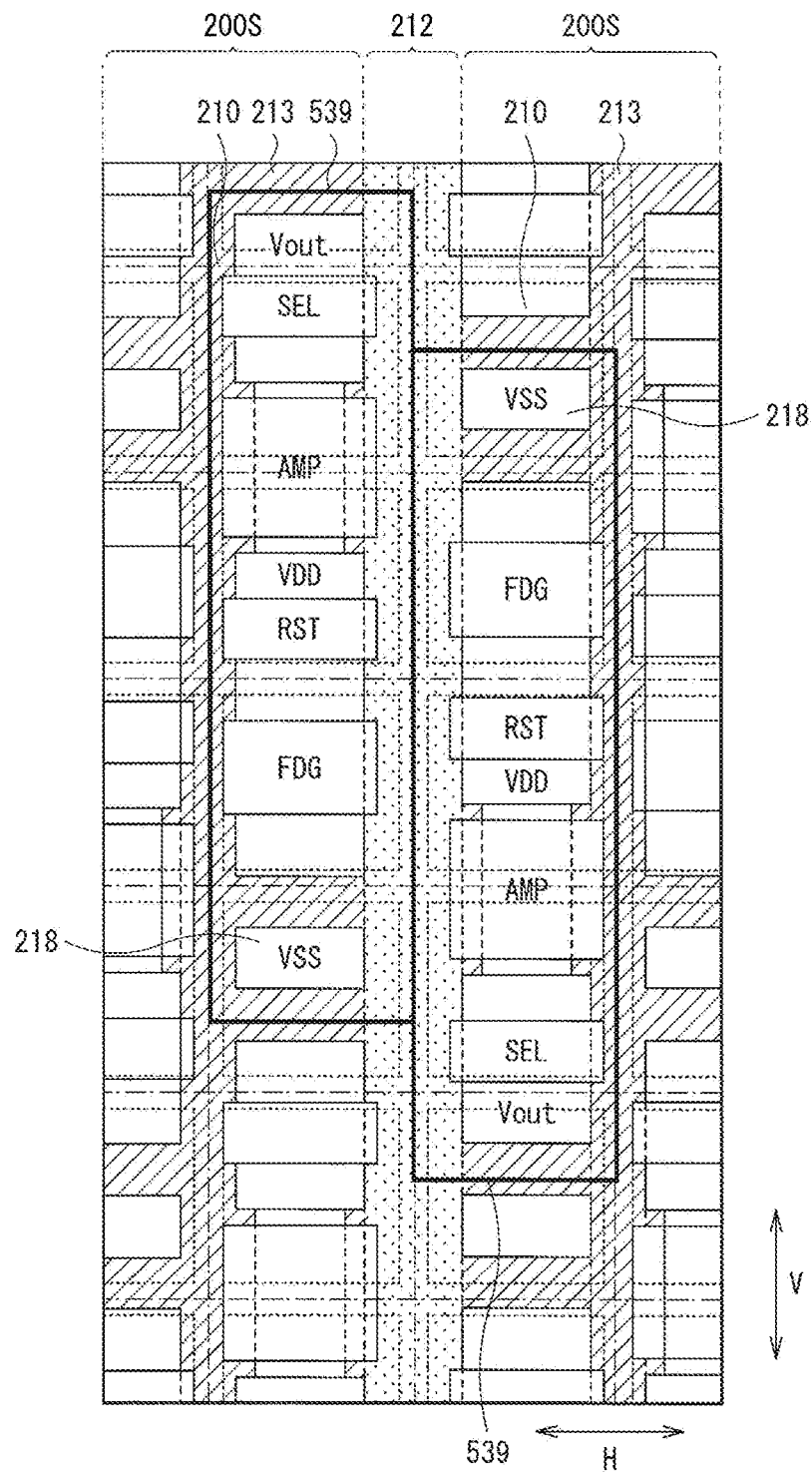

[FIG. 10]
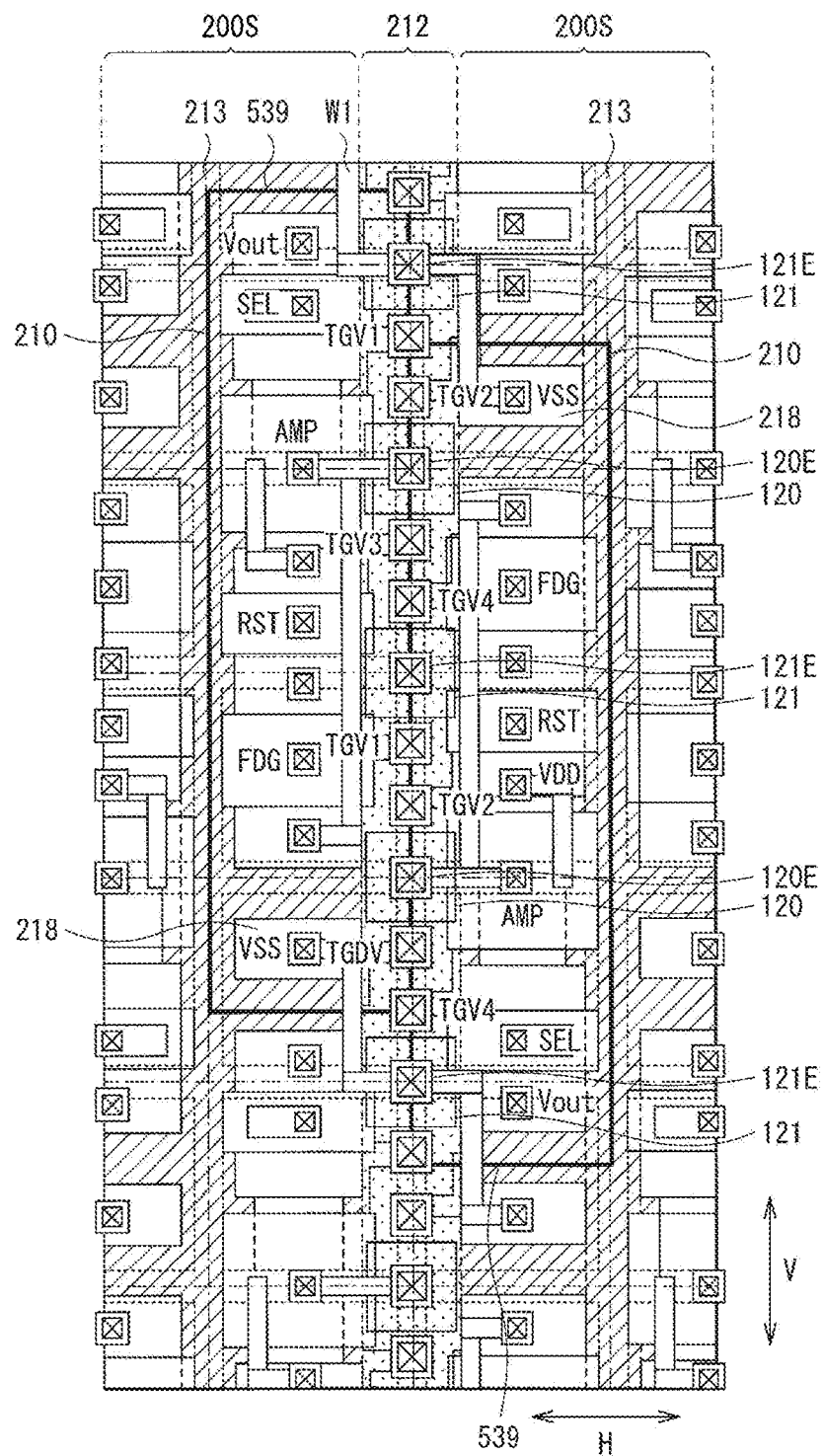

[FIG. 11]
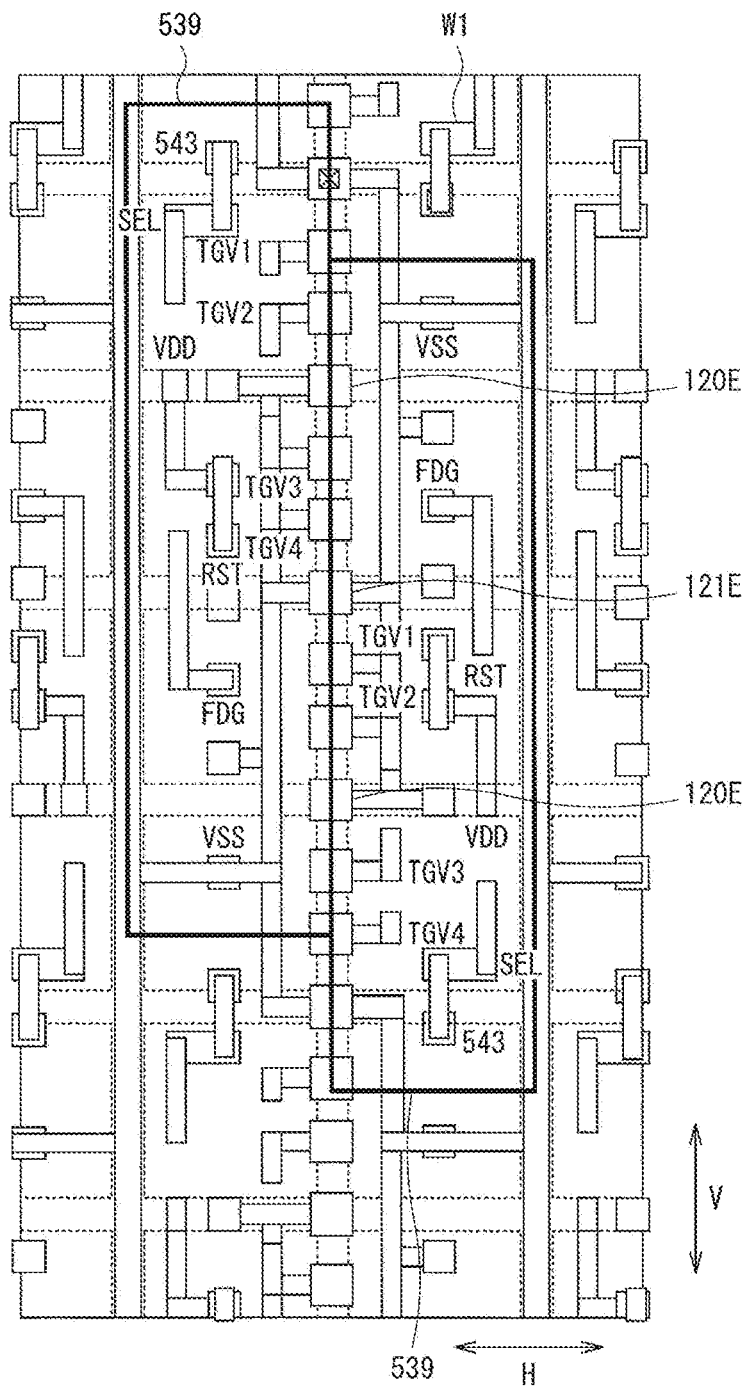

[FIG. 12]
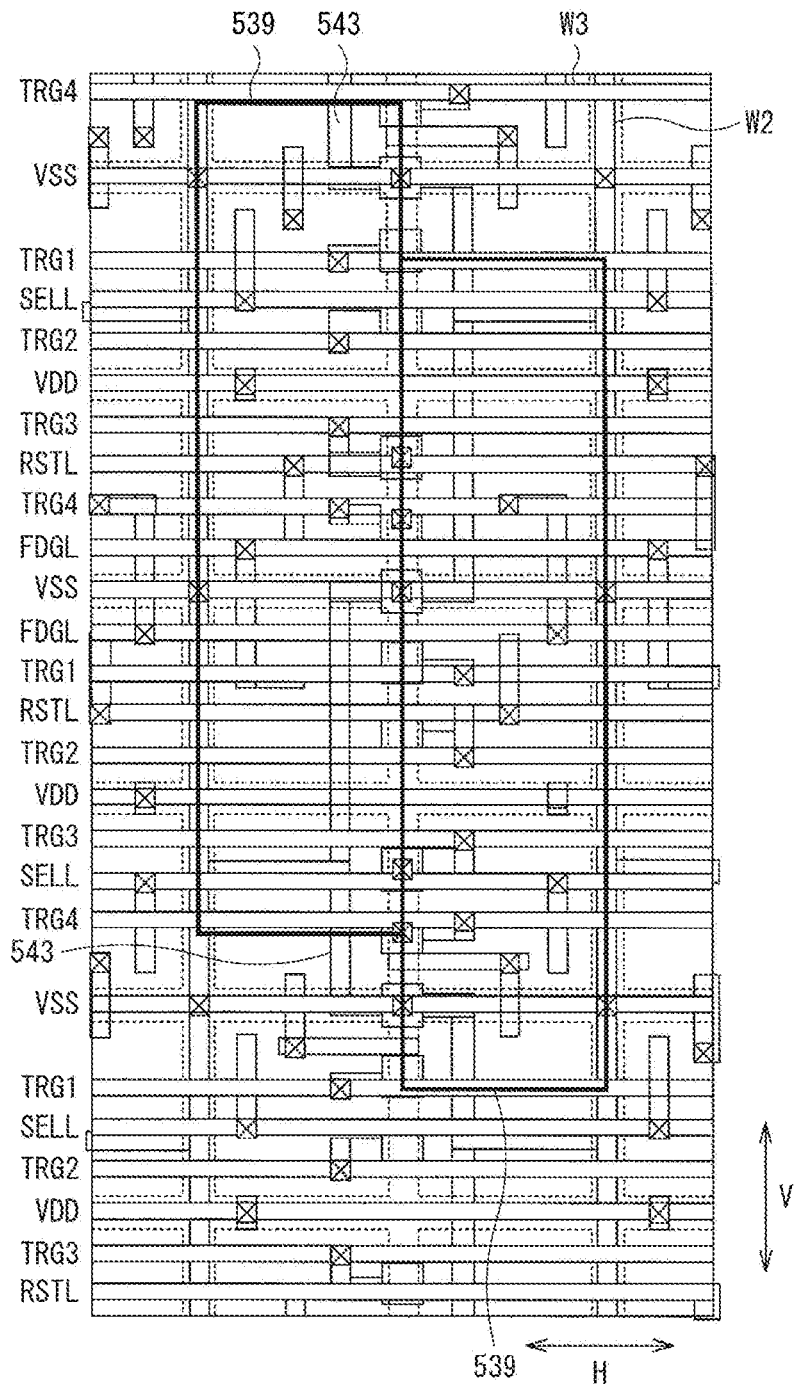

[FIG. 13]
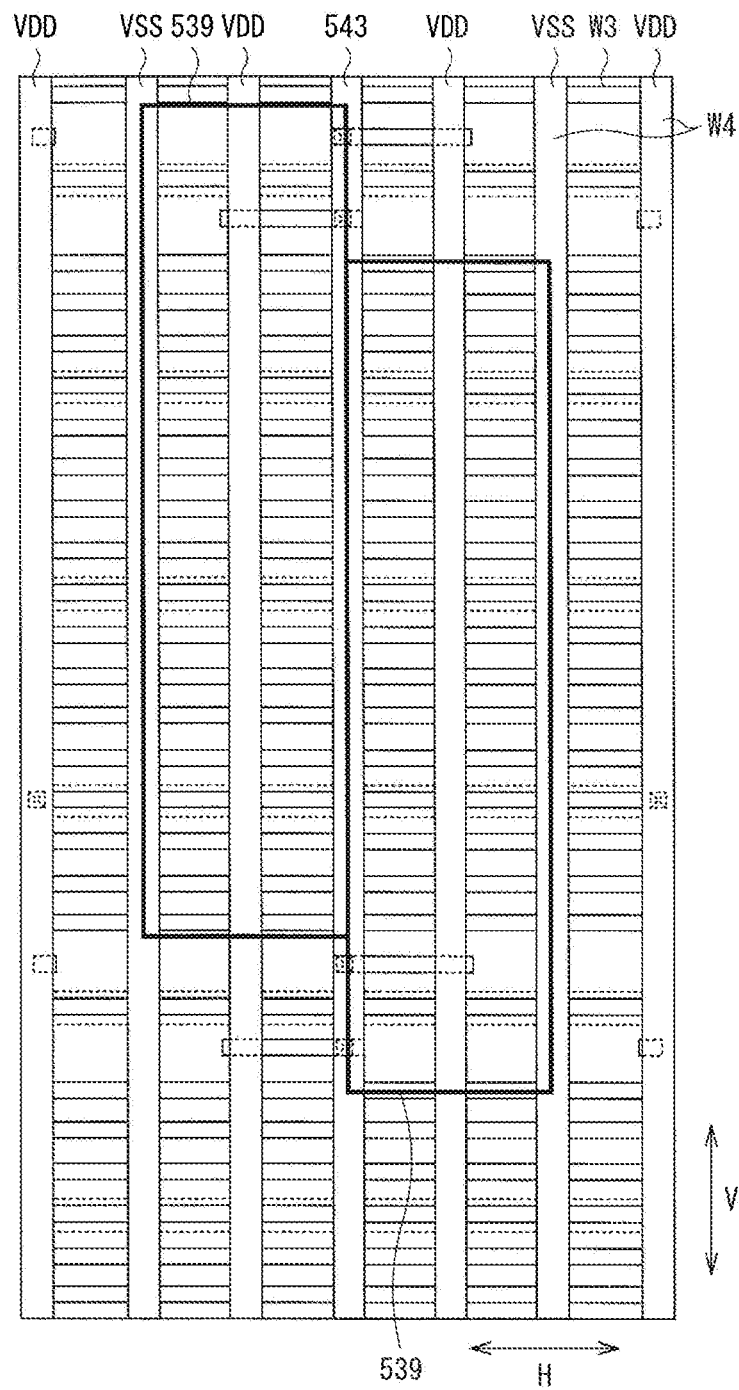

[FIG. 14]
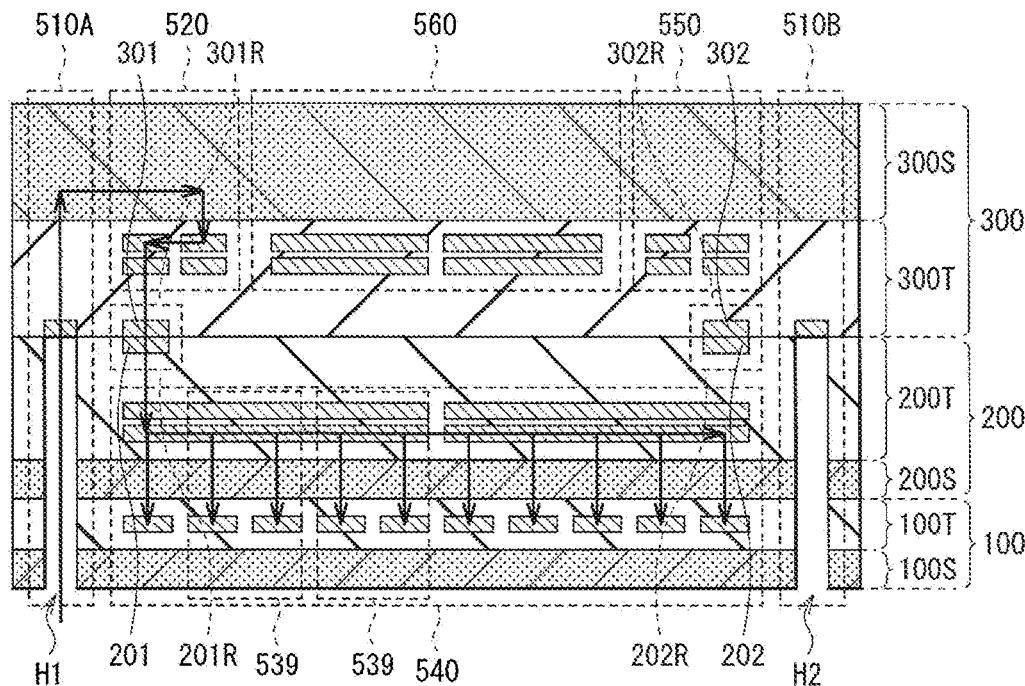
[FIG. 15]
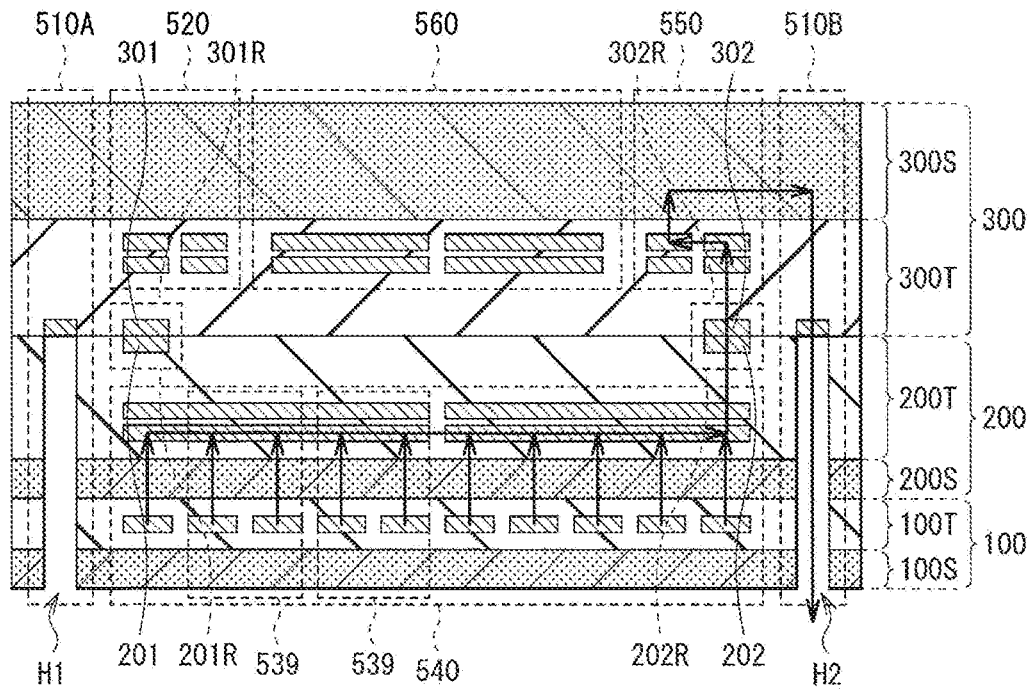

[FIG. 16]
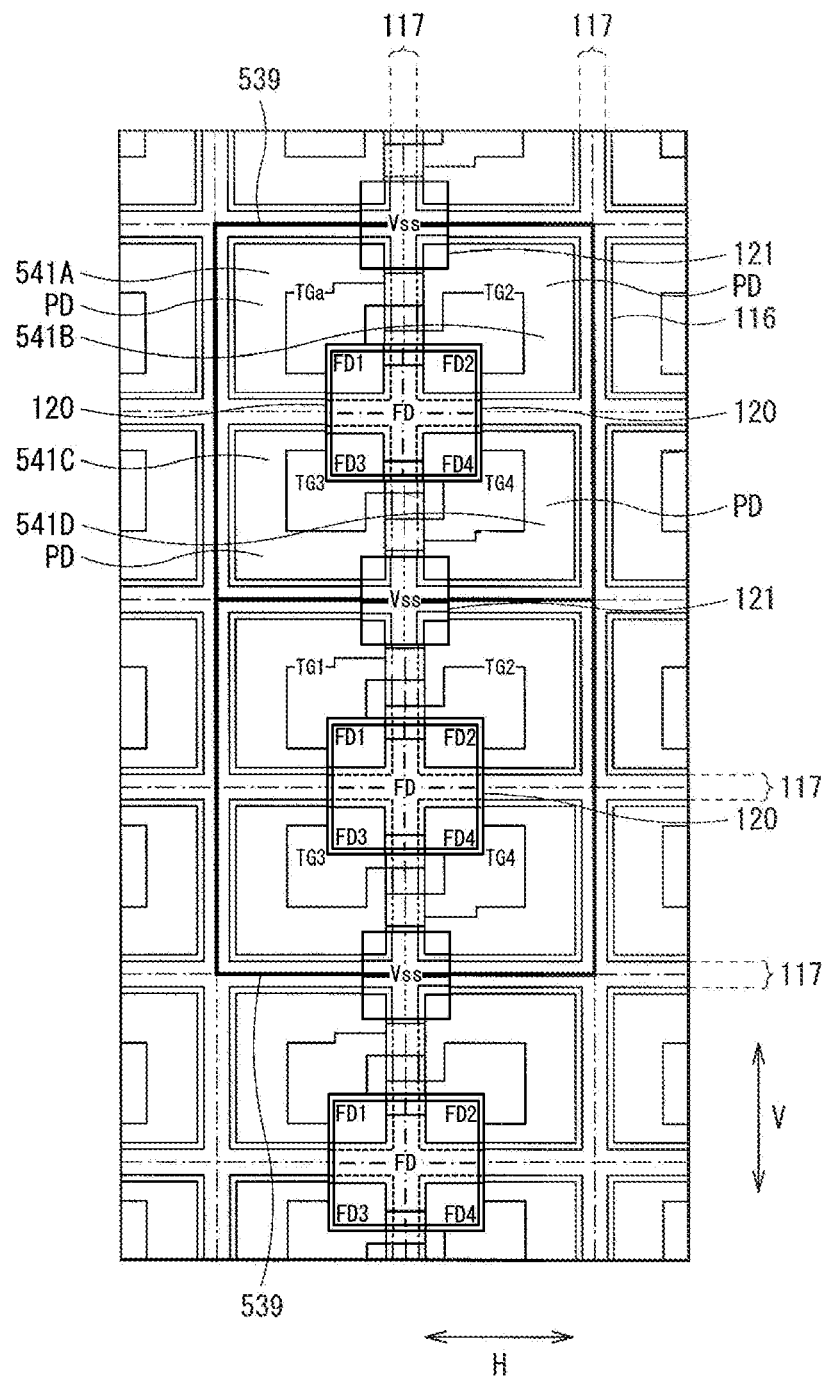

[FIG. 17]
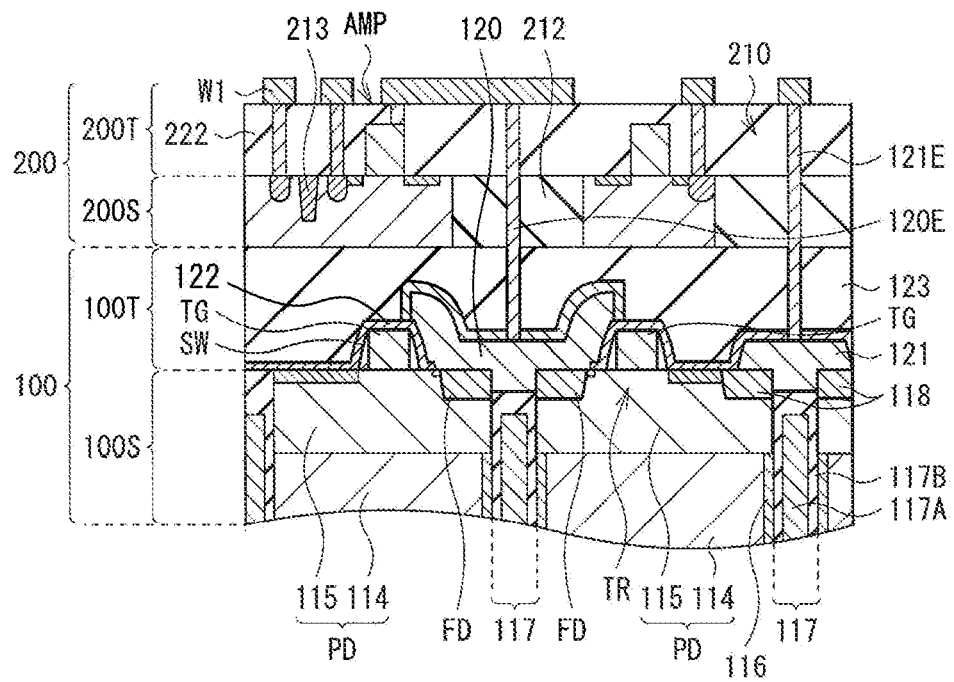
[FIG. 18]
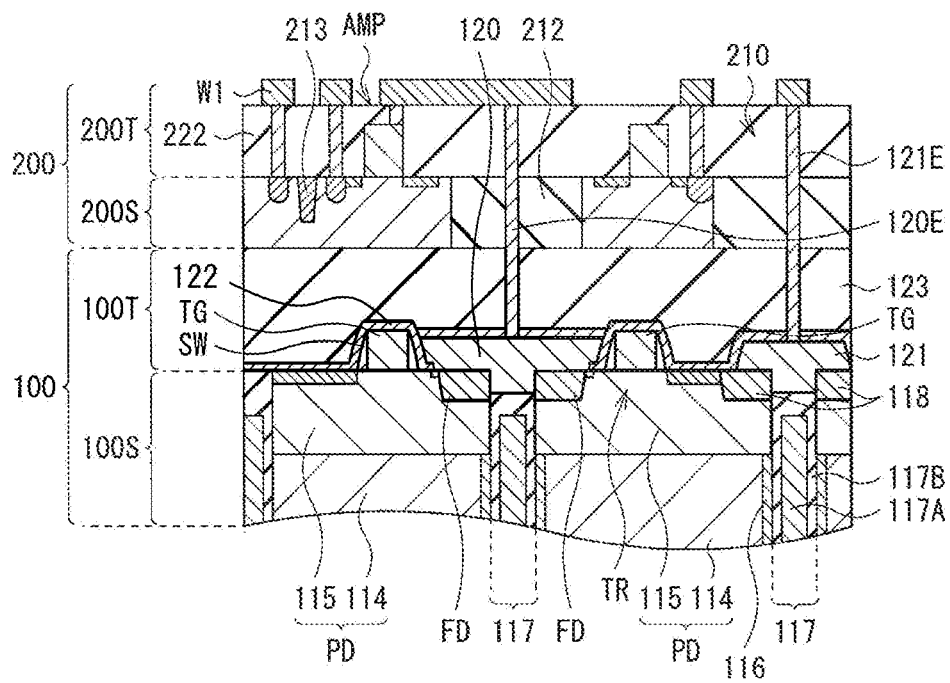

[FIG. 19]
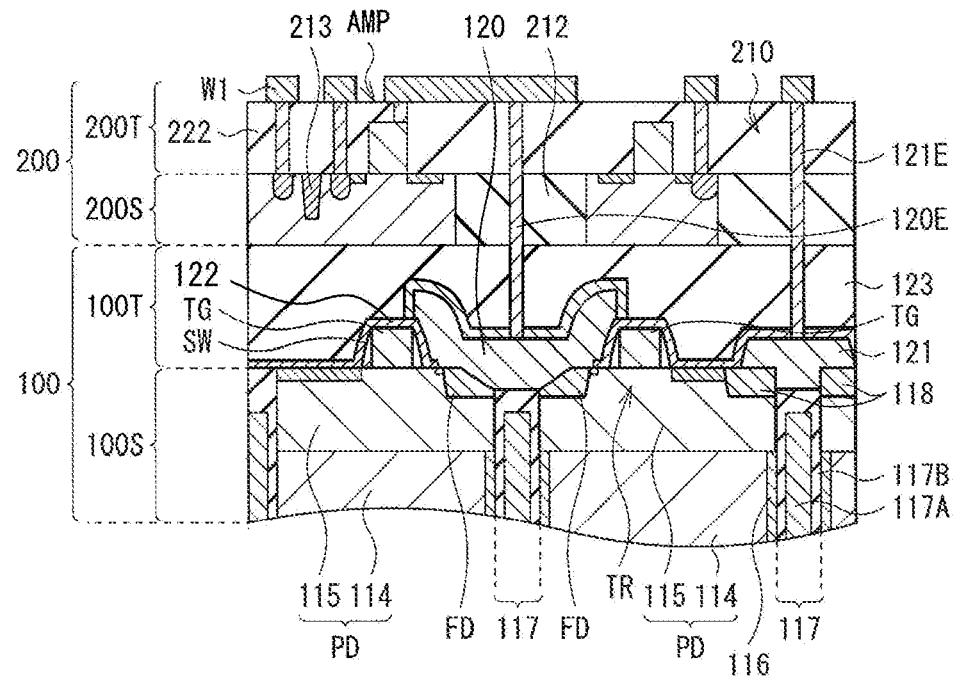
[FIG. 20]
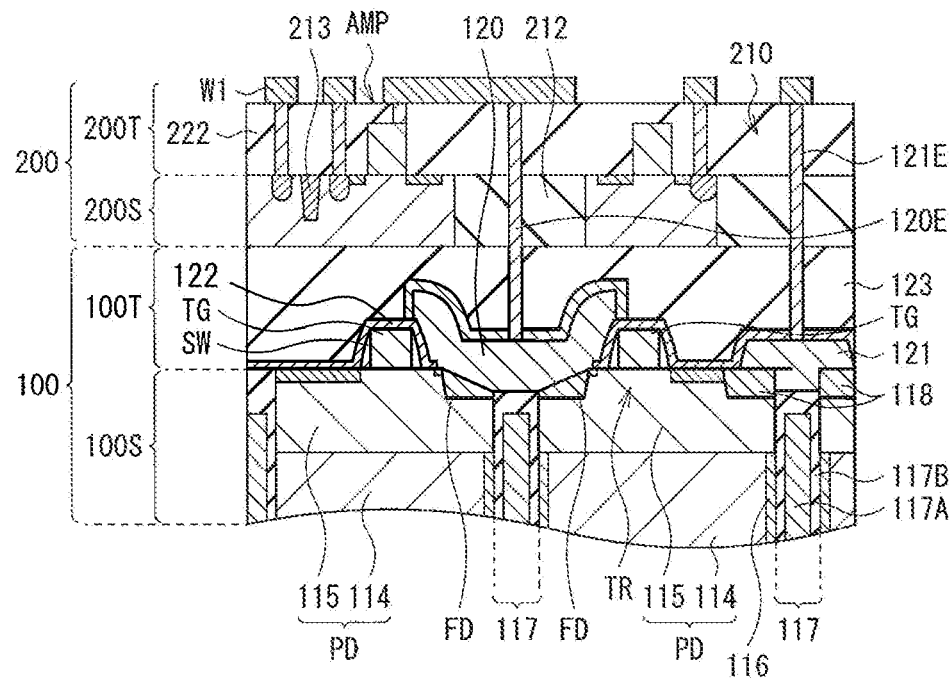

[FIG. 21]
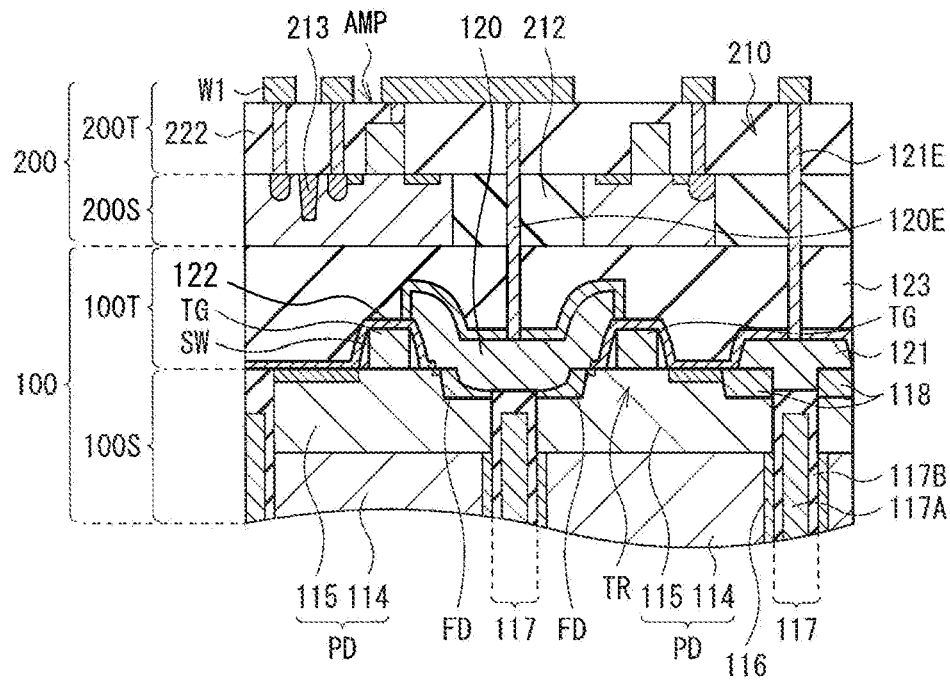
[FIG. 22]
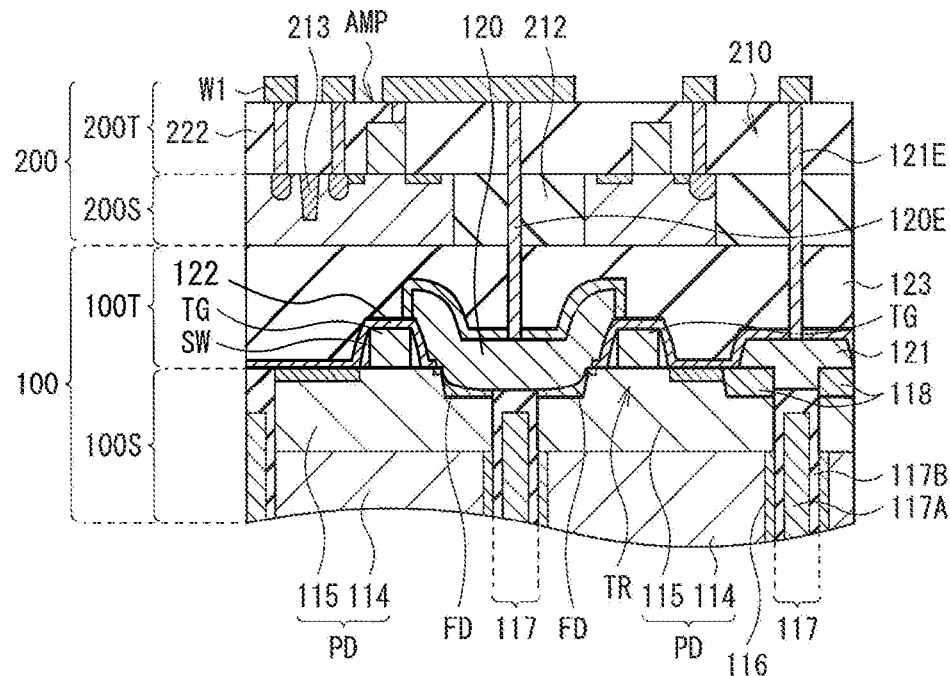

[FIG. 23]
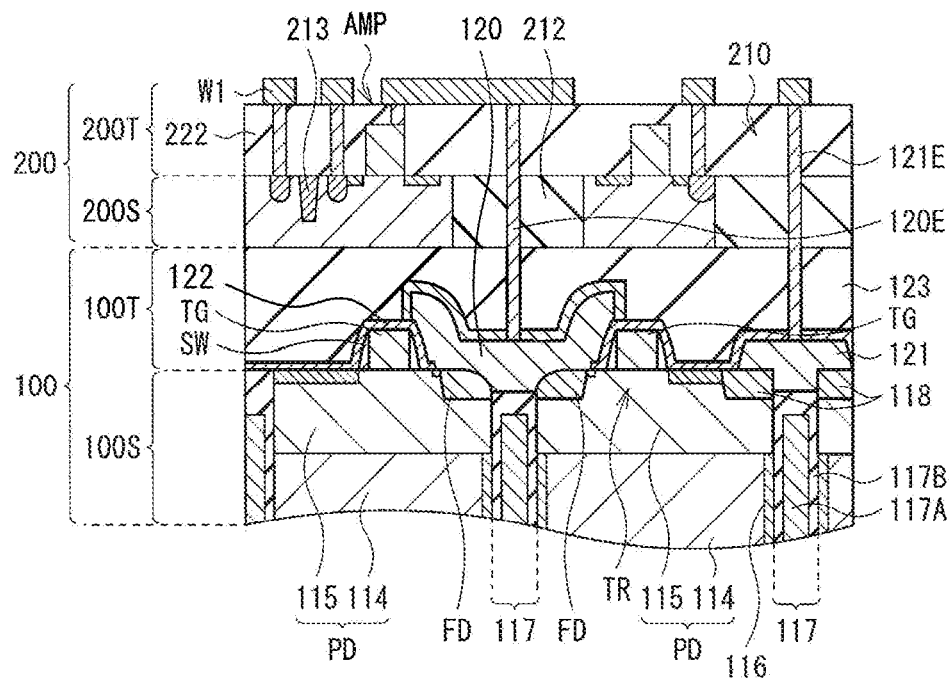
[FIG. 24]
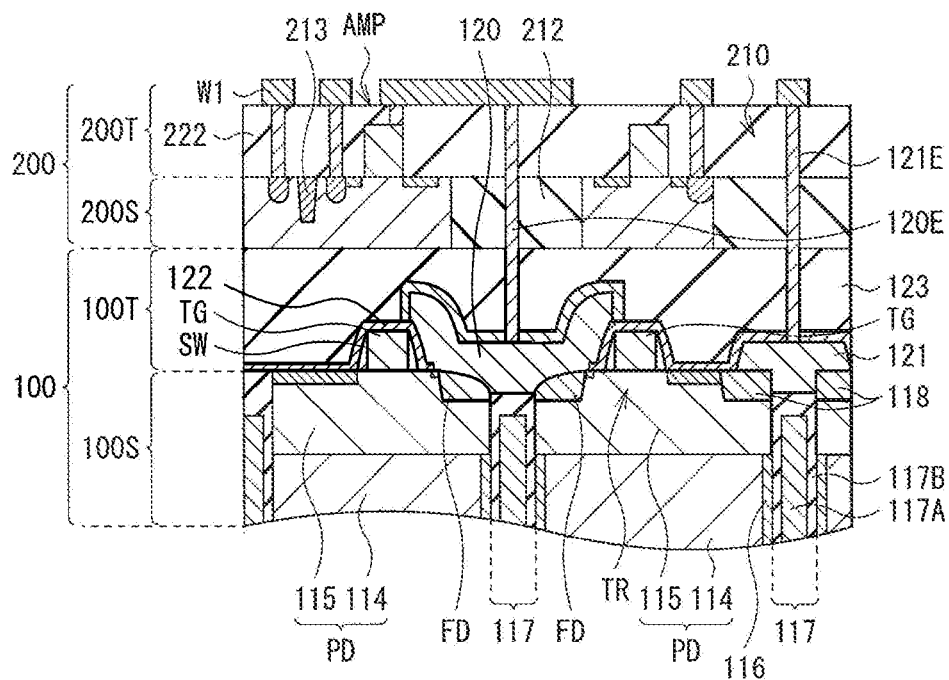

[FIG. 25]
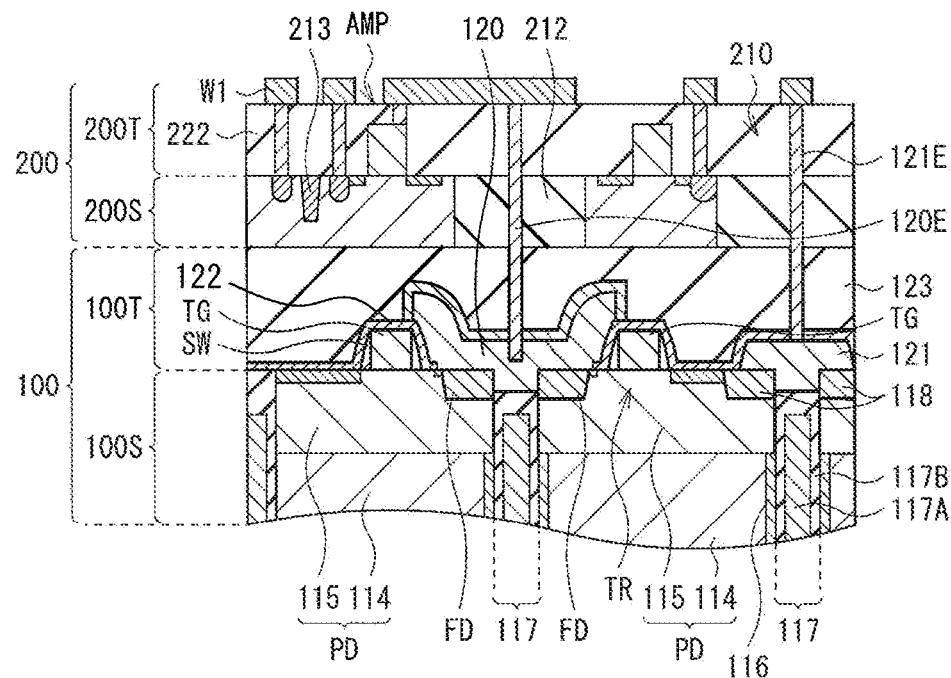
[FIG. 26]
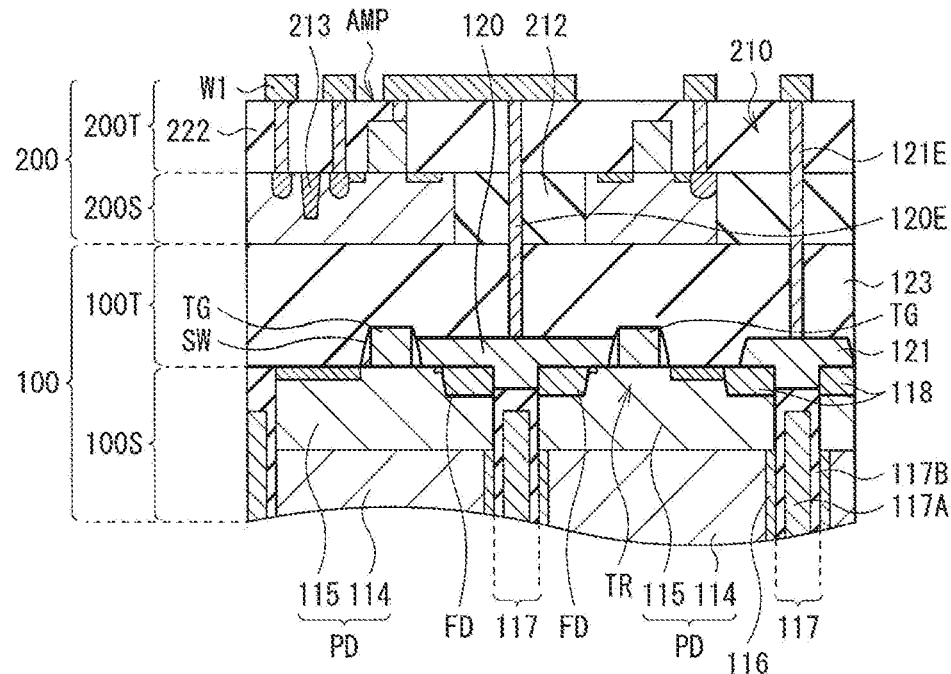

[FIG. 27]
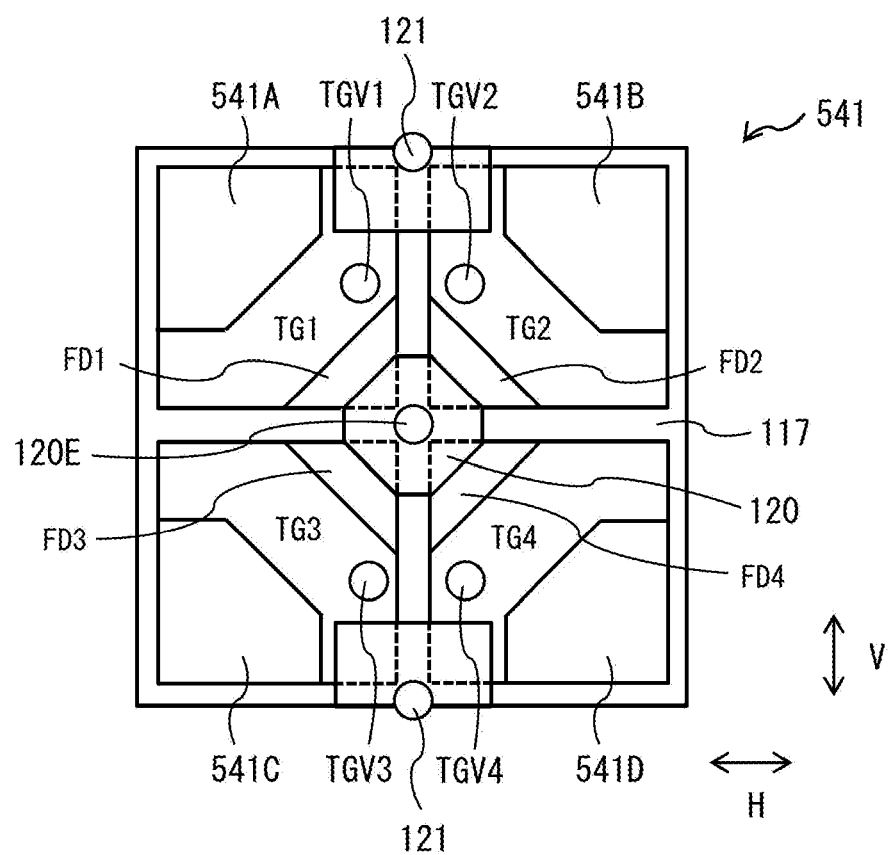

[FIG. 28]
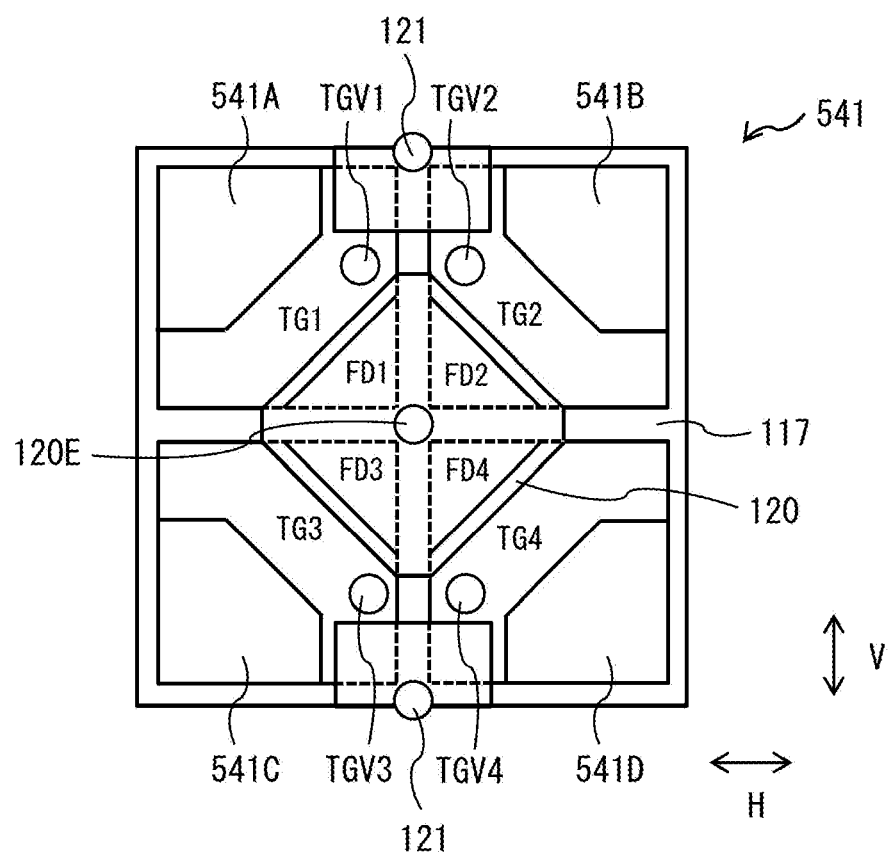

[FIG. 29]
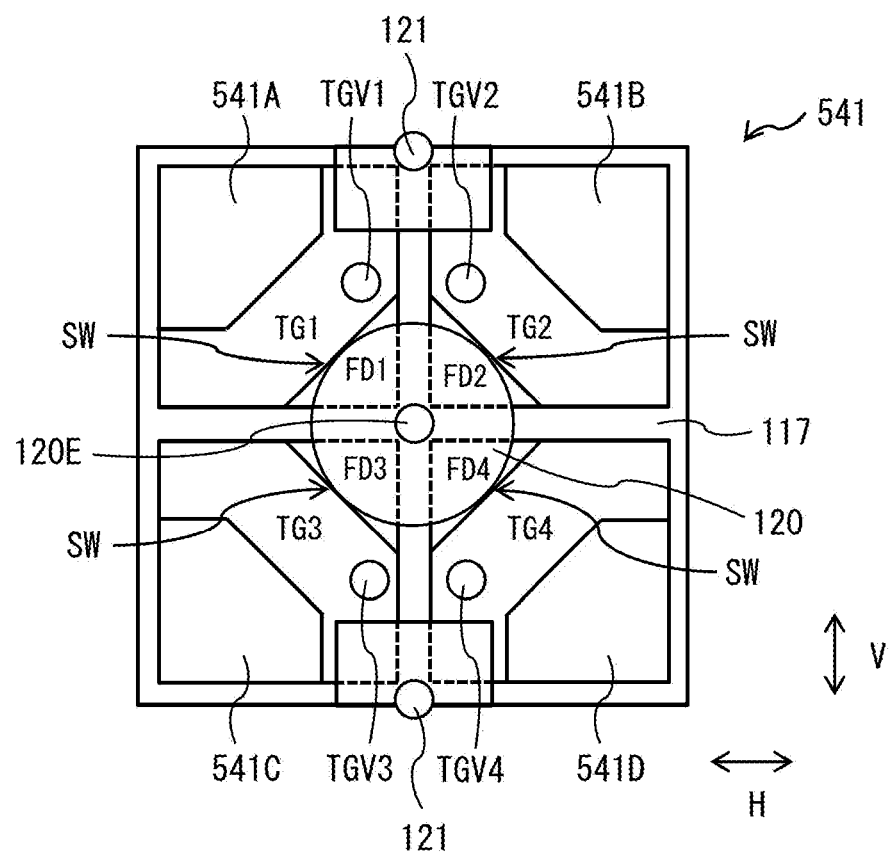

[FIG. 30]
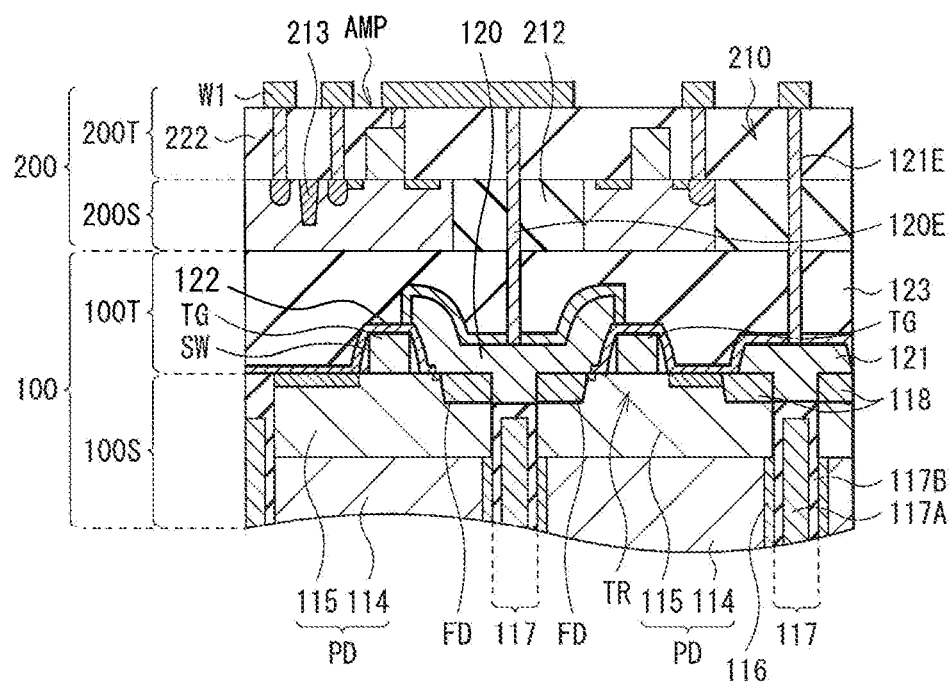

[FIG. 31]
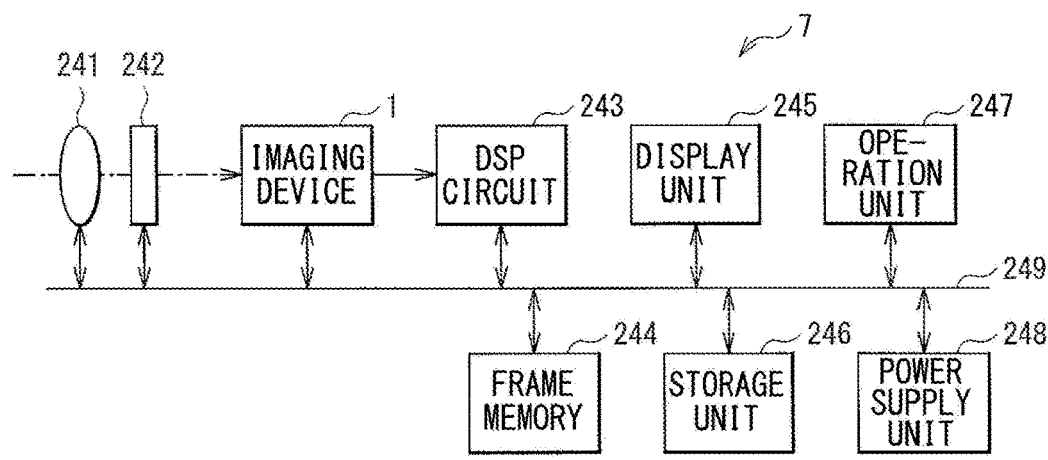
[FIG. 32]
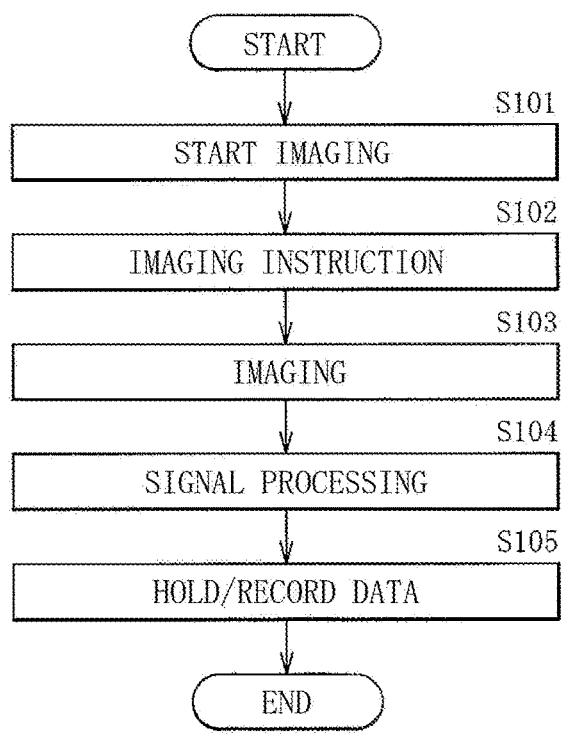

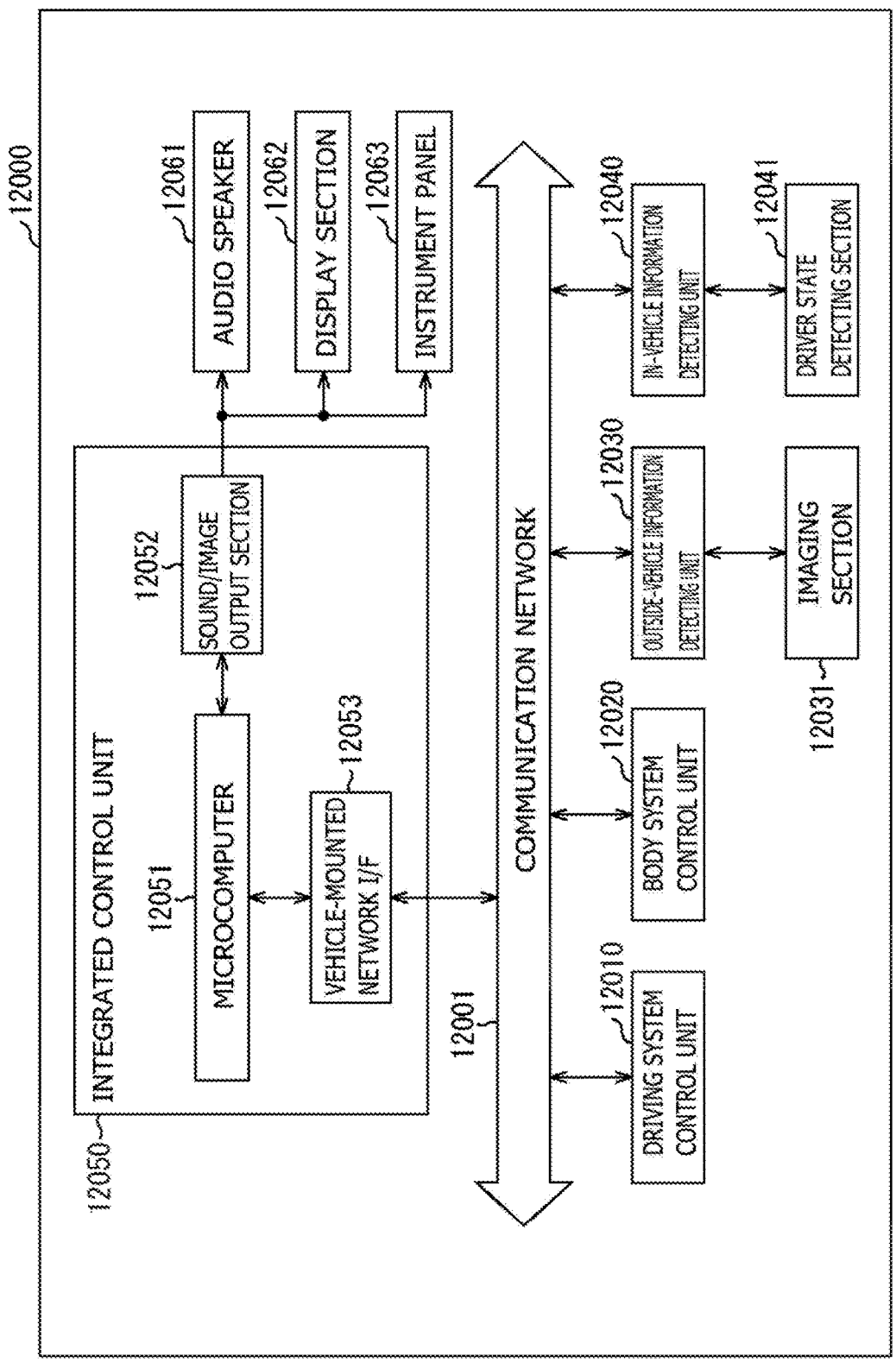
[FIG. 33]

[FIG. 34]
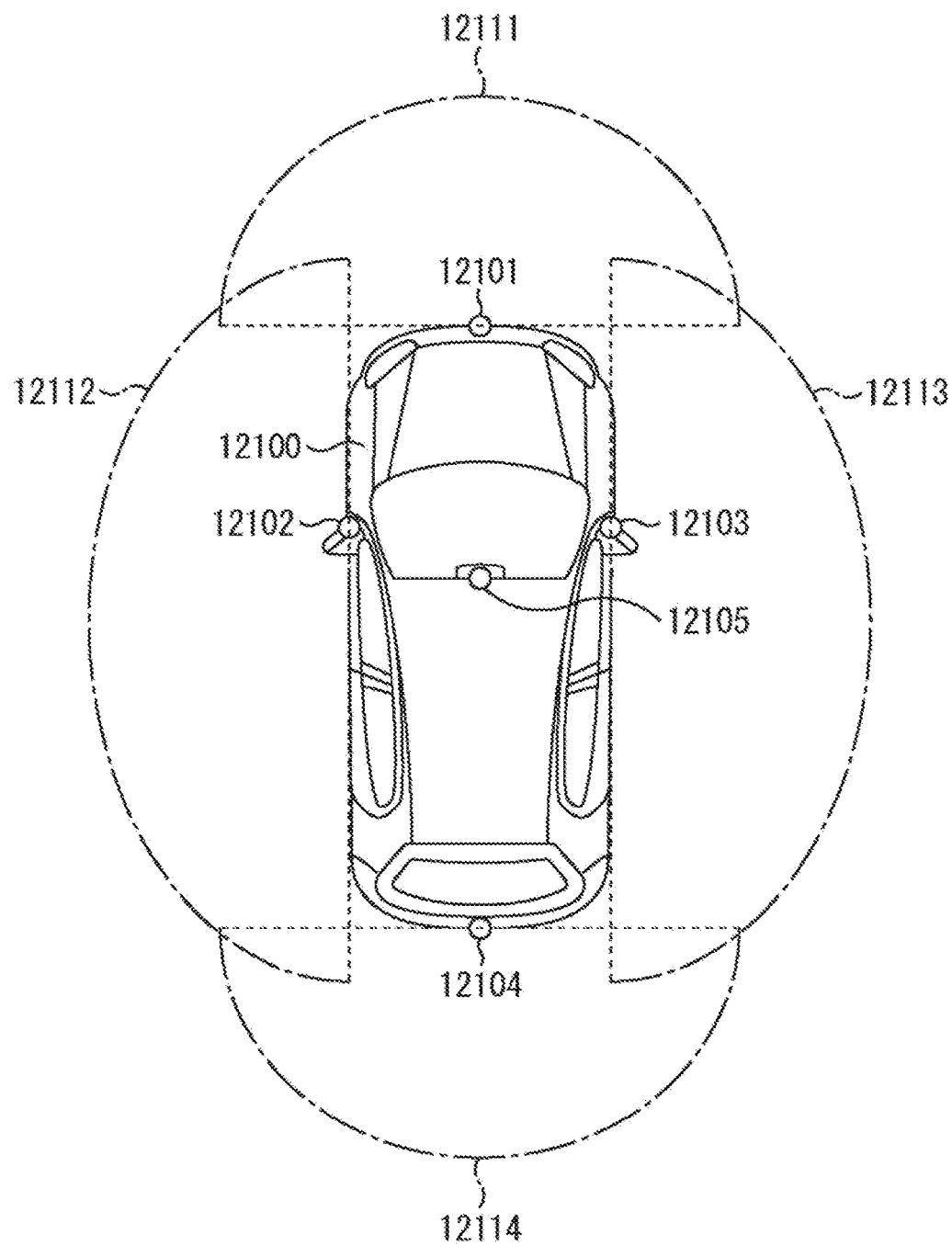

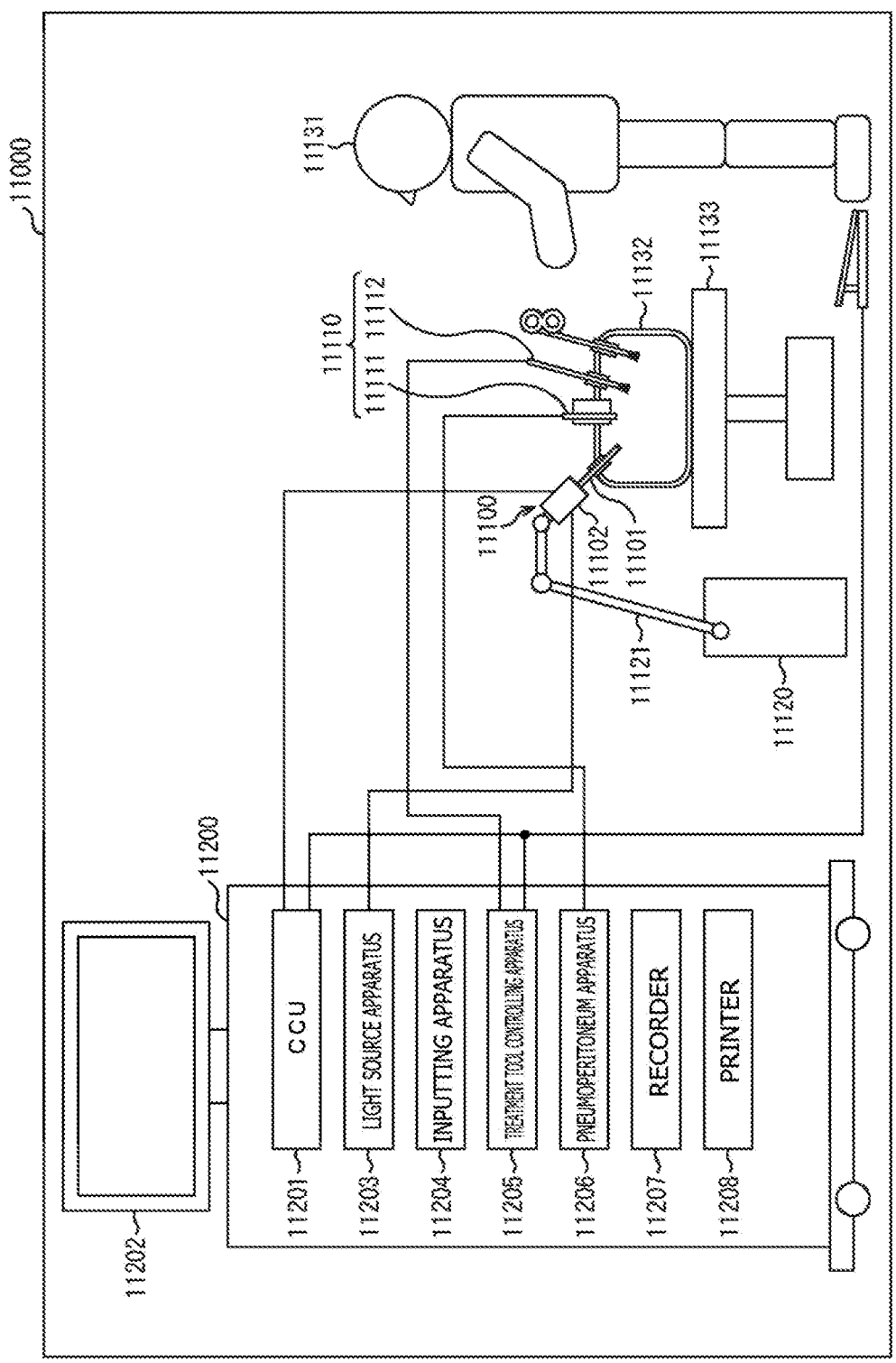
[FIG. 35]

[FIG. 36]
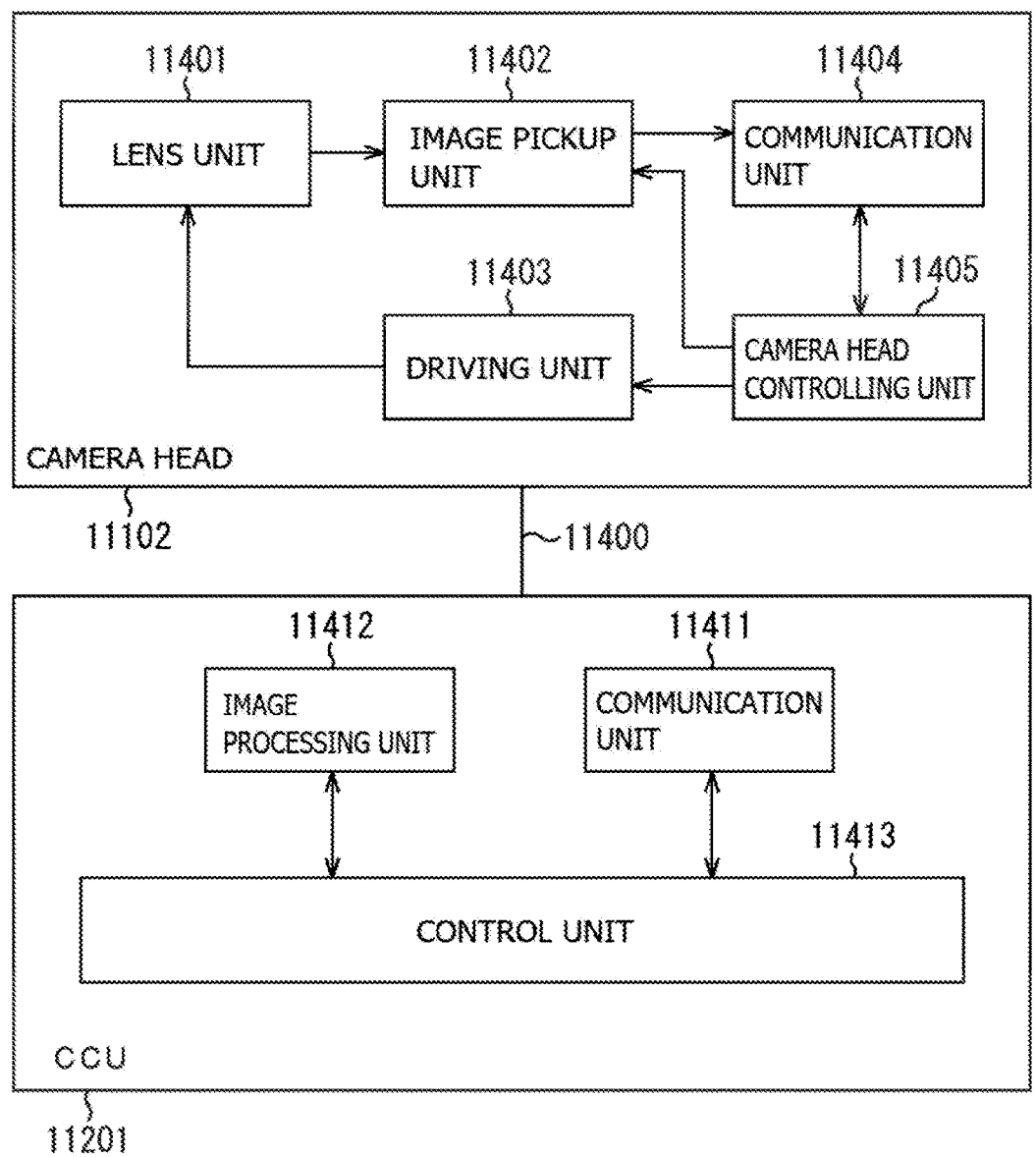

SOLID-STATE IMAGING DEVICE

CROSS REFERENCE TO RELATED APPLICATIONS

This application is a U.S. National Phase of International Patent Application No. PCT/JP2021/046627 filed on Dec. 16, 2021, which claims priority benefit of Japanese Patent Application No. JP 2020-217951 filed in the Japan Patent Office on Dec. 25, 2020. Each of the above-referenced applications is hereby incorporated herein by reference in its entirety.

TECHNICAL FIELD

The present disclosure relates to a solid-state imaging device including a plurality of semiconductor layers that is stacked.

BACKGROUND ART

In recent years, solid-state imaging devices have seen development in MOS image sensors such as CMOS (Complementary Metal Oxide Semiconductor) image sensors. For example, PTL 1 proposes a solid-state imaging device in which a semiconductor wafer including a pixel array unit and a semiconductor wafer including a logic circuit are stacked.

CITATION LIST

Patent Literature

PTL 1: Japanese Unexamined Patent Application Publication No. 2010-245506

SUMMARY OF THE INVENTION

It is desirable that such a solid-state imaging device have a higher degree of design freedom.

It is therefore desirable to provide a solid-state imaging device that makes it possible to further increase the degree of design freedom.

A solid-state imaging device according to an embodiment of the present disclosure includes a first semiconductor layer and a second semiconductor layer that are stacked. The first semiconductor layer includes a photoelectric conversion section and an electric charge accumulation section for each of pixels. The electric charge accumulation section accumulates signal charge generated in the photoelectric conversion section. The second semiconductor layer includes a pixel transistor that reads out the signal charge of the electric charge accumulation section. This solid-state imaging device includes a pixel separation section and a shared coupling section. The pixel separation section is provided in the first semiconductor layer. The pixel separation section partitions a plurality of the pixels from each other. The shared coupling section is provided between the second semiconductor layer and the first semiconductor layer. The shared coupling section is provided across the pixel separation section. In addition, the shared coupling section is in contact with a plurality of the electric charge accumulation sections. Coupling between each of the electric charge accumulation sections and the shared coupling section includes three-dimensional coupling.

In the solid-state imaging device according to the embodiment of the present disclosure, the shared coupling section is provided across the pixel separation section. In addition, the shared coupling section is in contact with the plurality of electric charge accumulation sections. The coupling between each of the electric charge accumulation sections and the shared coupling section includes the three-dimensional coupling. This makes it possible to increase contact area between each of the electric charge accumulation sections and the shared coupling section as compared with the contact area in a case where each of the electric charge accumulation sections and the shared coupling section have planar coupling. In addition, even in a case where the pixel is miniaturized, it is possible to suppress a decrease in coupling area between the shared coupling section and the electric charge accumulation sections. As described above, it is possible to suppress an increase in resistance components of a transfer path of the signal charge.

BRIEF DESCRIPTION OF DRAWING

FIG. 1 is a block diagram illustrating an example of a functional configuration of an imaging device according to an embodiment of the present disclosure.

FIG. 2 is a plane schematic diagram illustrating a schematic configuration of the imaging device illustrated in FIG. 1.

FIG. 3 is a schematic diagram illustrating a cross-sectional configuration taken along an line illustrated in FIG. 2.

FIG. 4 is an equivalent circuit diagram of a pixel sharing unit illustrated in FIG. 1.

FIG. 5 is a diagram illustrating an example of a coupling form between the plurality of pixel sharing units and a plurality of vertical signal lines.

FIG. 6 is a cross-sectional schematic diagram illustrating an example of a specific configuration of the imaging device illustrated in FIG. 3.

FIG. 7A is a schematic diagram illustrating an example of a planar configuration of a main portion of a first substrate illustrated in FIG. 6.

FIG. 7B is a schematic diagram illustrating a planar configuration of a pad section along with the main portion of the first substrate illustrated in FIG. 7A.

FIG. 8A is an enlarged cross-sectional schematic diagram illustrating the main portions of the first substrate and the second substrate illustrated in FIG. 6.

FIG. 8B is a schematic diagram illustrating a planar configuration of the main portions of the first substrate and the second substrate illustrated in FIG. 8A.

FIG. 9 is a schematic diagram illustrating an example of a planar configuration in a direction parallel to a principal surface of the second substrate (semiconductor layer) illustrated in FIG. 6.

FIG. 10 is a schematic diagram illustrating an example of a planar configuration of a pixel circuit and the main portion of the first substrate along with a first wiring layer illustrated in FIG. 6.

FIG. 11 is a schematic diagram illustrating an example of a planar configuration of the first wiring layer and a second wiring layer illustrated in FIG. 6.

FIG. 12 is a schematic diagram illustrating an example of a planar configuration of the second wiring layer and a third wiring layer illustrated in FIG. 6.

FIG. 13 is a schematic diagram illustrating an example of a planar configuration of the third wiring layer and a fourth wiring layer illustrated in FIG. 6.

FIG. 14 is a schematic diagram for describing a path of an input signal or the like to the imaging device illustrated in FIG. 3.

FIG. 15 is a schematic diagram for describing a signal path of a pixel signal of the imaging device illustrated in FIG. 3.

FIG. 16 is a schematic diagram illustrating a modification example of the planar configuration of the main portion of the first substrate illustrated in FIG. 6.

FIG. 17 is an enlarged cross-sectional schematic diagram illustrating the main portions of the first substrate and the second substrate in the imaging device including the first substrate illustrated in FIG. 16.

FIG. 18 is a cross-sectional schematic diagram illustrating a modification example of a configuration illustrated in FIG. 17.

FIG. 19 is a cross-sectional schematic diagram illustrating a modification example of the configuration illustrated in FIG. 17.

FIG. 20 is a cross-sectional schematic diagram illustrating a modification example of the configuration illustrated in FIG. 17.

FIG. 21 is a cross-sectional schematic diagram illustrating a modification example of the configuration illustrated in FIG. 17.

FIG. 22 is a cross-sectional schematic diagram illustrating a modification example of the configuration illustrated in FIG. 17.

FIG. 23 is a cross-sectional schematic diagram illustrating a modification example of the configuration illustrated in FIG. 17.

FIG. 24 is a cross-sectional schematic diagram illustrating a modification example of the configuration illustrated in FIG. 17.

FIG. 25 is a cross-sectional schematic diagram illustrating a modification example of the configuration illustrated in FIG. 17.

FIG. 26 is a cross-sectional schematic diagram illustrating a modification example of the configuration illustrated in FIG. 17.

FIG. 27 is a schematic diagram illustrating a modification example of the planar configuration in FIG. 8B.

FIG. 28 is a schematic diagram illustrating a modification example of the planar configuration in FIG. 8B.

FIG. 29 is a schematic diagram illustrating a modification example of the planar configuration in FIG. 8B.

FIG. 30 is a cross-sectional schematic diagram illustrating a modification example of the configuration illustrated in FIG. 17.

FIG. 31 is a diagram illustrating an example of a schematic configuration of an imaging system including the imaging device according to any of the embodiment described above and the modification examples thereof.

FIG. 32 is a diagram illustrating an example of an imaging procedure of the imaging system illustrated in FIG. 31.

FIG. 33 is a block diagram depicting an example of schematic configuration of a vehicle control system.

FIG. 34 is a diagram of assistance in explaining an example of installation positions of an outside-vehicle information detecting section and an imaging section.

FIG. 35 is a view depicting an example of a schematic configuration of an endoscopic surgery system.

FIG. 36 is a block diagram depicting an example of a functional configuration of a camera head and a camera control unit (CCU).

MODES FOR CARRYING OUT THE INVENTION

The following describes modes for carrying out the present disclosure in detail with reference to the drawings. It is to be noted that description is given in the following order.

1. Embodiment (An imaging device having a stacked structure of three substrates)
2. Modification Examples
   Modification Example A (An example in which a pad section is larger than a floating diffusion)
   Modification Example B (An example in which a floating diffusion is provided with a taper)
   Modification Example C (An example in which a floating diffusion is provided with a recessed portion)
   Modification Example D (An example in which a floating diffusion is provided with a protruding portion)
   Modification Example E (An example in which a lower end of a through electrode is buried in a pad section)
   Modification Example F (An example in which a pad section is in contact with a sidewall)
   Modification Example G (A modification example of a pixel separation section)
   Modification Example H (A modification example of a planar layout of a pixel sharing unit)
   Modification Example I (A modification example of a contact form between a pad section and a floating diffusion)
3. Application Example (Imaging System)
4. Practical Application Examples

1. Embodiment

[Functional Configuration of Imaging Device 1]

FIG. 1 is a block diagram illustrating an example of a functional configuration of a solid-state imaging device (imaging device 1) according to an embodiment of the present disclosure.

The imaging device 1 in FIG. 1 includes, for example, an input unit 510A, a row drive unit 520, a timing control unit 530, a pixel array unit 540, a column signal processing unit 550, an image signal processing unit 560, and an output unit 510B.

In the pixel array unit 540, pixels 541 are repeatedly disposed in an array. More specifically, a pixel sharing unit 539 including the plurality of pixels 541 serves as a repeating unit. The plurality of pixel sharing units 539 is disposed in an array having a row direction and a column direction. It is to be noted that this specification sometimes refers to the row direction as H direction and refers to the column direction orthogonal to the row direction as V direction for the sake of convenience. In the example of FIG. 1, the one pixel sharing unit 539 includes the four pixels 541 (pixels 541A, 541B, 541C, and 541D). Each of the pixels 541A, 541B, 541C, and 541D includes a photodiode PD (illustrated in FIG. 6 or the like described below). The pixel sharing unit 539 is a unit for sharing one pixel circuit (a pixel circuit 210 in FIG. 3 described below). In other words, the four pixels 541 (the pixels 541A, 541B, 541C, and 541D) include one pixel circuit (the pixel circuit 210 described below). This pixel circuit is brought into operation in a time division manner to sequentially read out pixel signals of the respective pixels 541A, 541B, 541C, and 541D.

The pixels 541A, 541B, 541C, and 541D are disposed, for example, in two rows and two columns. The pixel array unit 540 is provided with a plurality of row drive signal lines 542 and a plurality of vertical signal lines (column readout lines) 543 along with the pixels 541A, 541B, 541C, and 541D. Each of the row drive signal lines 542 drives the plurality of pixels 541 arranged side by side in the row direction in the pixel array unit 540. Each of the row drive signal lines 542 drives the respective pixels 541 arranged side by side in the row direction in the pixel sharing unit 539. Although described in detail below with reference to FIG. 4, the pixel sharing unit 539 is provided with a plurality of transistors. To drive the plurality of these respective transistors, the plurality of row drive signal lines 542 is coupled to (or connected with) the one pixel sharing unit 539. The pixel sharing unit 539 is coupled to (or connected with) the vertical signal line (column readout line) 543. A pixel signal is read out from each of the pixels 541A, 541B, 541C, and 541D included in the pixel sharing unit 539 through the vertical signal line (column readout line) 543.

The row drive unit 520 includes, for example, a row address control section or a row decoder section that determines the position of a row in which pixels are driven and a row drive circuit section that generates signals for driving the pixels 541A, 541B, 541C, and 541D.

The column signal processing unit 550 is, for example, coupled to (or connected with) the vertical signal line 543. The column signal processing unit 550 includes a load circuit section that forms a source follower circuit with the pixels 541A, 541B, 541C, and 541D (pixel sharing unit 539). The column signal processing unit 550 may include an amplification circuit section that amplifies a signal read out from the pixel sharing unit 539 through the vertical signal line 543. The column signal processing unit 550 may include a noise processing section. For example, the noise processing section removes the noise level of the system from a signal read out from the pixel sharing unit 539 as a result of photoelectric conversion.

The column signal processing unit 550 includes, for example, an analog digital converter (ADC). The analog digital converter converts a signal read out from the pixel sharing unit 539 or an analog signal subjected to the noise process described above to a digital signal. The ADC includes, for example, a comparator section and a counter section. The comparator section compares an analog signal to be converted and a reference signal to be compared with this. The counter section measures the time necessary for a result of the comparison by the comparator section to be inverted. The column signal processing unit 550 may include a horizontal scanning circuit section that performs control to scan a readout column.

The timing control unit 530 supplies signals each for controlling a timing to the row drive unit 520 and the column signal processing unit 550 on the basis of a reference clock signal or a timing control signal inputted to the device.

The image signal processing unit 560 is a circuit that performs various kinds of signal processing on data obtained as a result of photoelectric conversion or data obtained as a result of an imaging operation by the imaging device 1. The image signal processing unit 560 includes, for example, an image signal processing circuit section and a data holding section. The image signal processing unit 560 may include a processor section.

Examples of signal processing executed by the image signal processing unit 560 include a tone curve correction process of providing a number of tones in a case where imaging data subjected to AD conversion is data obtained by shooting an image of a dark subject and reducing tones in a case where the imaging data is data obtained by shooting an image of a bright subject. In this case, it is preferable to store tone curve characteristic data in advance in the data holding section of the image signal processing unit 560. The tone curve characteristic data pertains to what tone curve is used to correct the tones of the imaging data.

The input unit 510A is for inputting, for example, the reference clock signal, the timing control signal, the characteristic data, and the like described above to the imaging device 1 from the outside of the device. Examples of the timing control signal include a vertical synchronization signal, a horizontal synchronization signal, and the like. The characteristic data is stored, for example, in the data holding section of the image signal processing unit 560. The input unit 510A includes, for example, an input terminal 511, an input circuit section 512, an input amplitude change section 513, an input data conversion circuit section 514, and a power supply section. The input terminal 511 is an external terminal for inputting data. The input circuit section 512 is for causing a signal inputted to the input terminal 511 to be taken in the imaging device 1. The input amplitude change section 513 changes the amplitude of the signal that has been caused to be taken in by the input circuit section 512 into amplitude that is easy to use inside the imaging device 1. The input data conversion circuit section 514 reorders the data strings of the input data. The input data conversion circuit section 514 includes, for example, a serial parallel conversion circuit. This serial parallel conversion circuit converts a serial signal received as input data to a parallel signal. It is to be noted that the input unit 510A may omit the input amplitude change section 513 and the input data conversion circuit section 514. The power supply section supplies power set at a variety of voltages necessary inside the imaging device 1 on the basis of power supplied from the outside to the imaging device 1.

In a case where the imaging device 1 is coupled to (or connected with) an external memory device, the input unit 510A may be provided with a memory interface circuit that receives data from the external memory device. Examples of the external memory device include a flash memory, SRAM, DRAM, and the like.

The output unit 510B outputs image data to the outside of the device. Examples of this image data include image data shot by the imaging device 1, image data subjected to signal processing by the image signal processing unit 560, and the like. The output unit 510B includes, for example, an output data conversion circuit section 515, an output amplitude change section 516, an output circuit section 517, and an output terminal 518.

The output data conversion circuit section 515 includes, for example, a parallel serial conversion circuit. The output data conversion circuit section 515 converts a parallel signal used inside the imaging device 1 to a serial signal. The output amplitude change section 516 changes the amplitude of a signal used inside the imaging device 1. The signal whose amplitude has been changed is easier to use in the external device coupled to (or connected with) the outside of the imaging device 1. The output circuit section 517 is a circuit that outputs data from the inside of the imaging device 1 to the outside of the device. The output circuit section 517 drives a wiring line outside the imaging device 1. The wiring line is coupled to (or connected with) the output terminal 518. The output terminal 518 outputs data from the imaging device 1 to the outside of the device. The output unit 510B may omit the output data conversion circuit section 515 and the output amplitude change section 516.

In a case where the imaging device 1 is coupled to (or connected with) an external memory device, the output unit 510B may be provided with a memory interface circuit that outputs data to the external memory device. Examples of the external memory device include a flash memory, SRAM, DRAM, and the like.

[Schematic Configuration of Imaging Device 1]

Each of FIGS. 2 and 3 illustrates an example of a schematic configuration of the imaging device 1. The imaging device 1 includes three substrates (a first substrate 100, a second substrate 200, and a third substrate 300). FIG. 2 schematically illustrates respective planar configurations of the first substrate 100, the second substrate 200, and the third substrate 300. FIG. 3 schematically illustrates a cross-sectional configuration of the first substrate 100, the second substrate 200, and the third substrate 300 that are stacked. FIG. 3 corresponds to a cross-sectional configuration taken along an line illustrated in FIG. 2.

The imaging device 1 is an imaging device that has a three-dimensional structure in which three substrates (the first substrate 100, the second substrate 200, and the third substrate 300) are bonded together. The first substrate 100 includes a semiconductor layer 100S and a wiring layer 100T. The second substrate 200 includes a semiconductor layer 200S and a wiring layer 200T. The third substrate 300 includes a semiconductor layer 300S and a wiring layer 300T. The semiconductor layer 100S corresponds to a specific example of a "first semiconductor layer" according to the present disclosure. The wiring layer 100T corresponds to a specific example of a "first wiring layer" according to the present disclosure. The first substrate 100 corresponds to a specific example of a "first substrate" according to the present disclosure. The semiconductor layer 200S corresponds to a specific example of a "second semiconductor layer" according to the present disclosure. The wiring layer 200T corresponds to a specific example of a "second wiring layer" according to the present disclosure. The second substrate 200 corresponds to a specific example of a "second substrate" according to the present disclosure. The third substrate 300 corresponds to a specific example of a "third substrate" according to the present disclosure.

Here, wiring lines included in the respective substrates of the first substrate 100, the second substrate 200, and the third substrate 300 and interlayer insulating films around the wiring lines are collectively referred to as wiring layers (100T, 200T, and 300T) provided in the respective substrates (the first substrate 100, the second substrate 200, and the third substrate 300) for the sake of convenience. The first substrate 100, the second substrate 200, and the third substrate 300 are stacked in this order. The semiconductor layer 100S, the wiring layer 100T, the semiconductor layer 200S, the wiring layer 200T, the wiring layer 300T, and the semiconductor layer 300S are disposed in this order along the stack direction. Specific configurations of the first substrate 100, the second substrate 200, and the third substrate 300 are described below. The arrow illustrated in FIG. 3 indicates the incidence direction of light L entering the imaging device 1. This specification sometimes refers to the light incidence side of the imaging device 1 as "down", "lower side", and "below" and refers to the opposite side to the light incidence side as "up", "upper side", and "above" in the following cross-sectional views for the sake of convenience. In addition, this specification sometimes refers to the side of a substrate including a semiconductor layer and a wiring layer closer to the wiring layer as front surface and refers to the side of the substrate closer to the semiconductor layer as back surface for the sake of convenience. It is to be noted that the description of the specification is not limited to the wordings described above. The imaging device 1 is, for example, a back-illuminated imaging device that light enters from the back surface (light incidence surface) side of the first substrate 100 including a photodiode.

The pixel array unit 540 and the pixel sharing unit 539 included in the pixel array unit 540 are both configured by using both the first substrate 100 and the second substrate 200. The first substrate 100 is provided with the plurality of pixels 541A, 541B, 541C, and 541D included in the pixel sharing unit 539. Each of these pixels 541 includes a photodiode (the photodiode PD described below) and a transfer transistor (a transfer transistor TR described below). The second substrate 200 is provided with a pixel circuit (the pixel circuit 210 described below) included in the pixel sharing unit 539. The pixel circuit 210 reads out a pixel signal transferred from the photodiode of each of the pixels 541A, 541B, 541C, and 541D through the transfer transistor TR or resets the photodiode. This second substrate 200 includes the plurality of row drive signal lines 542 extending in the row direction and the plurality of vertical signal lines 543 extending in the column direction in addition to the pixel circuit 210 like this. The second substrate 200 further includes a power supply line 544 (such as a power supply line VDD described below) extending in the row direction.

The third substrate 300 includes, for example, the input unit 510A, the row drive unit 520, the timing control unit 530, the column signal processing unit 550, the image signal processing unit 560, and the output unit 510B. The row drive unit 520 is provided, for example, in a region partially overlapping with the pixel array unit 540 in the stack direction (that is referred to simply as stack direction below) of the first substrate 100, the second substrate 200, and the third substrate 300. More specifically, the row drive unit 520 is provided in a region overlapping with the region near an end of the pixel array unit 540 in the H direction in the stack direction (FIG. 2). The column signal processing unit 550 is provided, for example, in a region partially overlapping with the pixel array unit 540 in the stack direction. More specifically, the column signal processing unit 550 is provided in a region overlapping with the region near an end of the pixel array unit 540 in the V direction in the stack direction (FIG. 2). Although not illustrated, the input unit 510A and the output unit 510B may be disposed in a portion other than the third substrate 300. For example, the input unit 510A and the output unit 510B may be disposed in the second substrate 200. Alternatively, the back surface (light incidence surface) side of the first substrate 100 may be provided with the input unit 510A and the output unit 510B. It is to be noted that the pixel circuit provided in the second substrate 200 described above is alternatively referred to as a pixel transistor circuit, a pixel transistor group, a pixel transistor, a pixel readout circuit, or a readout circuit in some cases. This specification uses the name of a pixel circuit.

The first substrate 100 and the second substrate 200 are electrically coupled (or connected), for example, by through electrodes (through electrodes 120E and 121E in FIG. 6 described below). The second substrate 200 and the third substrate 300 are electrically coupled (or connected), for example, through contact sections 201, 202, 301, and 302. The second substrate 200 is provided with the contact sections 201 and 202 and the third substrate 300 is provided with the contact sections 301 and 302. The contact section 201 of the second substrate 200 is in contact with the contact section 301 of the third substrate 300 and the contact section 202 of the second substrate 200 is in contact with the contact section 302 of the third substrate 300. The second substrate 200 includes a contact region 201R provided with the plurality of contact sections 201 and a contact region 202R provided with the plurality of contact sections 202. The third substrate 300 includes a contact region 301R provided with the plurality of contact sections 301 and a contact region 302R provided with the plurality of contact sections 302.

The contact regions 201R and 301R are provided between the pixel array unit 540 and the row drive unit 520 in the stack direction (FIG. 3). In other words, the contact regions 201R and 301R are provided, for example, in the region in which the row drive unit 520 (third substrate 300) and the pixel array unit 540 (second substrate 200) overlap with each other in the stack direction or the region near this. Each of the contact regions 201R and 301R is disposed, for example, at an end of such a region in the H direction (FIG. 2). The third substrate 300 is provided, for example, with the contact region 301R at a position overlapping with a portion of the row drive unit 520. Specifically, the third substrate 300 is provided, for example, with the contact region 301R at a position overlapping with an end of the row drive unit 520 in the H direction (FIGS. 2 and 3). The contact sections 201 and 301 couple (or connect), for example, the row drive unit 520 provided in the third substrate 300 and the row drive signal line 542 provided in the second substrate 200. The contact sections 201 and 301 may couple (or connect), for example, the input unit 510A provided in the third substrate 300 and the power supply line 544 and a reference electric potential line (a reference electric potential line VSS described below). The contact regions 202R and 302R are provided between the pixel array unit 540 and the column signal processing unit 550 in the stack direction (FIG. 3). In other words, the contact regions 202R and 302R are provided, for example, in the region in which the column signal processing unit 550 (third substrate 300) and the pixel array unit 540 (second substrate 200) overlap with each other in the stack direction or the region near this. Each of the contact regions 202R and 302R is disposed, for example, at an end of such a region in the V direction (FIG. 2). The third substrate 300 is provided, for example, with the contact region 301R at a position overlapping with a portion of the column signal processing unit 550. Specifically, the third substrate 300 is provided, for example, with the contact region 301R at a position overlapping with an end of the column signal processing unit 550 in the V direction (FIGS. 2 and 3). The contact sections 202 and 302 are for coupling, for example, pixel signals (signals corresponding to the amount of electric charge generated as a result of photoelectric conversion by the photodiodes) outputted from the plurality of respective pixel sharing units 539 included in the pixel array unit 540 to the column signal processing unit 550 provided in the third substrate 300 (or connecting the pixel signals with the column signal processing unit 550 provided in the third substrate 300). The pixel signals are sent from the second substrate 200 to the third substrate 300.

As described above, FIG. 3 is an example of a cross-sectional view of the imaging device 1. The first substrate 100, the second substrate 200, and the third substrate 300 are electrically coupled (or connected) through the wiring layers 100T, 200T, and 300T. For example, the imaging device 1 includes an electrical coupling section that electrically couples (or connects) the second substrate 200 and the third substrate 300. Specifically, electrodes each formed by using an electrically conductive material are used to form the contact sections 201, 202, 301, and 302. The electrically conductive material is formed by using, for example, a metal material such as copper (Cu), aluminum (Al), or gold (Au). The contact regions 201R, 202R, 301R, and 302R electrically couple (or connect) the second substrate and the third substrate, for example, by directly bonding wiring lines formed as electrodes and make it possible to input and/or output signals to and/or from the second substrate 200 and the third substrate 300.

It is possible to provide the electrical coupling section at a desired position. The electrical coupling section electrically couples (or connects) the second substrate 200 and the third substrate 300. For example, as described in FIG. 3 as the contact regions 201R, 202R, 301R, and 302R, the electrical coupling section may be provided in a region overlapping with the pixel array unit 540 in the stack direction. In addition, the electrical coupling section may be provided in a region that does not overlap with the pixel array unit 540 in the stack direction. Specifically, the electrical coupling section may be provided in a region overlapping with a peripheral portion in the stack direction. The peripheral portion is disposed outside the pixel array unit 540.

The first substrate 100 and the second substrate 200 are provided, for example, with coupling hole sections H1 and H2. The coupling hole sections H1 and H2 extend through the first substrate 100 and the second substrate 200 (FIG. 3). The coupling hole sections H1 and H2 are provided outside the pixel array unit 540 (or the portions each overlapping with the pixel array unit 540) (FIG. 2). For example, the coupling hole section H1 is disposed outside the pixel array unit 540 in the H direction and the coupling hole section H2 is disposed outside the pixel array unit 540 in the V direction. For example, the coupling hole section H1 reaches the input unit 510A provided in the third substrate 300 and the coupling hole section H2 reaches the output unit 510B provided in the third substrate 300. Each of the coupling hole sections H1 and H2 may be hollow or may include an electrically conductive material at least partially. For example, there is a configuration in which a bonding wire is coupled to (or connected with) each of electrodes formed as the input unit 510A and/or the output unit 510B. Alternatively, there is a configuration in which electrodes formed as the input unit 510A and/or the output unit 510B and electrically conductive materials provided in the coupling hole sections H1 and H2 are coupled (or connected). The electrically conductive materials provided in the coupling hole sections H1 and H2 may be embedded in portions of the coupling hole sections H1 and H2 or the whole of the coupling hole sections H1 and H2 or the electrically conductive materials may be formed on the side walls of the coupling hole sections H1 and H2.

It is to be noted that FIG. 3 illustrates a structure in which the third substrate 300 is provided with the input unit 510A and the output unit 510B, but this is not limitative. For example, it is also possible to provide the input unit 510A and/or the output unit 510B to the second substrate 200 by sending signals of the third substrate 300 to the second substrate 200 through the wiring layers 200T and 300T. Similarly, it is also possible to provide the input unit 510A and/or the output unit 510B to the first substrate 100 by sending signals of the second substrate 200 to the first substrate 100 through the wiring layers 100T and 200T.

FIG. 4 is an equivalent circuit diagram illustrating an example of a configuration of the pixel sharing unit 539. The pixel sharing unit 539 includes the plurality of pixels 541 (FIG. 4 illustrates the four pixels 541 of the pixels 541A, 541B, 541C, and 541D), the one pixel circuit 210 coupled to (or connected with) the plurality of these pixels 541, and the vertical signal line 543 coupled to (or connected with) the pixel circuit 210. The pixel circuit 210 includes, for example, four transistors. Specifically, the pixel circuit 210 includes an amplification transistor AMP, a selection transistor SEL, a reset transistor RST, and an FD conversion gain switching transistor FDG. As described above, the pixel sharing unit 539 sequentially outputs pixel signals of the four respective pixels 541 (the pixels 541A, 541B, 541C, and 541D) included in the pixel sharing unit 539 to the vertical signal line 543 by bringing the one pixel circuit 210 into operation in a time division manner. The one pixel circuit 210 is coupled to (or connected with) the plurality of pixels 541. A mode in which pixel signals of the plurality of these pixels 541 are outputted from the one pixel circuit 210 in a time division manner is called "the plurality of pixels 541 shares the one pixel circuit 210".

Each of the pixels 541A, 541B, 541C, and 541D includes a common component. To distinguish the components of the pixels 541A, 541B, 541C, and 541D from each other, the following attaches an identification number 1 to the end of the sign of a component of the pixel 541A, attaches an identification number 2 to the end of the sign of a component of the pixel 541B, attaches an identification number 3 to the end of the sign of a component of the pixel 541C, and attaches an identification number 4 to the end of the sign of a component of the pixel 541D. In a case where there is no need to distinguish the components of the pixels 541A, 541B, 541C, and 541D from each other, the identification numbers at the ends of the signs of the components of the pixels 541A, 541B, 541C, and 541D are omitted.

Each of the pixels 541A, 541B, 541C, and 541D includes, for example, the photodiode PD, the transfer transistor TR electrically coupled to (or connected with) the photodiode PD, and a floating diffusion FD electrically coupled to (or connected with) the transfer transistor TR. Each of the photodiodes PD (PD1, PD2, PD3, and PD4) has the cathode electrically coupled to (or connected with) the source of the transfer transistor TR and has the anode electrically coupled to (or connected with) a reference electric potential line (e.g., ground). The photodiode PD photoelectrically converts incident light to generate electric charge corresponding to the amount of received light. The transfer transistor TR (each of transfer transistors TR1, TR2, TR3, and TR4) is, for example, an n-type CMOS (Complementary Metal Oxide Semiconductor) transistor. The transfer transistor TR has the drain electrically coupled to (or connected with) the floating diffusion FD and has the gate electrically coupled to (or connected with) a drive signal line. This drive signal line is a portion of the plurality of row drive signal lines 542 (see FIG. 1) coupled to (or connected with) the one pixel sharing unit 539. The transfer transistor TR transfers the electric charge generated by the photodiode PD to the floating diffusion FD. Each of the floating diffusions FD (floating diffusions FD1, FD2, FD3, and FD4) is an n-type diffusion layer region formed in a p-type semiconductor layer. The floating diffusion FD is an electric charge holding means that temporarily holds the electric charge transferred from the photodiode PD and an electric charge-voltage conversion means that generates a voltage corresponding to the amount of electric charge. The photodiode PD corresponds to a specific example of a "photoelectric conversion section" according to the present disclosure. The floating diffusion FD corresponds to a specific example of an "electric charge accumulation section" according to the present disclosure.

The four floating diffusions FD (the floating diffusions FD1, FD2, FD3, and FD4) included in the one pixel sharing unit 539 are electrically coupled to (or connected with) each other and electrically coupled to (or connected with) the gate of the amplification transistor AMP and the source of the FD conversion gain switching transistor FDG. A drain of the FD conversion gain switching transistor FDG is coupled to (or connected with) a source of the reset transistor RST. A gate of the FD conversion gain switching transistor FDG is coupled to (or connected with) the drive signal line. This drive signal line is a portion of the plurality of row drive signal lines 542 coupled to (or connected with) the one pixel sharing unit 539. A drain of the reset transistor RST is coupled to (or connected with) the power supply line VDD. A gate of the reset transistor RST is coupled to (or connected with) the drive signal line. This drive signal line is a portion of the plurality of row drive signal lines 542 coupled to (or connected with) the one pixel sharing unit 539. The gate of the amplification transistor AMP is coupled to (or connected with) the floating diffusion FD. A drain of the amplification transistor AMP is coupled to (or connected with) the power supply line VDD. A source of the amplification transistor AMP is coupled to (or connected with) a drain of the selection transistor SEL. A source of the selection transistor SEL is coupled to (or connected with) the vertical signal line 543. A gate of the selection transistor SEL is coupled to (or connected with) the drive signal line. This drive signal line is a portion of the plurality of row drive signal lines 542 coupled to (or connected with) the one pixel sharing unit 539.

In a case where the transfer transistor TR enters an on state, the transfer transistor TR transfers the electric charge of the photodiode PD to the floating diffusion FD. The gate (transfer gate TG) of the transfer transistor TR includes, for example, a so-called vertical electrode and is provided to extend from the front surface of a semiconductor layer (the semiconductor layer 100S in FIG. 6 described below) to the depth of the PD as illustrated in FIG. 6 described below. The reset transistor RST resets the electric potential of the floating diffusion FD to a predetermined electric potential. In a case where the reset transistor RST enters the on state, the reset transistor RST resets the electric potential of the floating diffusion FD to the power supply line VDD. The selection transistor SEL controls the output timing of a pixel signal from the pixel circuit 210. The amplification transistor AMP generates, as a pixel signal, a signal of a voltage corresponding to the level of the electric charge held in the floating diffusion FD. The amplification transistor AMP is coupled to (or connected with) the vertical signal line 543 through the selection transistor SEL. This amplification transistor AMP is included in a source follower in the column signal processing unit 550 along with the load circuit section (see FIG. 1) coupled to (or connected with) the vertical signal line 543. In a case where the selection transistor SEL enters the on state, the amplification transistor AMP outputs the voltage of the floating diffusion FD to the column signal processing unit 550 through the vertical signal line 543. The reset transistor RST, the amplification transistor AMP, and the selection transistor SEL are, for example, N-type CMOS transistors.

The FD conversion gain switching transistor FDG is used to change the gain of electric charge-voltage conversion by the floating diffusion FD. In general, a pixel signal is small in shooting an image in a dark place. In a case where electric charge-voltage conversion is performed on the basis of $Q=CV$, the floating diffusion FD having larger capacitance (FD capacitance C) results in smaller V that is obtained in a case of conversion to a voltage by the amplification transistor AMP. In contrast, a bright place offers a larger pixel signal. It is therefore not possible for the floating diffusion FD to completely receive the electric charge of the photodiode PD unless the FD capacitance C is large. Further, the FD capacitance C has to be large to prevent V from being too large (i.e., to make V small) in a case of conversion to a voltage by the amplification transistor AMP. Taking these into consideration, in a case where the FD conversion gain switching transistor FDG is turned on, the gate capacitance for the FD conversion gain switching transistor FDG is increased. This causes the whole FD capacitance C to be large. In contrast, in a case where the FD conversion gain switching transistor FDG is turned off, the whole FD capacitance C becomes small. In this way, switching the FD conversion gain switching transistor FDG on and off allows the FD capacitance C to be variable. This makes it possible to switch the conversion efficiency. The FD conversion gain switching transistor FDG is, for example, an N-type CMOS transistor.

It is to be noted that a configuration is also possible in which the FD conversion gain switching transistor FDG is not provided. In this case, for example, the pixel circuit 210 includes, for example, the three transistors of the amplification transistor AMP, the selection transistor SEL, and the reset transistor RST. The pixel circuit 210 includes, for example, at least one of pixel transistors such as the amplification transistor AMP, the selection transistor SEL, the reset transistor RST, and the FD conversion gain switching transistor FDG.

The selection transistor SEL may be provided between the power supply line VDD and the amplification transistor AMP. In this case, the drain of the reset transistor RST is electrically coupled to (or connected with) the power supply line VDD and the drain of the selection transistor SEL. The source of the selection transistor SEL is electrically coupled to (or connected with) the drain of the amplification transistor AMP and the gate of the selection transistor SEL is electrically coupled to (or connected with) the row drive signal line 542 (see FIG. 1). The source of the amplification transistor AMP (the output end of the pixel circuit 210) is electrically coupled to (or connected with) the vertical signal line 543 and the gate of the amplification transistor AMP is electrically coupled to (or connected with) the source of the reset transistor RST. It is to be noted that, although not illustrated, the number of pixels 541 that share the one pixel circuit 210 does not have to be 4. For example, the two or eight pixels 541 may share the one pixel circuit 210.

FIG. 5 illustrates an example of a coupling form between the plurality of pixel sharing units 539 and the vertical signal lines 543. For example, the four pixel sharing units 539 arranged in the column direction are divided into four groups and the vertical signal lines 543 are coupled to (or connected with) these four respective groups. FIG. 5 illustrates an example in which each of the four groups includes the one pixel sharing unit 539 for the sake of simpler description, but each of the four groups may also include the plurality of pixel sharing units 539. In this way, in the imaging device 1, the plurality of pixel sharing units 539 arranged in the column direction may be divided into groups each including the one or more pixel sharing units 539. For example, the vertical signal line 543 and the column signal processing unit 550 are coupled to (or connected with) each of these groups. It is possible to read out pixel signals from the respective groups at the same time. Alternatively, in the imaging device 1, the one vertical signal line 543 may be coupled to (or connected with) the plurality of pixel sharing units 539 arranged in the column direction. Pixel signals are then sequentially read out from the plurality of pixel sharing units 539 coupled to (or connected with) the one vertical signal line 543 in a time division manner.

[Specific Configuration of Imaging Device 1]

FIG. 6 illustrates an example of a cross-sectional configuration of the first substrate 100, the second substrate 200, and the third substrate 300 of the imaging device 1 in the direction vertical to the principal surface. FIG. 6 schematically illustrates the positional relationship between components for the sake of simplicity and may illustrate a different cross section from the actual cross section. In the imaging device 1, the first substrate 100, the second substrate 200, and the third substrate 300 are stacked in this order. The imaging device 1 further includes a light receiving lens 401 on the back surface side (the light incidence surface side) of the first substrate 100. There may be provided a color filter layer (not illustrated) between the light receiving lens 401 and the first substrate 100. The light receiving lens 401 is provided, for example, to each of the pixels 541A, 541B, 541C, and 541D. The imaging device 1 is, for example, a back-illuminated imaging device. The imaging device 1 includes the pixel array unit 540 disposed in the middle portion and a peripheral portion 540B disposed outside the pixel array unit 540.

The first substrate 100 includes an insulating film 111, a fixed electric charge film 112, the semiconductor layer 100S, and the wiring layer 100T in order from the light receiving lens 401 side. The semiconductor layer 100S includes, for example, a silicon substrate. The semiconductor layer 100S includes, for example, a p-well layer 115 in a portion of the front surface (the surface on the wiring layer 100T side) and near it. The semiconductor layer 100S includes an n-type semiconductor region 114 in the other region (a deeper region than the p-well layer 115). For example, these n-type semiconductor region 114 and p-well layer 115 are included in the pn junction photodiode PD. The p-well layer 115 is a p-type semiconductor region.

FIG. 7A illustrates an example of a planar configuration of the first substrate 100. FIG. 7A chiefly illustrates a planar configuration of a pixel separation section 117, the photodiode PD, the floating diffusion FD, a VSS contact region 118, and the transfer transistor TR of the first substrate 100. A configuration of the first substrate 100 is described with reference to FIG. 7A along with FIG. 6.

The floating diffusion FD and the VSS contact region 118 are provided near the front surface of the semiconductor layer 100S. The floating diffusion FD includes an n-type semiconductor region provided in the p-well layer 115. The floating diffusions FD (the floating diffusions FD1, FD2, FD3, and FD4) of the respective pixels 541A, 541B, 541C, and 541D are provided, for example, in the middle portion of the pixel sharing unit 539 to be close to each other (FIG. 7A). Although described in detail below, the four floating diffusions (the floating diffusions FD1, FD2, FD3, and FD4) included in this pixel sharing unit 539 are electrically coupled to (or connected with) each other in the first substrate 100 (more specifically, in the wiring layer 100T) through an electrical coupling means (a pad section 120 described below). Further, each of the floating diffusions FD is coupled (or connected) from the first substrate 100 to the second substrate 200 (more specifically, from the wiring layer 100T to the wiring layer 200T) through an electrical means (the through electrode 120E described below). In the second substrate 200 (more specifically, inside the wiring layer 200T), this electrical means electrically couples each of the floating diffusions FD to the gate of the amplification transistor AMP and the source of the FD conversion gain switching transistor FDG (or electrically connects each of the floating diffusions FD with the gate of the amplification transistor AMP and the source of the FD conversion gain switching transistor FDG). Here, the VSS contact region 118 corresponds to a specific example of an "impurity diffusion region" according to the present disclosure.

The VSS contact region 118 is a region that is electrically coupled to (or connected with) the reference electric potential line VSS. The VSS contact region 118 is disposed away from the floating diffusion FD. For example, in each of the pixels 541A, 541B, 541C, and 541D, the floating diffusion FD is disposed at an end of the pixel in the V direction and the VSS contact region 118 is disposed at the other end (FIG.

7A). The VSS contact region 118 includes, for example, a p-type semiconductor region. The VSS contact region 118 is, for example, coupled to (or connected with) a ground electric potential or a fixed electric potential. This supplies the semiconductor layer 100S with a reference electric potential.

The first substrate 100 is provided with the transfer transistor TR along with the photodiode PD, the floating diffusion FD, and the VSS contact region 118. These photodiode PD, the floating diffusion FD, the VSS contact region 118, and the transfer transistor TR are provided in each of the pixels 541A, 541B, 541C, and 541D. The transfer transistor TR is provided on the front surface side (the opposite side to the light incidence surface side or the second substrate 200 side) of the semiconductor layer 100S. The transfer transistor TR includes the transfer gate TG. The transfer gate TG includes, for example, a horizontal portion TGb opposed to the front surface of the semiconductor layer 100S and a vertical portion TGa provided in the semiconductor layer 100S. The vertical portion TGa extends in a thickness direction of the semiconductor layer 100S. An end of the vertical portion TGa is in contact with the horizontal portion TGb and the other end is provided in the n-type semiconductor region 114. The transfer transistor TR includes such a vertical transistor. This causes pixel signals to experience deficient transfer less frequently and makes it possible to increase the readout efficiency of pixel signals.

The horizontal portion TGb of the transfer gate TG extends from a position opposed to the vertical portion TGa toward the middle portion of the pixel sharing unit 539, for example, in the H direction (FIG. 7A). This makes it possible to bring the position of a through electrode (a through electrode TGV described below) in the H direction closer to the positions of the through electrodes (the through electrodes 120E and 121E described below) in the H direction. The through electrode TGV reaches the transfer gate TG. The through electrodes 120E and 121E are coupled to (or connected with) the floating diffusion FD and the VSS contact region 118. For example, the plurality of pixel sharing units 539 provided in the first substrate 100 each has the same configuration (FIG. 7A).

Each of FIGS. 8A and 8B schematically illustrates another example of a configuration of main portions of the first substrate 100 and the second substrate 200. FIG. 8A illustrates a cross-sectional configuration of the main portions of the first substrate 100 and the second substrate 200. FIG. 8B illustrates an example of a planar configuration of the pixel sharing unit 539.

The transfer transistor TR may include a planar transistor (FIG. 8A). For example, the transfer gate TG is provided on the front surface of the semiconductor layer 100S in this case. For example, a side surface of this transfer gate TG is covered with a sidewall SW. The sidewall SW includes, for example, silicon nitride (SiN). There is provided a gate insulating film (that is not illustrated in FIG. 8A, but corresponds to a gate insulating film TR-I in FIG. 19B described below) between the semiconductor layer 100S and the transfer gate TG. The transfer gates TG (transfer gates TG1, TG2, TG3, and TG4) of the respective pixels 541A, 541B, 541C, and 541D are provided, for example, to surround the floating diffusions FD in a plan view (FIG. 8B).

The semiconductor layer 100S is provided with the pixel separation section 117 that separates the pixels 541A, 541B, 541C, and 541D from each other. The pixel separation section 117 is formed to extend in the normal direction of the semiconductor layer 100S (the direction vertical to the front surface of the semiconductor layer 100S). The pixel separation section 117 is provided to partition the pixels 541A, 541B, 541C, and 541D from each other. The pixel separation section 117 has, for example, a planar lattice shape (FIGS. 7A and 7B). For example, the pixel separation section 117 separates the pixels 541A, 541B, 541C, and 541D from each other electrically and optically. The pixel separation section 117 includes, for example, a light shielding film 117A and an insulating film 117B. For example, tungsten (W) or the like is used for the light shielding film 117A. The insulating film 117B is provided between the light shielding film 117A and the p-well layer 115 or the n-type semiconductor region 114. The insulating film 117B includes, for example, silicon oxide (SiO). The pixel separation section 117 has, for example, an FTI (Full Trench Isolation) structure and penetrates the semiconductor layer 100S. Although not illustrated, the pixel separation section 117 is not limited to an FTI structure in which the semiconductor layer 100S is penetrated. For example, the pixel separation section 117 may have a DTI (Deep Trench Isolation) structure in which the semiconductor layer 100S is not penetrated. The pixel separation section 117 extends in the normal direction of the semiconductor layer 100S and is formed in a portion of the regions of the semiconductor layer 100S.

The semiconductor layer 100S is provided, for example, with a first pinning region 113 and a second pinning region 116. The first pinning region 113 is provided near the back surface of the semiconductor layer 100S and disposed between the n-type semiconductor region 114 and the fixed electric charge film 112. The second pinning region 116 is provided on the side surface of the pixel separation section 117. Specifically, the second pinning region 116 is provided between the pixel separation section 117 and the p-well layer 115 or the n-type semiconductor region 114. The first pinning region 113 and the second pinning region 116 each include, for example, a p-type semiconductor region.

The fixed electric charge film 112 having negative fixed electric charge is provided between the semiconductor layer 100S and the insulating film 111. The electric field induced by the fixed electric charge film 112 forms the first pinning region 113 of a hole accumulation layer at the interface on the light receiving surface (back surface) side of the semiconductor layer 100S. This suppresses the generation of dark currents caused by the interface level on the light receiving surface side of the semiconductor layer 100S. The fixed electric charge film 112 is formed by using, for example, an insulating film having negative fixed electric charge. Examples of a material of this insulating film having negative fixed electric charge include hafnium oxide, zircon oxide, aluminum oxide, titanium oxide, or tantalum oxide.

The light shielding film 117A is provided between the fixed electric charge film 112 and the insulating film 111. This light shielding film 117A may be provided to be continuous with the light shielding film 117A included in the pixel separation section 117. This light shielding film 117A between the fixed electric charge film 112 and the insulating film 111 is selectively provided, for example, at a position opposed to the pixel separation section 117 in the semiconductor layer 100S. The insulating film 111 is provided to cover this light shielding film 117A. The insulating film 111 includes, for example, silicon oxide.

The wiring layer 100T provided between the semiconductor layer 100S and the second substrate 200 includes an interlayer insulating film 119, the pad sections 120 and 121, a passivation film 122, an interlayer insulating film 123, and a bonding film 124 in this order from the semiconductor layer 100S side. The horizontal portion TGb of the transfer gate TG is provided, for example, in this wiring layer 100T.

The interlayer insulating film 119 is provided over the whole of the front surface of the semiconductor layer 100S and is in contact with the semiconductor layer 100S. The interlayer insulating film 119 includes, for example, a silicon oxide film. It is to be noted that the wiring layer 100T is not limited to the configuration described above, but it is sufficient if the wiring layer 100T has a configuration in which a wiring line and an insulating film are included. The pad section 120 corresponds to a specific example of a "shared coupling section" according to the present disclosure.

FIG. 7B illustrates a configuration of the pad sections 120 and 121 along with the planar configuration illustrated in FIG. 7A. Each of the pad sections 120 and 121 is provided in a selective region on the interlayer insulating film 119. The pad section 120 is for coupling the floating diffusions FD (the floating diffusions FD1, FD2, FD3, and FD4) of the respective pixels 541A, 541B, 541C, and 541D to each other (or connecting the floating diffusions FD (the floating diffusions FD1, FD2, FD3, and FD4) of the respective pixels 541A, 541B, 541C, and 541D with each other). The pad section 120 is disposed, for example, for each of the pixel sharing units 539 in the middle portion of the pixel sharing unit 539 in a plan view (FIG. 7B). The pad section 120 is provided across the pixel separation section 117. The pad section 120 is provided is disposed to be superimposed on at least a portion of each of the floating diffusions FD1, FD2, FD3, and FD4 (FIGS. 6 and 7B). Specifically, the pad section 120 is formed in a region that overlaps with at least a portion of each of the plurality of floating diffusions FD (the floating diffusions FD1, FD2, FD3, and FD4) that shares the pixel circuit 210 and at least a portion of the pixel separation section 117 formed between the plurality of photodiodes PD (the photodiodes PD1, PD2, PD3, and PD4) that shares the pixel circuit 210. The pad section 120 has, for example, a square shape in a plan view. The shape of the pad section 120 is not limited to the above. The pad section 120 may have, for example, a circular shape, an oval shape, a triangular shape, a square shape, or a polygonal shape in a plan view.

The interlayer insulating film 119 may be provided with a coupling via for electrically coupling (or connecting) the pad section 120 and each of the floating diffusions FD1, FD2, FD3, and FD4. The coupling via may be provided, for example, in each of the pixels 541A, 541B, 541C, and 541D. For example, the coupling via may be filled with a portion of the pad section 120, thereby electrically coupling (or connecting) the pad section 120 and each of the floating diffusions FD1, FD2, FD3, and FD4.

The pad section 121 is for coupling the plurality of VSS contact regions 118 to each other (or connecting the plurality of VSS contact regions 118 with each other). For example, the VSS contact region 118 provided in the pixels 541C and 541D of one of the pixel sharing units 539 adjacent in the V direction and the VSS contact region 118 provided in the pixels 541A and 541B of the other pixel sharing unit 539 are electrically coupled (or connected) by the pad section 121. The pad section 121 is provided, for example, across the pixel separation section 117. The pad section 121 is disposed to be superimposed on at least a portion of each of these four VSS contact regions 118. Specifically, the pad section 121 is formed in a region that overlaps in the direction vertical to the front surface of the semiconductor layer 100S with at least a portion of each of the plurality of VSS contact regions 118 and at least a portion of the pixel separation section 117 formed between the plurality of VSS contact regions 118.

The interlayer insulating film 119 is provided with a coupling via for electrically coupling (or connecting) the pad section 121 and the VSS contact region 118. The coupling via may be provided, for example, in each of the pixels 541A, 541B, 541C, and 541D. For example, the coupling via may be filled with a portion of the pad section 121, thereby electrically coupling (or connecting) the pad section 121 and the VSS contact region 118. For example, the pad section 120 and the pad section 121 of each of the plurality of pixel sharing units 539 arranged in the V direction are disposed at substantially the same position in the H direction (FIG. 7B).

Providing the pad section 120 allows the whole of the chip to decrease wiring lines for coupling to the respective floating diffusions FD to the pixel circuit 210 (e.g., the gate electrode of the amplification transistor AMP). Similarly, providing the pad section 121 allows the whole of the chip to decrease wiring lines each of which supplies an electric potential to each of the VSS contact regions 118. This makes it possible to decrease the whole of the chip in area, suppress electrical interference between wiring lines in miniaturized pixels, and/or decrease cost by decreasing the number of parts, for example.

It is possible to provide the pad sections 120 and 121 at desired positions in the first substrate 100 and the second substrate 200. Specifically, it is possible to provide the pad sections 120 and 121 in any of the wiring layer 100T and an insulating region 212 of the semiconductor layer 200S. In a case where the pad sections 120 and 121 are provided in the wiring layer 100T, the pad sections 120 and 121 may be in direct contact with the semiconductor layer 100S. Specifically, each of the pad sections 120 and 121 may be configured to be directly coupled to (or connected with) at least a portion of the floating diffusion FD and/or a portion of the VSS contact region 118. In addition, a configuration may be adopted in which the respective coupling vias are provided from the floating diffusion FD and/or the VSS contact region 118 coupled to (or connected with) each of the pad sections 120 and 121 and the pad sections 120 and 121 are provided at desired positions in the wiring layer 100T and the insulating region 212 of the semiconductor layer 200S. In addition, a configuration may be adopted in which the respective coupling vias are provided from the floating diffusion FD and/or the VSS contact region 118 coupled to (or connected with) each of the pad sections 120 and 121 and the pad sections 120 and 121 are provided at desired positions in the wiring layer 100T and the insulating region 212 of the semiconductor layer 200S.

In particular, in a case where the pad sections 120 and 121 are provided in the wiring layer 100T, it is possible to decrease wiring lines that are coupled to (or connected with) the floating diffusion FD and/or the VSS contact region 118 in the insulating region 212 of the semiconductor layer 200S. This makes it possible to decrease the area of the insulating region 212 for forming a through wiring line for coupling from the floating diffusion FD to the pixel circuit 210 in the second substrate 200 in which the pixel circuit 210 is formed. It is thus possible to secure large area for the second substrate 200 where the pixel circuit 210 is formed. Securing the area of the pixel circuit 210 makes it possible to form a large pixel transistor and contribute to an increase in image quality by reducing noise, for example.

In particular, in a case where an FTI structure is used for the pixel separation section 117, it is preferable to provide the floating diffusion FD and/or the VSS contact region 118 to each of the pixels 541. The use of the configuration of the pad sections 120 and 121 makes it possible to considerably decrease wiring lines that couple (or connect) the first substrate 100 and the second substrate 200.

In addition, as illustrated in FIG. 7B, for example, the pad sections 120 to each of which the plurality of floating diffusions FD is coupled (or with each of which the plurality of floating diffusions FD is connected) and the pad sections 121 to each of which the plurality of VSS contact regions 118 is coupled (or with each of which the plurality of VSS contact regions 118 is connected) are alternately disposed straightly in the V direction. In addition, the pad sections 120 and 121 are formed at positions surrounded by the plurality of photodiodes PD, the plurality of transfer gates TG, and the plurality of floating diffusions FD. This makes it possible to freely dispose elements other than the floating diffusion FD and the VSS contact region 118 in the first substrate 100 in which a plurality of elements is formed. It is possible to achieve an efficient layout for the whole of the chip. In addition, symmetry is secured in the layout of elements formed in each of the pixel sharing units 539 and it is possible to suppress variations in the characteristics of each of the pixels 541.

The coupling between the pad section 120 and the floating diffusions FD is not coupling that is performed by using only planar surfaces parallel to the light incidence surface, but three-dimensional coupling. The three-dimensional coupling refers to a coupling form including a form in which the pad section 120 and the floating diffusions FD are coupled (or connected) on planar surfaces or curved surfaces crossing the light incidence surface. In this case, a portion of the pixel separation section 117 on the semiconductor layer 200S side sandwiched between the two floating diffusions FD adjacent to each other (that is referred to as an "upper end of the pixel separation section 117") is provided at a position receding from a surface of the semiconductor layer 100S on the semiconductor layer 200S side. The side surfaces of the respective floating diffusions FD are in contact with the pad section 120, for example, as illustrated in FIG. 8A. This makes it possible to increase coupling area between the pad section 120 and the floating diffusions FD as compared with the coupling area in a case where an upper surface of the upper end of the pixel separation section 117 is provided flush with the surface of the semiconductor layer 100S on the semiconductor layer 200S side. In addition, even in a case where the pixel 541 is miniaturized, it is possible to suppress a decrease in the coupling area between the pad section 120 and the floating diffusions FD.

Each of the pad sections 120 and 121 includes, for example, polysilicon (Poly Si). More specifically, each of the pad sections 120 and 121 includes doped polysilicon to which an impurity is added. It is preferable that each of the pad sections 120 and 121 include an electrically conductive material having high heat resistance such as polysilicon, tungsten (W), titanium (Ti), and titanium nitride (TiN). This makes it possible to form the pixel circuit 210 after the semiconductor layer 200S of the second substrate 200 is bonded to the first substrate 100. The following describes the reason for this. It is to be noted that the following description refers to a method of forming the pixel circuit 210 after bonding the first substrate 100 and the semiconductor layer 200S of the second substrate 200 together as first manufacturing method.

Here, it may also be conceivable to form the pixel circuit 210 in the second substrate 200 and then bond this to the first substrate 100 (this is referred to as a second manufacturing method below). In this second manufacturing method, respective electrodes for electrical coupling are formed in advance on the front surface (the front surface of the wiring layer 100T) of the first substrate 100 and the front surface (the front surface of the wiring layer 200T) of the second substrate 200. In a case where the first substrate 100 and the second substrate 200 are bonded together, the respective electrodes for electrical coupling that have been formed on the front surface of the first substrate 100 and the front surface of the second substrate 200 come into contact at the same time. This forms electrical coupling between a wiring line included in the first substrate 100 and a wiring line included in the second substrate 200. A configuration of the imaging device 1 in which the second manufacturing method is used thus allows for manufacturing by using, for example, an appropriate process in accordance with the respective configurations of the first substrate 100 and the second substrate 200. It is possible to manufacture a high-quality and high-performance imaging device.

The second manufacturing method like this may have an alignment error in boding the first substrate 100 and the second substrate 200 together because of a manufacturing device for bonding. In addition, the first substrate 100 and the second substrate 200 each have, for example, a diameter size of about several tens of cm. In a case where the first substrate 100 and the second substrate 200 are bonded together, these first substrate 100 and second substrate 200 may expand or contract in microscopic regions of the respective components of the substrates. This substrate expansion or contraction is brought about because the substrates come into contact at slightly different timings. Such expansion or contraction of the first substrate 100 and the second substrate 200 sometimes causes the respective electrodes for electrical coupling formed on the front surface of the first substrate 100 and the front surface of the second substrate 200 to have a positional error. In the second manufacturing method, it is preferable to take measures to bring the respective electrodes of the first substrate 100 and the second substrate 200 into contact in spite of such an error. Specifically, taking the error described above into consideration, at least one of the first substrate 100 or the second substrate 200 has a large electrode. More preferably, the first substrate 100 and the second substrate 200 both have large electrodes. For example, the use of the second manufacturing method therefore causes the size of an electrode formed on the front surface of the first substrate 100 or the second substrate 200 (the size of the substrate in the planar direction) to be larger than the size of an internal electrode extending from the inside of the first substrate 100 or the second substrate 200 to the front surface in the thickness direction.

Meanwhile, including an electrically conductive material having heat resistance in each of the pad sections 120 and 121 makes it possible to use the first manufacturing method described above. In the first manufacturing method, after the first substrate 100 is formed including the photodiode PD, the transfer transistor TR, and the like, this first substrate 100 and the second substrate 200 (semiconductor layer 2000S) are bonded together. The second substrate 200 then has not yet had patterns formed for an active element, a wiring layer, and the like included in the pixel circuit 210. No pattern has been formed on the second substrate 200 yet. Accordingly, even if the bonding position at which the first substrate 100 and the second substrate 200 are bonded together has an error, this bonding error causes no alignment error between a pattern of the first substrate 100 and a pattern of the second substrate 200. This is because the pattern of the second substrate 200 is formed after the first substrate 100 and the second substrate 200 are bonded together. It is to be noted that, in a case where a pattern is formed on the second substrate, for example, an exposure device for forming a pattern forms the pattern while subjecting the pattern formed on the first substrate to alignment. The reason described above prevents the bonding position error between the first substrate 100 and the second substrate 200 from being an obstacle to manufacture the imaging device 1 in the first manufacturing method. An error caused by the expansion or contraction of a substrate in the second manufacturing method is also no obstacle to manufacture the imaging device 1 in the first manufacturing method because of a similar reason.

After the first substrate 100 and the second substrate 200 (semiconductor layer 200S) are bonded together in this way, an active element is formed on the second substrate 200 in the first manufacturing method. After this, the through electrodes 120E and 121E and the through electrodes TGV (FIG. 6) are formed. To form these through electrodes 120E, 121E, and TGV, patterns for the through electrodes are formed, for example, by using reduced projection exposure by an exposure device from above the second substrate 200. Even if the second substrate 200 and the exposure device have an alignment error, the use of reduced exposure projection allows the error to have at most several tens of percent of the magnitude (the inverse of the reduced exposure projection magnification) of the error of the second manufacturing method described above in the second substrate 200. Adopting the configuration of the imaging device 1 that uses the first manufacturing method thus facilitates the respective elements formed on the first substrate 100 and the second substrate 200 to be aligned with each other and it is possible to manufacture a high-quality and high-performance imaging device.

The imaging device 1 manufactured by using the first manufacturing method like this has different features from those of an imaging device manufactured in the second manufacturing method. Specifically, in the imaging device 1 manufactured in the first manufacturing method, for example, each of the through electrodes 120E, 121E, and TGV has a substantially constant thickness (a size in the planar direction of the substrate) from the second substrate 200 to the first substrate 100. Alternatively, in a case where each of the through electrodes 120E, 121E, and TGV has a tapered shape, each of the through electrodes 120E, 121E, and TGV has a tapered shape with a constant inclination. The imaging device 1 including the through electrodes 120E, 121E, and TGV like these facilitates the pixels 541 to be miniaturized.

Here, in a case where the imaging device 1 is manufactured in the first manufacturing method, an active element is formed in the second substrate 200 after the first substrate 100 and the second substrate 200 (semiconductor layer 200S) are bonded together. Accordingly, heating treatment necessary to form the active element also influences the first substrate 100. It is therefore preferable to use electrically conductive materials each having high heat resistance for the pad sections 120 and 121 provided in the first substrate 100 as described above. For example, it is preferable to use a material having a higher melting point (i.e., higher heat resistance) than that of at least a portion of the wiring materials included in the wiring layer 200T of the second substrate 200 for each of the pad sections 120 and 121. For example, an electrically conductive material having high heat resistance such as doped polysilicon, tungsten, titanium, or titanium nitride is used for each of the pad sections 120 and 121. This makes it possible to manufacture the imaging device 1 by using the first manufacturing method described above.

Each of the pad sections 120 and 121 may include a metal material including tantalum nitride (TaN), aluminum (Al), copper (Cu), and the like.

The passivation film 122 is provided, for example, over the whole of the front surface of the semiconductor layer 100S to cover the pad sections 120 and 121 and the transfer transistor TR (transfer gate TG) (FIG. 6). The passivation film 122 includes, for example, a silicon nitride (SiN) film. The interlayer insulating film 123 covers the pad sections 120 and 121 with the passivation film 122 interposed in between. This interlayer insulating film 123 is provided over the whole of the front surface of the semiconductor layer 100S. The interlayer insulating film 123 includes, for example, a silicon oxide (SiO) film. The bonding film 124 is provided on the bonding surface between the first substrate 100 (specifically, the wiring layer 100T) and the second substrate 200. In other words, the bonding film 124 is in contact with the second substrate 200. This bonding film 124 is provided over the whole of the principal surface of the first substrate 100. The bonding film 124 includes, for example, a silicon nitride film.

The light receiving lens 401 is opposed to the semiconductor layer 100S, for example, with the fixed electric charge film 112 and the insulating film 111 interposed in between (FIG. 6). The light receiving lens 401 is provided, for example, at a position opposed to the photodiode PD of each of the pixels 541A, 541B, 541C, and 541D.

The second substrate 200 includes the semiconductor layer 200S and the wiring layer 200T in this order from the first substrate 100 side. The semiconductor layer 200S includes a silicon substrate. The semiconductor layer 200S is provided with a well region 211 in the thickness direction. The well region 211 is, for example, a p-type semiconductor region. The second substrate 200 is provided with the pixel circuit 210 disposed for each of the pixel sharing units 539. This pixel circuit 210 is provided, for example, on the front surface side (the wiring layer 200T side) of the semiconductor layer 200S. In the imaging device 1, the second substrate 200 is bonded to the first substrate 100 to cause the back surface side (the semiconductor layer 200S side) of the second substrate 200 to be opposed to the front surface side (the wiring layer 100T side) of the first substrate 100. In other words, the second substrate 200 is bonded to the first substrate 100 in a face-to-back manner.

Each of FIGS. 9 to 13 schematically illustrates an example of a planar configuration of the second substrate 200. FIG. 9 illustrates a configuration of the pixel circuit 210 provided near the front surface of the semiconductor layer 200S. FIG. 10 schematically illustrates a configuration of the wiring layer 200T (specifically, a first wiring layer W1 described below) and the respective components of the semiconductor layer 200S and the first substrate 100 coupled to (or connected with) the wiring layer 200T. Each of FIGS. 11 to 13 illustrates an example of a planar configuration of the wiring layer 200T. The following describes a configuration of the second substrate 200 with reference to FIGS. 9 to 13 along with FIG. 6. Each of FIGS. 9 and 10 illustrates the external shape (the boundary between the pixel separation section 117 and the photodiode PD) of the photodiode PD as a dashed line and illustrates, as a dotted line, the boundary between a portion of the semiconductor layer 200S overlapping with the gate electrode of each of the transistors included in the pixel circuit 210 and an element separation region 213 or the insulating region 212. One of the sides of a portion of the amplification transistor AMP overlapping with the gate electrode in the channel width direction is provided with the boundary between the semiconductor layer 200S and the element separation region 213 and the boundary between the element separation region 213 and the insulating region 212. The following describes a configuration of the second substrate 200 with reference to FIGS. 9 to 13 along with FIG. 6.

The second substrate 200 is provided with the insulating region 212 that divides the semiconductor layer 200S and the element separation region 213 provided in a portion of the semiconductor layer 200S in the thickness direction (FIG. 6). For example, the through electrodes 120E and 121E and the through electrodes TGV (through electrodes TGV1, TGV2, TGV3, and TGV4) of the two pixel sharing units 539 are disposed in the insulating region 212 (FIG. 11). The insulating region 212 is provided between the two pixel circuits 210 adjacent in the H direction. The two pixel sharing units 539 are coupled to (or connected with) these two pixel circuits 210.

The insulating region 212 has substantially the same thickness as the thickness of the semiconductor layer 200S (FIG. 6). The semiconductor layer 200S is divided by this insulating region 212. The through electrodes 120E and 121E and the through electrodes TGV are disposed in this insulating region 212. The insulating region 212 includes, for example, silicon oxide. The through electrodes 120E and 121E are provided to penetrate the insulating region 212 in the thickness direction. The upper ends of the through electrodes 120E and 121E are coupled to (or connected with) wiring lines (the first wiring layer W1, a second wiring layer W2, a third wiring layer W3, and a fourth wiring layer W4 described below) of the wiring layer 200T. These through electrodes 120E and 121E are provided to penetrate the insulating region 212, the bonding film 124, the interlayer insulating film 123, and the passivation film 122. Lower ends of the through electrodes 120E and 121E are coupled to (or connected with) the pad sections 120 and 121 (FIG. 6). The through electrode 120E is for electrically coupling (or connecting) the pad section 120 and the pixel circuit 210. In other words, the through electrode 120E electrically couples the floating diffusion FD of the first substrate 100 to the pixel circuit 210 of the second substrate 200 (or electrically connects the floating diffusion FD of the first substrate 100 with the pixel circuit 210 of the second substrate 200). The through electrode 121E is for electrically coupling (or connecting) the pad section 121 and the reference electric potential line VSS of the wiring layer 200T. In other words, the through electrode 121E electrically couples the VSS contact region 118 of the first substrate 100 to the reference electric potential line VSS of the second substrate 200 (or electrically connects the VSS contact region 118 of the first substrate 100 with the reference electric potential line VSS of the second substrate 200).

The through electrode TGV is provided to penetrate the insulating region 212 in the thickness direction. The upper end of the through electrode TGV is coupled to (or connected with) a wiring line of the wiring layer 200T. This through electrode TGV is provided to penetrate the insulating region 212, the bonding film 124, the interlayer insulating film 123, the passivation film 122, and the interlayer insulating film 119. A lower end of the through electrode TGV is coupled to (or connected with) the transfer gate TG (FIG. 6). The through electrode TGV like this is for electrically coupling (or connecting) the transfer gate TG (each of transfer gates TG1, TG2, TG3, and TG4) of each of the pixels 541A, 541B, 541C, and 541D and each of wiring lines (a portion of the row drive signal lines 542 or each of wiring lines TRG1, TRG2, TRG3, and TRG4 in FIG. 10 described below in specific terms) of the wiring layer 200T. In other words, the through electrodes TGV electrically couple the transfer gates TG of the first substrate 100 to the wiring lines TRG of the second substrate 200 (or electrically connect the transfer gates TG of the first substrate 100 with the wiring lines TRG of the second substrate 200) and drive signals are sent to the respective transfer transistors TR (the transfer transistors TR1, TR2, TR3, and TR4).

The insulating region 212 is a region in which the through electrodes 120E and 121E and the through electrodes TGV described above are provided to be insulated from the semiconductor layer 200S. The through electrodes 120E and 121E and the through electrodes TGV are for electrically coupling (or connecting) the first substrate 100 and the second substrate 200. For example, the through electrodes 120E and 121E and the through electrodes TGV (the through electrodes TGV1, TGV2, TGV3, and TGV4) are disposed in the insulating region 212. The insulating region 212 is provided between the two pixel circuits 210 (pixel sharing units 539) adjacent in the H direction. The through electrodes 120E and 121E and the through electrodes TGV (the through electrodes TGV1, TGV2, TGV3, and TGV4) are coupled to (or connected with) these two pixel circuits 210. The insulating region 212 is provided, for example, to extend in the V direction (FIGS. 8A and 8B). Here, the horizontal portion TGb of the transfer gate TG is resourcefully disposed to bring the position of the through electrode TGV in the H direction closer to the positions of the through electrodes 120E and 121E in the H direction than the position of the vertical portion TGa (FIG. 7A). For example, the through electrode TGV is disposed at substantially the same position in the H direction as those of the through electrodes 120E and 120E. This allows the insulating region 212 extending in the V direction to be provided with the through electrodes 120E and 121E and the through electrode TGV together. It may also be conceivable as another disposition example to provide the horizontal portion TGb in only a region that is superimposed on the vertical portion TGa. In this case, the through electrode TGV is formed substantially right above the vertical portion TGa. For example, the through electrode TGV is disposed in the substantially middle portion of each of the pixels 541 in the H direction and the V direction. The position of the through electrode TGV in the H direction and the positions of the through electrodes 120E and 121E in the H direction then have a great mismatch. For example, the insulating region 212 is provided around the through electrodes TGV and the through electrodes 120E and 121E to electrically insulate the through electrodes TGV and the through electrodes 120E and 121E from the close semiconductor layer 200S. In a case where the position of the through electrode TGV in the H direction and the positions of the through electrodes 120E and 121E in the H direction are much apart, it is necessary to independently provide the insulating regions 212 around the respective through electrodes 120E, 121E, and TGV. This divides the semiconductor layer 200S into small pieces. Compared with this, a layout in which the through electrodes 120E and 121E and the through electrode TGV are disposed together in the insulating region 212 extending in the V direction allows the semiconductor layer 200S to have a larger size in the H direction. This makes it possible to secure large area for a semiconductor element formation region in the semiconductor layer 200S. This allows, for example, the amplification transistor AMP to have a larger size and makes it possible to suppress noise.

In addition, the imaging device 1 is provided with the pad section 120 in the first substrate 100. The through electrode 120E is therefore provided for each of the pixel sharing units 539. Further, the first substrate 100 is provided with the pad section 121. The through electrode 121E is therefore provided for every four pixels (the pixels 541A, 541B, 541C, and 541D). This makes it possible to decrease the number of through electrodes 120E and 121E and make the insulating region 212 small. The following describes the reason for this.

The element separation region 213 is provided on the front surface side of the semiconductor layer 200S. The element separation region 213 has an STI (Shallow Trench Isolation) structure. In this element separation region 213, the semiconductor layer 200S is dug in the thickness direction (the direction vertical to the principal surface of the second substrate 200) and this dug portion is filled with an insulating film. This insulating film includes, for example, silicon oxide. The element separation region 213 performs element separation between the plurality of transistors included in the pixel circuit 210 in accordance with the layout of the pixel circuit 210. The semiconductor layer 200S (specifically, the well region 211) extends under the element separation region 213 (a deep portion of the semiconductor layer 200S).

Here, with reference to FIGS. 7A, 7B, and 9, a difference is described between the external shape (the external shape in the planar direction of the substrate) of the pixel sharing unit 539 in the first substrate 100 and the external shape of the pixel sharing unit 539 in the second substrate 200.

In the imaging device 1, the pixel sharing units 539 are provided in both the first substrate 100 and the second substrate 200. For example, the external shape of the pixel sharing unit 539 provided in the first substrate 100 and the external shape of the pixel sharing unit 539 provided in the second substrate 200 are different from each other.

Each of FIGS. 7A and 7B illustrates the external shape line of each of the pixels 541A, 541B, 541C, and 541D as a one-dot chain line and illustrates the external shape of the pixel sharing unit 539 as a thick line. For example, the pixel sharing unit 539 of the first substrate 100 includes the two pixels 541 (the pixels 541A and 541B) disposed to be adjacent in the H direction and the two pixels 541 (the pixels 541C and 541D) disposed to be adjacent thereto in the V direction. In other words, the pixel sharing unit 539 of the first substrate 100 includes the four adjacent pixels 541 in two rows and two columns. The pixel sharing unit 539 of the first substrate 100 has a substantially square external shape. In the pixel array unit 540, the pixel sharing units 539 like these are arranged to be adjacent at a 2-pixel pitch (a pitch corresponding to the two pixels 541) in the H direction and a 2-pixel pitch (a pitch corresponding to the two pixels 541) in the V direction.

Each of FIGS. 9 and 10 illustrates the external shape line of each of the pixels 541A, 541B, 541C, and 541D as a one-dot chain line and illustrates the external shape of the pixel sharing unit 539 as a thick line. For example, the external shape of the pixel sharing unit 539 of the second substrate 200 is smaller than that of the pixel sharing unit 539 of the first substrate 100 in the H direction and larger than that of the pixel sharing unit 539 of the first substrate 100 in the V direction. For example, the pixel sharing unit 539 of the second substrate 200 is formed to have a size (region) corresponding to one pixel in the H direction and is formed to have a size corresponding to four pixels in the V direction. In other words, the pixel sharing unit 539 of the second substrate 200 is formed to have a size corresponding to adjacent pixels arranged in one row and four columns. The pixel sharing unit 539 of the second substrate 200 has a substantially rectangular external shape.

For example, in each of the pixel circuits 210, the selection transistor SEL, the amplification transistor AMP, the reset transistor RST, and the FD conversion gain switching transistor FDG are disposed in line in this order in the V direction (FIG. 9). Providing each of the pixel circuits 210 in a substantially rectangular external shape as described above makes it possible to dispose the four transistors (the selection transistor SEL, the amplification transistor AMP, the reset transistor RST, and the FD conversion gain switching transistor FDG) in line in one direction (the V direction in FIG. 9). This makes it possible to share the drain of the amplification transistor AMP and the drain of the reset transistor RST in one diffusion region (a diffusion region coupled to (or connected with) the power supply line VDD). For example, it is also possible to provide the formation region of each of the pixel circuits 210 in a substantially square shape. In this case, two transistors are disposed along one direction and it is difficult to share the drain of the amplification transistor AMP and the drain of the reset transistor RST in one diffusion region. Providing the formation region of the pixel circuit 210 in a substantially rectangular shape facilitates the four transistors to be closely disposed and makes it possible to decrease the size of the formation region of the pixel circuit 210. In other words, it is possible to miniaturize the pixels. In addition, in a case where there is no need to decrease the size of the formation region of the pixel circuit 210, it is possible to increase the size of the formation region of the amplification transistor AMP and suppress noise.

For example, there is provided a VSS contact region 218 to be coupled to (or connected with) the reference electric potential line VSS near the front surface of the semiconductor layer 200S in addition to the selection transistor SEL, the amplification transistor AMP, the reset transistor RST, and the FD conversion gain switching transistor FDG. The VSS contact region 218 includes, for example, a p-type semiconductor region. The VSS contact region 218 is electrically coupled to (or connected with) the VSS contact region 118 of the first substrate 100 (semiconductor layer 100S) through a wiring line of the wiring layer 200T and the through electrode 121E. This VSS contact region 218 is provided, for example, at a position adjacent to the source of the FD conversion gain switching transistor FDG with the element separation region 213 interposed in between (FIG. 9).

Next, with reference to FIGS. 7B and 9, the positional relationship is described between the pixel sharing unit 539 provided in the first substrate 100 and the pixel sharing unit 539 provided in the second substrate 200. For example, one (e.g., the upper side of FIG. 7B) of the pixel sharing units 539 among the two pixel sharing units 539 of the first substrate 100 arranged in the V direction is coupled to (or connected with) one (e.g., the left side of FIG. 9) of the pixel sharing units 539 among the two pixel sharing units 539 of the second substrate 200 arranged in the H direction. For example, the other (e.g., the lower side of FIG. 7B) of the pixel sharing units 539 among the two pixel sharing units 539 of the first substrate 100 arranged in the V direction is coupled to (or connected with) the other (e.g., the right side of FIG. 9) of the pixel sharing units 539 among the two pixel sharing units 539 of the second substrate 200 arranged in the H direction.

For example, in the two pixel sharing units 539 of the second substrate 200 arranged in the H direction, the internal layout (the disposition of transistors and the like) of one of the pixel sharing units 539 is substantially the same as the layout obtained by inverting the internal layout of the other pixel sharing unit 539 in the V direction and the H direction. The following describes an effect offered by this layout.

In the two pixel sharing units 539 of the first substrate 100 arranged in the V direction, the respective pad sections 120 are disposed in the middle portions of the external shapes of the pixel sharing units 539. In other words, the respective pad sections 120 are disposed in the middle portions of the pixel sharing units 539 in the V direction and the H direction (FIG. 7B). In contrast, the pixel sharing unit 539 of the second substrate 200 has a substantially rectangular external shape that is long in the V direction as described above. For example, the amplification transistor AMP coupled to (or connected with) the pad section 120 is therefore disposed at a position shifted from the middle of the pixel sharing unit 539 to the upper side of the diagram in the V direction. For example, in a case where the two pixel sharing units 539 of the second substrate 200 arranged in the H direction have the same internal layout, the distance is relatively short between the amplification transistor AMP and the pad section 120 (e.g., the pad section 120 of the pixel sharing unit 539 on the upper side of FIG. 7B) of one of the pixel sharing units 539. The distance is, however, long between the amplification transistor AMP and the pad section 120 (e.g., the pad section 120 of the pixel sharing unit 539 on the lower side of FIG. 7B) of the other pixel sharing unit 539. This increases the area of a wiring line necessary to couple (or connect) these amplification transistor AMP and pad section 120. The wiring layout of the pixel sharing unit 539 may be complicated. This may possibly influence the miniaturization of the imaging device 1.

As a countermeasure for this, the respective internal layouts of the two pixel sharing units 539 of the second substrate 200 arranged in the H direction are inverted from each other in at least the V direction, thereby making it possible to decrease the distance between the amplification transistors AMP and the pad sections 120 of both of these two pixel sharing units 539. This makes it easier to miniaturize the imaging device 1 than the configuration does in which the two pixel sharing units 539 of the second substrate 200 arranged in the H direction have the same internal layout. It is to be noted that each of FIGS. 7A and 7B illustrates that the planar layout of each of the plurality of pixel sharing units 539 of the second substrate 200 has bilateral symmetry, but bilateral asymmetry in a case where the layout of the first wiring layer W1 illustrated in FIG. 9 described above is taken into consideration.

In addition, it is preferable that the internal layouts of the two pixel sharing units 539 of the second substrate 200 arranged in the H direction be also inverted in the H direction. The following describes the reason for this. As illustrated in FIG. 10, the two respective pixel sharing units 539 of the second substrate 200 arranged in the H direction are coupled to (or connected with) the pad sections 120 and 121 of the first substrate 100. For example, the pad sections 120 and 121 are disposed in the middle portion (between the two pixel sharing units 539 arranged in the H direction) of the two pixel sharing units 539 of the second substrate 200 in the H direction. The two pixel sharing units 539 of the second substrate 200 are arranged in the H direction. This makes it possible to decrease the distance between the plurality of respective pixel sharing units 539 of the second substrate 200 and the pad sections 120 and 121 by additionally inverting, in the H direction, the internal layouts of the two pixel sharing units 539 of the second substrate 200 arranged in the H direction from each other. In other words, it is further easier to miniaturize the imaging device 1.

In addition, the position of the external shape line of the pixel sharing unit 539 of the second substrate 200 does not have to match the position of the external shape line of any of the pixel sharing units 539 of the first substrate 100. For example, the external shape line of one (e.g., the upper side of FIG. 10) of the sides of one (e.g., the left side of FIG. 10) of the pixel sharing units 539 in the V direction among the two pixel sharing units 539 of the second substrate 200 arranged in the H direction is disposed outside the external shape line of one of the sides of the corresponding pixel sharing unit 539 (e.g., the upper side of FIG. 7B) of the first substrate 100 in the V direction. In addition, the external shape line of the other (e.g., the lower side of FIG. 10) of the sides of the other (e.g., the right side of FIG. 10) of the pixel sharing units 539 in the V direction among the two pixel sharing units 539 of the second substrate 200 arranged in the H direction is disposed outside the external shape line of the other of the sides of the corresponding pixel sharing unit 539 (e.g., the lower side of FIG. 7B) of the first substrate 100 in the V direction. The pixel sharing unit 539 of the second substrate 200 and the pixel sharing unit 539 of the first substrate 100 are each disposed in this way, thereby making it possible to decrease the distance between the amplification transistors AMP and the pad sections 120. This facilitates the imaging device 1 to be miniaturized.

In addition, the positions of the respective external shape lines do not have to match each other between the plurality of pixel sharing units 539 of the second substrate 200. For example, the external shape lines of the two pixel sharing units 539 of the second substrate 200 arranged in the H direction are disposed at positions shifted in the V direction. This makes it possible to decrease the distance between the amplification transistors AMP and the pad sections 120. This facilitates the imaging device 1 to be miniaturized.

With reference to FIGS. 7B and 10, the repeated disposition of the pixel sharing units 539 in the pixel array unit 540 is described. The pixel sharing unit 539 of the first substrate 100 has a size of the two pixels 541 in the H direction and a size of the two pixels 541 in the V direction (FIG. 7B). For example, in the pixel array unit 540 of the first substrate 100, these pixel sharing units 539 each having a size corresponding to the four pixels 541 are repeatedly arranged to be adjacent at a 2-pixel pitch (a pitch corresponding to the two pixels 541) in the H direction and a 2-pixel pitch (a pitch corresponding to the two pixels 541) in the V direction. Alternatively, the pixel array unit 540 of the first substrate 100 may be provided with the pair of pixel sharing units 539 including the two pixel sharing units 539 disposed to be adjacent in the V direction. In the pixel array unit 540 of the first substrate 100, for example, these paired pixel sharing units 539 are repeatedly arranged to be adjacent at a 2-pixel pitch (a pitch corresponding to the two pixels 541) in the H direction and a 4-pixel pitch (a pitch corresponding to the four pixels 541) in the V direction. The pixel sharing unit 539 of the second substrate 200 has a size of the one pixel 541 in the H direction and a size of the four pixels 541 in the V direction (FIG. 10). For example, the pixel array unit 540 of the second substrate 200 is provided with the pair of pixel sharing units 539 including the two pixel sharing units 539 each having a size corresponding to these four pixels 541. These pixel sharing units 539 are disposed to be adjacent in the H direction and shift in the V direction. In the pixel array unit 540 of the second substrate 200, for example, these paired pixel sharing units 539 are repeatedly arranged to be adjacent at a 2-pixel pitch (a pitch corresponding to the two pixels 541) in the H direction and a 4-pixel pitch (a pitch corresponding to the four pixels 541)

in the V direction with no gaps. The repeated disposition of the pixel sharing units 539 like this makes it possible to dispose the pixel sharing units 539 with no gaps. This facilitates the imaging device 1 to be miniaturized.

It is preferable that the amplification transistor AMP have, for example, a three-dimensional structure such as a fin (Fin) structure (FIG. 6). For example, the Fin amplification transistor AMP includes a fin including a portion of the semiconductor layer 200S, a gate electrode having three planar surfaces that surround this fin, and a gate insulating film provided between the gate electrode and the fin. A transistor having a three-dimensional structure is a transistor in which a gate electrode opposed to a channel is provided with a plurality of planar surfaces or a transistor in which the gate electrode is provided with a curved surface around the channel. In a case where such a transistor having a three-dimensional structure has the same footprint (occupied area in FIG. 9) as that of a planar transistor, it is possible to increase an effective gate width as compared with that of the planar transistor. This causes a lot of currents to pass through the transistor having a three-dimensional structure and increases transconductance gm. This makes it possible to increase operation speed of the transistor having a three-dimensional structure as compared with that of the planar transistor. In addition, it is also possible to reduce RN (Random Noise). In addition, the transistor having a three-dimensional structure has larger gate area than that of the planar transistor. This decreases RTS (Random Telegraph Signal) noise.

The use of such a transistor having a three-dimensional structure for at least any one of the amplification transistor AMP, the selection transistor SEL, the reset transistor RST, or the FD transfer transistor FDG increases transistor characteristics and makes it possible to increase, for example, the image quality. In particular, in a case where the amplification transistor AMP includes the transistor having a three-dimensional structure, noise is effectively reduced. This makes it possible to increase the image quality. In addition, all of the amplification transistor AMP, the selection transistor SEL, the reset transistor RST, and the FD transfer transistor FDG may include the transistors each having a three-dimensional structure. In this case, it is easier to manufacture the pixel circuit 210.

Next, with reference to FIGS. 11 to 13, a planar configuration of the wiring layer 200T is described. FIG. 11 illustrates an example of a planar configuration of the first wiring layer W1 and the second wiring layer W2. FIG. 123 illustrates an example of a planar configuration of the second wiring layer W2 and the third wiring layer W3. FIG. 13 illustrates an example of a planar configuration of the third wiring layer W3 and the fourth wiring layer W4.

For example, the third wiring layer W3 includes the wiring lines TRG1, TRG2, TRG3, TRG4, SELL, RSTL, and FDGL extending in the H direction (row direction) (FIG. 12). These wiring lines correspond to the plurality of row drive signal lines 542 described with reference to FIG. 4. The wiring lines TRG1, TRG2, TRG3, and TRG4 are for respectively sending drive signals to the transfer gates TG1, TG2, TG3, and TG4. The wiring lines TRG1, TRG2, TRG3, and TRG4 are respectively coupled to (or connected with) the transfer gates TG1, TG2, TG3, and TG4 through the second wiring layer W2, the first wiring layer W1, and the through electrode 120E. The wiring line SELL, the wiring line RSTL, and the wiring line FDGL are for respectively sending drive signals to the gate of the selection transistor SEL, the gate of the reset transistor RST, and the gate of the FD conversion gain switching transistor FDG. The wiring lines SELL, RSTL, and FDGL are respectively coupled to (or connected with) the respective gates of the selection transistor SEL, the reset transistor RST, and the FD conversion gain switching transistor FDG through the second wiring layer W2, the first wiring layer W1, and the coupling section.

For example, the fourth wiring layer W4 includes the power supply line VDD, the reference electric potential line VSS, and the vertical signal line 543 extending in the V direction (column direction) (FIG. 13). The power supply line VDD is coupled to (or connected with) the drain of the amplification transistor AMP and the drain of the reset transistor RST through the third wiring layer W3, the second wiring layer W2, the first wiring layer W1, and the coupling section. The reference electric potential line VSS is coupled to (or connected with) the VSS contact region 218 through the third wiring layer W3, the second wiring layer W2, the first wiring layer W1, and a coupling section 218V. In addition, the reference electric potential line VSS is coupled to (or connected with) the VSS contact region 118 of the first substrate 100 through the third wiring layer W3, the second wiring layer W2, the first wiring layer W1, the through electrode 121E, and the pad section 121. The vertical signal line 543 is coupled to (or connected with) the source (Vout) of the selection transistor SEL through the third wiring layer W3, the second wiring layer W2, the first wiring layer W1, and the coupling section.

The contact sections 201 and 202 may be provided at positions overlapping with the pixel array unit 540 in a plan view (e.g., FIG. 3) or may be provided in the peripheral portion 540B outside the pixel array unit 540 (e.g., FIG. 6). The contact sections 201 and 202 are provided on the front surface (the surface on the wiring layer 200T side) of the second substrate 200. Each of the contact sections 201 and 202 includes, for example, metal such as Cu (copper) and Al (aluminum). The contact sections 201 and 202 are exposed from the front surface (the surface on the third substrate 300 side) of the wiring layer 200T. Each of the contact sections 201 and 202 is used to electrically couple (or connect) the second substrate 200 and the third substrate 300 and bond the second substrate 200 and the third substrate 300 together.

FIG. 6 illustrates an example in which the peripheral portion 540B of the second substrate 200 is provided with a peripheral circuit. This peripheral circuit may include a portion of the row drive unit 520, a portion of the column signal processing unit 550, or the like. In addition, as illustrated in FIG. 3, no peripheral circuit is disposed in the peripheral portion 540B of the second substrate 200, but the coupling hole sections H1 and H2 may be disposed near the pixel array unit 540.

The third substrate 300 includes, for example, the wiring layer 300T and the semiconductor layer 300S in this order from the second substrate 200 side. For example, the front surface of the semiconductor layer 300S is provided on the second substrate 200 side. The semiconductor layer 300S includes a silicon substrate. This portion of the semiconductor layer 300S on the front surface side is provided with a circuit. Specifically, the portion of the semiconductor layer 300S on the front surface side is provided, for example, with at least a portion of the input unit 510A, the row drive unit 520, the timing control unit 530, the column signal processing unit 550, the image signal processing unit 560, and the output unit 510B. The wiring layer 300T provided between the semiconductor layer 300S and the second substrate 200 includes, for example, an interlayer insulating film, a plurality of wiring layers separated by this interlayer insulating film, and the contact sections 301 and 302. The contact sections 301 and 302 are exposed from the front surface (the surface on the second substrate 200 side) of the wiring layer 300T. The contact section 301 and the contact section 302 are respectively in contact with the contact section 201 of the second substrate 200 and the contact section 202 of the second substrate 200. Each of the contact sections 301 and 302 is electrically coupled to (or connected with) a circuit (e.g., at least any of the input unit 510A, the row drive unit 520, the timing control unit 530, the column signal processing unit 550, the image signal processing unit 560, and the output unit 510B) formed in the semiconductor layer 300S. Each of the contact sections 301 and 302 includes, for example, metal such as Cu (copper) and aluminum (Al). For example, an external terminal TA is coupled to (or connected with) the input unit 510A through the coupling hole section H1 and an external terminal TB is coupled to (or connected with) the output unit 510B through the coupling hole section H2.

Here, the features of the imaging device 1 are described.

The imaging device typically includes a photodiode and a pixel circuit as main components. Here, the photodiode having larger area increases electric charge resulting from photoelectric conversion, improves the signal/noise ratio (S/N ratio) of pixel signals as a result, and allows the imaging device to output more favorable image data (image information). In contrast, a transistor having a larger size (especially an amplification transistor having a larger size) that is included in the pixel circuit decreases noise generated by the pixel circuit, improves the S/N ratio of imaging signals as a result, and allows the imaging device to output more favorable image data (image information).

However, in a case where the imaging device is provided with a photodiode and a pixel circuit in the same semiconductor substrate and the photodiode has larger area in the limited area of the semiconductor substrate, it is conceivable that a transistor included in the pixel circuit has a smaller size. In addition, in a case where the transistor included in the pixel circuit has a larger size, it is conceivable that the photodiode has smaller area.

To address these issues, for example, the imaging device 1 according to the present embodiment uses a structure in which the plurality of pixels 541 shares the one pixel circuit 210 and the shared pixel circuit 210 is disposed to be superimposed on the photodiodes PD. This makes it possible to increase the area of the photodiode PD as much as possible and increase the size of a transistor included in the pixel circuit 210 as much as possible in the limited area of the semiconductor substrate. This makes it possible to improve the S/N ratio of pixel signals and allows the imaging device 1 to output more favorable image data (image information).

In a case where a structure is achieved in which the plurality of pixels 541 shares the one pixel circuit 210 and the pixel circuit 210 is disposed to be superimposed on the photodiodes PD, a plurality of wiring lines coupled to (or connected with) the one pixel circuit 210 extends from the floating diffusions FD of the plurality of respective pixels 541. To secure larger area for the semiconductor substrate (second substrate 200) where the pixel circuit 210 is formed, for example, it is possible to form a coupling wiring line that couples the plurality of these extending wiring lines to each other (or connects the plurality of these extending wiring lines with each other) and bunches them together. The same applies to a plurality of wiring lines extending from the VSS contact region 118. It is possible to form a coupling wiring line that couples the plurality of extending wiring lines to each other (or connects the plurality of extending wiring lines with each other) and bunches them together.

For example, in a case where a coupling wiring line that couples a plurality of wiring lines extending from the floating diffusions FD of the plurality of respective pixels 541 to each other (or connects the plurality of wiring lines extending from the floating diffusions FD of the plurality of respective pixels 541 with each other) is formed in the semiconductor substrate 200 in which the pixel circuit 210 is formed, it is conceivable that the area for forming a transistor included in the pixel circuit 210 is decreased. Similarly, in a case where a coupling wiring line that couples a plurality of wiring lines extending from the VSS contact region 118 of the plurality of respective pixels 541 to each other (or connects the plurality of wiring lines extending from the VSS contact region 118 of the plurality of respective pixels 541 with each other) and bunches them together is formed in the semiconductor substrate (second substrate 200) in which the pixel circuit 210 is formed, it is conceivable that this decreases the area for forming a transistor included in the pixel circuit 210.

To address these issues, for example, the imaging device 1 according to the present embodiment is able to have a structure in which the plurality of pixels 541 shares the one pixel circuit 210, the shared pixel circuit 210 is disposed to be superimposed on the photodiodes PD, and the first substrate 100 is provided with a coupling wiring line that couples the floating diffusions FD of the plurality of respective pixels 541 described above to each other (or connects the floating diffusions FD of the plurality of respective pixels 541 described above with each other) and bunches them together and a coupling wiring line that couples the VSS contact regions 118 included in the plurality of respective pixels 541 described above to each other (or connects the VSS contact regions 118 included in the plurality of respective pixels 541 described above with each other) and bunches them together.

Here, in a case where the second manufacturing method described above is used as a manufacturing method for providing the first substrate 100 with a coupling wiring line that couples the floating diffusions FD of the plurality of respective pixels 541 described above to each other (or connects the floating diffusions FD of the plurality of respective pixels 541 described above with each other) and bunches them together and a coupling wiring line that couples the VSS contact regions 118 of the plurality of respective pixels 541 described above to each other (or connects the VSS contact regions 118 of the plurality of respective pixels 541 described above with each other) and bunches them together, manufacturing is possible by using, for example, an appropriate process in accordance with the respective configurations of the first substrate 100 and the second substrate 200. It is possible to manufacture a high-quality and high-performance imaging device. In addition, it is possible to form the coupling wiring lines of the first substrate 100 and the second substrate 200 in an easy process. Specifically, in a case where the second manufacturing method described above is used, the front surface of the first substrate 100 and the front surface of the second substrate 200 that serve as the bonding boundary surface between the first substrate 100 and the second substrate 200 are provided with an electrode that is coupled to (or connected with) the floating diffusion FD and an electrode that is coupled to (or connected with) the VSS contact region 118. Further, to bring the electrodes formed on the front surfaces of these two substrates into contact even in a case where the positions of the electrodes provided on the front surfaces of these two substrates do not match each other when the first substrate 100 and the second substrate 200 are bonded together, it is preferable to increase the size of the electrodes formed on the front surfaces of these two substrates. In this case, it is conceivable that the electrodes are difficult to dispose in the limited area of the respective pixels included in the imaging device 1.

To address the issue with the necessity of large electrodes on the bonding boundary surface between the first substrate 100 and the second substrate 200, for example, the imaging device 1 according to the present embodiment is able to use the first manufacturing method described above as a manufacturing method in which the plurality of pixels 541 shares the one pixel circuit 210 and the shared pixel circuit 210 is disposed to be superimposed on the photodiodes PD. This facilitates the respective elements formed on the first substrate 100 and the second substrate 200 to be aligned with each other and makes it possible to manufacture a high-quality and high-performance imaging device. Further, it is possible to include a unique structure caused by the use of this manufacturing method. In other words, a structure is included in which the semiconductor layer 100S and the wiring layer 100T of the first substrate 100 and the semiconductor layer 200S and the wiring layer 200T of the second substrate 200 are stacked in this order. In other words, a structure is included in which the first substrate 100 and the second substrate 200 are stacked in a face-to-back manner. In addition, the through electrodes 120E and 121E are included that penetrate the semiconductor layer 200S and the wiring layer 100T of the first substrate 100 from the front surface side of the semiconductor layer 200S of the second substrate 200 and reach the front surface of the semiconductor layer 100S of the first substrate 100.

In a structure in which the first substrate 100 is provided with a coupling wiring line that couples the floating diffusions FD of the plurality of respective pixels 541 described above to each other (or connects the floating diffusions FD of the plurality of respective pixels 541 described above with each other) and bunches them together and a coupling wiring line that couples the VSS contact regions 118 of the plurality of respective pixels 541 described above to each other (or connects the VSS contact regions 118 of the plurality of respective pixels 541 described above with each other) and bunches them together, the influence of heating treatment necessary to form an active element included in the pixel circuit 210 may be exerted over the coupling wiring lines described above that have been formed in the first substrate 100 in a case where this structure and the second substrate 200 are stacked by using the first manufacturing method described above and the pixel circuit 210 is formed on the second substrate 200.

Accordingly, to address the issue with the influence of heating treatment on the coupling wiring lines described above in a case where the active element described above is formed, it is desirable in the imaging device 1 according to the present embodiment to use electrically conductive materials each having high heat resistance for the coupling wiring line that couples the floating diffusions FD of the plurality of respective pixels 541 described above to each other (or connects the floating diffusions FD of the plurality of respective pixels 541 described above with each other) and bunches them together and the coupling wiring line that couples the VSS contact regions 118 of the plurality of respective pixels 541 described above to each other (or connects the VSS contact regions 118 of the plurality of respective pixels 541 described above with each other) and bunches them together. Specifically, a material having a higher melting point than that of at least a portion of the wiring materials included in the wiring layer 200T of the second substrate 200 is usable as each of the electrically conductive materials having high heat resistance.

In this way, for example, the imaging device 1 according to the present embodiment includes (1) a structure in which the first substrate 100 and the second substrate 200 are stacked in a face-to-back manner (specifically, a structure in which the semiconductor layer 100S and the wiring layer 100T of the first substrate 100 and the semiconductor layer 200S and the wiring layer 200T of the second substrate 200 are stacked in this order), (2) a structure in which the through electrodes 120E and 121E are provided that penetrate the semiconductor layer 200S and the wiring layer 100T of the first substrate 100 from the front surface side of the semiconductor layer 200S of the second substrate 200 and reach the front surface of the semiconductor layer 100S of the first substrate 100, and (3) a structure in which the coupling wiring line that couples the floating diffusions FD included in the plurality of respective pixels 541 to each other (or connects the floating diffusions FD included in the plurality of respective pixels 541 with each other) and bunches them together and the coupling wiring line that couples the VSS contact regions 118 included in the plurality of respective pixels 541 to each other (or connects the VSS contact regions 118 included in the plurality of respective pixels 541 with each other) and bunches them together are formed by using electrically conductive materials each having high heat resistance. This makes it possible to provide the first substrate 100 with the coupling wiring line that couples the floating diffusions FD included in the plurality of respective pixels 541 to each other (or connects the floating diffusions FD included in the plurality of respective pixels 541 with each other) and bunches them together and the coupling wiring line that couples the VSS contact regions 118 included in the plurality of respective pixels 541 to each other (or connects the VSS contact regions 118 included in the plurality of respective pixels 541 with each other) and bunches them together without including large electrodes at the interface between the first substrate 100 and the second substrate 200.

[Operation of Imaging Device 1]

Next, an operation of the imaging device 1 is described with reference to FIGS. 14 and 15. Each of FIGS. 14 and 15 adds arrows to FIG. 3. The arrows indicate the paths of the respective signals. FIG. 14 illustrates the paths of an input signal inputted to the imaging device 1 from the outside, a power supply electric potential, and a reference electric potential as arrows. FIG. 15 illustrates the signal path of a pixel signal outputted from the imaging device 1 to the outside as an arrow. For example, an input signal (e.g., a pixel clock and a synchronization signal) inputted to the imaging device 1 through the input unit 510A is transmitted to the row drive unit 520 of the third substrate 300 and the row drive unit 520 creates a row drive signal. This row drive signal is sent to the second substrate 200 through the contact sections 301 and 201. Further, this row drive signal reaches each of the pixel sharing units 539 of the pixel array unit 540 through the row drive signal line 542 in the wiring layer 200T. Drive signals other than the transfer gates TG among the row drive signals that have reached the pixel sharing units 539 of the second substrate 200 are inputted to the pixel circuit 210 and the respective transistors included in the pixel circuit 210 are driven. Drive signals of the transfer gates TG are inputted to the transfer gates TG1, TG2, TG3, and TG4 of the first substrate 100 through the through electrodes TGV and the pixels 541A, 541B, 541C, and 541D are driven (FIG. 14). In addition, a power supply electric potential and a reference electric potential supplied to the input unit 510A (input terminal 511) of the third substrate 300 from the outside of the imaging device 1 are sent to the second substrate 200 through the contact sections 301 and 201 and supplied to the pixel circuit 210 of each of the pixel sharing units 539 through a wiring line in the wiring layer 200T. The reference electric potential is further supplied to each of the pixels 541A, 541B, 541C, and 541D of the first substrate 100 through the through electrode 121E. Meanwhile, the pixel signal electrically converted by each of the pixels 541A, 541B, 541C, and 541D of the first substrate 100 is sent to the pixel circuit 210 of the second substrate 200 for each of the pixel sharing units 539 through the through electrode 120E. The pixel signal based on this pixel signal is sent to the third substrate 300 from the pixel circuit 210 through the vertical signal line 543 and the contact sections 202 and 302. This pixel signal is outputted to the outside through the output unit 510B after processed by the column signal processing unit 550 and the image signal processing unit 560 of the third substrate 300 (FIG. 15).

Effects

In the present embodiment, the pixels 541A, 541B, 541C, and 541D (pixel sharing unit 539) and the pixel circuit 210 are provided in different substrates (the first substrate 100 and the second substrate 200) from each other. This makes it possible to increase the area of the pixels 541A, 541B, 541C, and 541D and the pixel circuit 210 as compared with a case where the pixels 541A, 541B, 541C, and 541D and the pixel circuit 210 are formed in the same substrate. As a result, it is possible to increase the amount of pixel signals obtained through photoelectric conversion and reduce the transistor noise of the pixel circuit 210. These make it possible to improve the signal/noise ratio of pixel signals and allows the imaging device 1 to output more favorable pixel data (image information). In addition, it is possible to miniaturize the imaging device 1 (i.e., decrease the pixel size and make the imaging device 1 smaller in size). A decrease in pixel size allows the imaging device 1 to increase the number of pixels per unit area and output an image having high image quality.

In addition, in the imaging device 1, the first substrate 100 and the second substrate 200 are electrically coupled to (or connected with) each other by the through electrodes 120E and 121E provided in the insulating region 212. For example, a method of coupling (or connecting) the first substrate 100 and the second substrate 200 by bonding the pad electrodes and a method of coupling (or connecting) the first substrate 100 and the second substrate 200 by using a through wiring line (e.g., TSV (Thorough Si Via)) that penetrates the semiconductor layers may also be conceivable. Providing the insulating region 212 with the through electrodes 120E and 121E makes it possible to decrease the area necessary to couple (or connect) the first substrate 100 and the second substrate 200 as compared with such methods. This makes it possible to decrease the pixel size and make the imaging device 1 still smaller in size. In addition, each of the pixels has further smaller area. This makes it possible to further increase the resolution. In a case where there is no need to decrease the chip size, it is possible to increase the size of the formation regions of the pixels 541A, 541B, 541C, and 541D and the pixel circuit 210. As a result, it is possible to increase the amount of pixel signals obtained through photoelectric conversion and reduce the noise of a transistor included in the pixel circuit 210. This makes it possible to improve the signal/noise ratio of pixel signals and allows the imaging device 1 to output more favorable pixel data (image information).

In addition, in the imaging device 1, the pixel circuit 210 and the column signal processing unit 550 and the image signal processing unit 560 are provided in different substrates (the second substrate 200 and the third substrate 300) from each other. This makes it possible to increase the area of the pixel circuit 210 and the area of the column signal processing unit 550 and the image signal processing unit 560 as compared with a case where the pixel circuit 210 and the column signal processing unit 550 and the image signal processing unit 560 are formed in the same substrate. This makes it possible to reduce noise that is generated in the column signal processing unit 550 and mount the image signal processing unit 560 with a more advanced image processing circuit. It is thus possible to improve the signal/noise ratio of pixel signals and allows the imaging device 1 to output more favorable pixel data (image information).

In addition, in the imaging device 1, the pixel array unit 540 is provided in the first substrate 100 and the second substrate 200 and the column signal processing unit 550 and the image signal processing unit 560 are provided in the third substrate 300. In addition, the contact sections 201, 202, 301, and 302 that couple (or connect) the second substrate 200 and the third substrate 300 are formed above the pixel array unit 540. This allows the contact sections 201, 202, 301, and 302 to be freely laid out with no layout interference from a variety of wiring lines included in the pixel array. This makes it possible to use the contact sections 201, 202, 301, and 302 to electrically couple (or connect) the second substrate 200 and the third substrate 300. The use of the contact sections 201, 202, 301, and 302 increases, for example, a degree of layout freedom of the column signal processing unit 550 and the image signal processing unit 560. This makes it possible to reduce noise that is generated in the column signal processing unit 550 and mount the image signal processing unit 560 with a more advanced image processing circuit. It is thus possible to improve the signal/noise ratio of pixel signals and allows the imaging device 1 to output more favorable pixel data (image information).

In addition, in the imaging device 1, the pixel separation section 117 penetrates the semiconductor layer 100S. This makes it possible to suppress, even in a case where each of the pixels has smaller area and the adjacent pixels (the pixels 541A, 541B, 541C, and 541D) hereby have shorter distance, color mixture between the pixels 541A, 541B, 541C, and 541D. This makes it possible to improve the signal/noise ratio of pixel signals and allows the imaging device 1 to output more favorable pixel data (image information).

In addition, in the imaging device 1, the pixel circuit 210 is provided for each of the pixel sharing units 539. This makes it possible to increase the size of the formation regions of the transistors (the amplification transistor AMP, the reset transistor RST, the selection transistor SEL, and the FD conversion gain switching transistor FDG) included in the pixel circuit 210 as compared with a case where each of the pixels 541A, 541B, 541C, and 541D is provided with the pixel circuit 210. For example, increasing the size of the formation region of the amplification transistor AMP makes it possible to suppress noise. This makes it possible to improve the signal/noise ratio of pixel signals and allows the imaging device 1 to output more favorable pixel data (image information).

Further, in the imaging device 1, the first substrate 100 is provided with the pad section 120 that electrically couples (or connects) the floating diffusions FD (the floating diffusions FD1, FD2, FD3, and FD4) of the four pixels (the pixels 541A, 541B, 541C, and 541D). This makes it possible to decrease the number of through electrodes (through electrodes 120E) that couple (or connect) the first substrate 100 and the second substrate 200 as compared with a case where the pad section 120 like this is provided in the second substrate 200. It is thus possible to decrease the size of the insulating region 212 and the formation region (semiconductor layer 200S) of a transistor included in the secure pixel circuit 210 at sufficient size. This makes it possible to reduce the noise of the transistor included in the pixel circuit 210 and improve the signal/noise ratio of pixel signals, and allows the imaging device 1 to output more favorable pixel data (image information). Further, the number of through electrodes is decreased. This makes it possible to increase the degree of layout freedom. This also makes it possible to reduce, for example, parasitic capacitance.

Further, in the imaging device 1, a transistor such as the amplification transistor AMP included in the pixel circuit 210 includes a transistor having a three-dimensional structure. This makes it possible to increase the effective gate width while maintaining the footprint as compared with the effective gate width in a case where a planar transistor is used. It is thus possible to increase transistor performance (including the operation speed, the RN, and the like) without obstructing the miniaturization of a pixel. In addition, the increased gate area also makes it possible to reduce RTS noise. This makes it possible to suppress influence of noise on an image more effectively.

In addition, in the imaging device 1, the pore size of the coupling section (e.g., the coupling section 218V) provided in the wiring layer 200T of the second substrate 200 and the pore sizes of the through electrodes 120E, 121E, and TGV that reach the first substrate 100 from the second substrate 200 are different from each other. This makes it possible to increase the degree of layout freedom.

In addition, in the imaging device 1, the pad section 120 is provided across the pixel separation section 117. In addition, the pad section 120 is in contact with the plurality of floating diffusions FD. The coupling between each of the floating diffusions FD and the pad section 120 is three-dimensional coupling. This makes it possible to increase contact area between each of the floating diffusions FD and the pad section 120 as compared with the contact area in a case where each of the floating diffusions FD and the pad section 120 are coupled (or connected) on only the surfaces parallel to the light incidence surface of the imaging device 1. In addition, even in a case where the pixel 541 is miniaturized, it is possible to suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

In addition, in the imaging device 1, the portion of the pixel separation section 117 on the semiconductor layer 200S side sandwiched between the two floating diffusions FD adjacent to each other is provided at the position receding from the surface of the semiconductor layer 100S on the semiconductor layer 200S side. The side surfaces of the floating diffusions FD are in contact with the pad section 120. This makes it possible to increase contact area between each of the floating diffusions FD and the pad section 120 as compared with the contact area in a case where each of the floating diffusions FD and the pad section 120 are coupled (or connected) on only the surfaces parallel to the light incidence surface of the imaging device 1. In addition, even in a case where the pixel 541 is miniaturized, it is possible to suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

2. Modification Examples

The following describes modification examples of the imaging device 1 according to the embodiment described above. In the following modification examples, components common to those in the embodiment described above are denoted by same signs for description.

Modification Example A

In the embodiment described above, the pad section 120 may have a size enough to cover the four floating diffusions FD in a plan view, for example, as illustrated in FIGS. 16 and 17. The four floating diffusions FD share the pad section 120. In such a case, it is possible in a manufacturing process to suppress a failure in contact between the floating diffusions FD and the pad section 120 in a case where the pad section 120 is formed on the floating diffusions FD. As a result, it is possible to reliably increase the contact area between the floating diffusions FD and the pad section 120.

It is to be noted that a portion of the pad section 120 immediately above the transfer transistor TR (transfer gate TG) protrudes toward the second substrate 200 side in FIG. 17. This makes it difficult to provide the interlayer insulating film 123 with a planar upper surface. Accordingly, for example, as illustrated in FIG. 18, the pad section 120 may be formed to have a height at which the pad section 120 exceeds the upper surface of the transfer transistor TR (transfer gate TG).

Modification Example B

In the embodiment described above, the side surfaces of the floating diffusions FD may each have a tapered shape, for example, as illustrated in FIGS. 19 and 20. In this case, the pad section 120 is in contact with surfaces of tapered portions of the side surfaces of the floating diffusions FD. It is to be noted that FIG. 19 illustrates an example in which a portion of the upper surface of each of the floating diffusions FD has a surface parallel to the light incidence surface of the imaging device 1. In addition, FIG. 20 illustrates an example in which the surface parallel to the light incidence surface of the imaging device 1 does not remain (is absent) in the upper surface of each of the floating diffusions FD. This makes it possible to increase contact area between each of the floating diffusions FD and the pad section 120 as compared with the contact area in a case where each of the floating diffusions FD and the pad section 120 are coupled (or connected) on only the surfaces parallel to the light incidence surface of the imaging device 1. In addition, even in a case where the pixel 541 is miniaturized, it is possible to suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

Modification Example C In the embodiment described above, the side surfaces of the floating diffusions FD may each have a recessed shape, for example, as illustrated in FIGS. 21 and 22. In this case, the pad section 120 is in contact with surfaces of recessed portions of the side surfaces of the floating diffusions FD. It is to be noted that FIG. 21 illustrates an example in which a portion of the upper surface of each of the floating diffusions FD has a surface parallel to the light incidence surface of the imaging device 1. In addition, FIG. 22 illustrates an example in which the surface parallel to the light incidence surface of the imaging device 1 does not remain (is absent) in the upper surface of each of the floating diffusions FD. This makes it possible to increase contact area between each of the floating diffusions FD and the pad section 120 as compared with the contact area in a case where each of the floating diffusions FD and the pad section 120 are coupled (or connected) on only the surfaces parallel to the light incidence surface of the imaging device 1. In addition, even in a case where the pixel 541 is miniaturized, it is possible to suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

Modification Example D

In the embodiment described above, the side surfaces of the floating diffusions FD may each have a protruding shape, for example, as illustrated in FIGS. 23 and 24. In this case, the pad section 120 is in contact with surfaces of protruding portions of the side surfaces of the floating diffusions FD. It is to be noted that FIG. 23 illustrates an example in which a portion of the upper surface of each of the floating diffusions FD has a surface parallel to the light incidence surface of the imaging device 1. In addition, FIG. 24 illustrates an example in which the surface parallel to the light incidence surface of the imaging device 1 does not remain (is absent) in the upper surface of each of the floating diffusions FD. This makes it possible to increase contact area between each of the floating diffusions FD and the pad section 120 as compared with the contact area in a case where each of the floating diffusions FD and the pad section 120 are coupled (or connected) on only the surfaces parallel to the light incidence surface of the imaging device 1. In addition, even in a case where the pixel 541 is miniaturized, it is possible to suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

Modification Example E

In the embodiment described above, for example, as illustrated in FIG. 25, the lower end of the through electrode 120E may be buried in the pad section 120. The through electrode 120E electrically couples (or connects) the pad section 120 and the pixel circuit 210. In such a case, it is possible to reduce contact resistance between the through electrode 120E and the pad section 120. As a result, it is possible to suppress an increase in the resistance components of the transfer path of the signal charge. This makes it possible to suppress a restriction imposed to miniaturize the pixel 541 and further increase the degree of design freedom.

Modification Example F

In the embodiment described above, for example, as illustrated in FIG. 26, the passivation film 122 may be omitted and the pad section 120 may be in direct contact with the sidewall SW. In this case, it is preferable that the pad section 120 be formed not to have a height at which the pad section 120 exceeds the upper surface of the transfer transistor TR (transfer gate TG). In this case, it is possible to prevent the pad section 120 from coming into contact with the transfer gate TG.

Modification Example G

In the embodiment described above, the pixel separation section 117 may have a configuration other than the FTI structure. For example, the pixel separation section 117 does not have to be provided to completely penetrate the semiconductor layer 100S, but may have a so-called DTI (Deep Trench Isolation) structure.

Modification Example H

In any of the embodiment described above and the modification examples thereof, each of the floating diffusions FD has a square shape in a plan view and the transfer transistor TR (transfer gate TG) is provided around the floating diffusion FD. However, in any of the embodiment described above and the modification examples thereof, each of the floating diffusions FD may have a triangular shape in a plan view and the transfer transistor TR (transfer gate TG) may be provided around the floating diffusion FD, for example, as illustrated in FIGS. 27, 28, and 29.

It is to be noted that FIG. 27 illustrates an example in which the pad section 120 has a square shape in a plan view and is in contact with a portion of each of the floating diffusions FD1, FD2, FD3, and FD4. FIG. 28 illustrates an example in which the pad section 120 has a square shape in a plan view and the pad section 120 covers the whole of each of the floating diffusions FD1, FD2, FD3, and FD4 in a plan view. FIG. 29 illustrates an example in which the pad section portion 120 has a circular shape in a plan view and is in contact with a portion of each of the sidewalls SW. The shape of the pad section 120 is not limited to the above. The pad section 120 may have, for example, an oval shape, a triangular shape, a square shape, or a polygonal shape in a plan view.

Modification Example I

In any of the embodiment described above and the modification examples thereof, a portion of the side surface (the side surface closer to the pixel separation section 117) of each of the floating diffusions FD in the depth direction is in contact with a portion of the pad section 120 to achieve the three-dimensional coupling described above. However, in any of the embodiment described above and the modification examples thereof, a whole of the side surface (the side surface closer to the pixel separation section 117) of each of the floating diffusions FD in the depth direction may be in contact with a portion of the pad section 120 to achieve the three-dimensional coupling described above. In this case, for example, the upper surface of the upper end of the pixel separation section 117 may be formed at the same depth as that of a bottom surface of each of the floating diffusions FD. Alternatively, the upper surface of the upper end of the pixel separation section 117 may be formed deeper than the bottom surface of each of the floating diffusions FD.

For example, it is assumed that the semiconductor layer 100S is dug in the thickness direction (the direction vertical to the principal surface of the first substrate 100) as illustrated in FIG. 30. A bottom surface of the dug portion serves as the upper surface of the upper end of the pixel separation section 117. In this case, the upper surface of the upper end of the pixel separation section 117 may be formed at substantially the same depth as that of the bottom surface of each of the floating diffusions FD. The dug portion may be filled with a portion of the pad section 120. In such a case, the whole of the side surface of the floating diffusion FD closer to the pixel separation section 117 is in contact with the pad section 120. This makes it possible to further increase the contact area between each of the floating diffusions FD and the pad section 120. In addition, even in a case where the pixel 541 is miniaturized, it is possible to further suppress a decrease in the coupling area between the pad section 120 and the floating diffusions FD. It is thus possible to suppress an increase in the resistance components of the transfer path of the signal charge. This makes it possible to suppress a restriction imposed to miniaturize the pixel 541 and further increase the degree of design freedom.

14. Application Example

FIG. 31 illustrates an example of a schematic configuration of an imaging system 7 including the imaging device 1 according to any of the embodiment described above and the modification examples thereof.

The imaging system 7 is, for example, an electronic apparatus including an imaging device such as a digital still camera or a video camera, a mobile terminal device such as a smartphone or a tablet terminal, or the like. The imaging system 7 includes, for example, the imaging device 1 according to any of the embodiment described above and the modification examples thereof, a DSP circuit 243, a frame memory 244, a display unit 245, a storage unit 246, an operation unit 247, and a power supply unit 248. In the imaging system 7, the imaging device 1 according to any of the embodiment described above and the modification examples thereof, the DSP circuit 243, the frame memory 244, the display unit 245, the storage unit 246, the operation unit 247, and the power supply unit 248 are coupled to (or connected with) each other through a bus line 249.

The imaging device 1 according to any of the embodiment described above and the modification examples thereof outputs image data corresponding to incident light. The DSP circuit 243 is a signal processing circuit that processes a signal (image data) outputted from the imaging device 1 according to any of the embodiment described above and the modification examples thereof. The frame memory 244 temporarily holds the image data processed by the DSP circuit 243 in units of frames. The display unit 245 includes, for example, a panel-type display such as a liquid crystal panel or an organic EL (Electro Luminescence) panel and displays a moving image or a still image captured by the imaging device 1 according to any of the embodiment described above and the modification examples thereof. The storage unit 246 records the image data of a moving image or a still image captured by the imaging device 1 according to any of the embodiment described above and the modification examples thereof in a recording medium such as a semiconductor memory or a hard disk. The operation unit 247 issues an operation instruction for the various functions of the imaging system 7 in accordance with an operation by a user. The power supply unit 248 appropriately supplies various kinds of power for operation to the imaging device 1 according to any of the embodiment described above and the modification examples thereof, the DSP circuit 243, the frame memory 244, the display unit 245, the storage unit 246, and the operation unit 247 that are supply targets.

Next, an imaging procedure in the imaging system 7 is described.

FIG. 32 illustrates an example of a flowchart of an imaging operation in the imaging system 7. A user issues an instruction to start imaging by operating the operation unit 247 (step S101). The operation unit 247 then transmits an imaging instruction to the imaging device 1 (step S102). The imaging device 1 executes imaging in a predetermined imaging scheme upon receiving the imaging instruction (step S103).

The imaging device 1 outputs image data offered by the imaging to the DSP circuit 243. Here, the image data refers to data for all of the pixels of pixel signals generated on the basis of the electric charge temporarily held in the floating diffusion FD. The DSP circuit 243 performs predetermined signal processing (e.g., a noise reduction process or the like) on the basis of the image data inputted from the imaging device 1 (step S104). The DSP circuit 243 causes the frame memory 244 to hold the image data subjected to the predetermined signal processing and the frame memory 244 causes the storage unit 246 to store the image data (step S105). In this way, the imaging in the imaging system 7 is performed.

In the present application example, the imaging device 1 according to any of the embodiment described above and the modification examples thereof is applied to the imaging system 7. This allows the imaging device 1 to be smaller in size or higher in definition. This makes it possible to provide the small or high-definition imaging system 7.

10. Practical Application Examples

Practical Application Example 1

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 33 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 33, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (UF) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 33, an audio speaker 12061, a display section 12062, and an instrument panel 12063 are illustrated as the output device. The display section 12062 may, for example, include at least one of an on-board display and a head-up display.

FIG. 34 is a diagram depicting an example of the installation position of the imaging section 12031.

In FIG. 34, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 34 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the mobile body control system to which the technology according to the present disclosure may be applied. The technology according to the present disclosure may be applied to the imaging section 12031 among the components described above. Specifically, the imaging device 1 according to any of the embodiment described above and the modification examples thereof is applicable to the imaging section 12031. The application of the technology according to the present disclosure to the imaging section 12031 makes it possible to obtain a high-definition shot image with less noise and it is thus possible to perform highly accurate control using the shot image in the mobile body control system.

Practical Application Example 2

FIG. 35 is a view depicting an example of a schematic configuration of an endoscopic surgery system to which the technology according to an embodiment of the present disclosure (present technology) can be applied.

In FIG. 35, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

FIG. 36 is a block diagram depicting an example of a functional configuration of the camera head 11102 and the CCU 11201 depicted in FIG. 35.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

The above has described the example of the endoscopic surgery system to which the technology according to the present disclosure may be applied. The technology according to the present disclosure may be favorably applied to the image pickup unit 11402 provided to the camera head 11102 of the endoscope 11100 among the components described above. The application of the technology according to the present disclosure to the image pickup unit 11402 allows the image pickup unit 11402 to be smaller in size or higher in definition and it is thus possible to provide the small or high-definition endoscope 11100.

Although the present disclosure has been described above with reference to the embodiment, the modification examples thereof, the application example thereof, and the practical application examples thereof, the present disclosure is not limited to the embodiment and the like described above. A variety of modifications are possible. It is to be noted that the effects described herein are merely illustrative. The effects according to the present disclosure are not limited to the effects described herein. The present disclosure may have effects other than the effects described herein.

In addition, the present disclosure may also have, for example, the following configurations.

(1)

A solid-state imaging device including:

a first semiconductor layer including a photoelectric conversion section and an electric charge accumulation section for each of pixels, the electric charge accumulation section accumulating signal charge generated in the photoelectric conversion section;

a pixel separation section that is provided in the first semiconductor layer, the pixel separation section partitioning a plurality of the pixels from each other;

a second semiconductor layer that is provided with a pixel transistor and stacked on the first semiconductor layer, the pixel transistor reading out the signal charge of the electric charge accumulation section; and a shared coupling section that is provided between the second semiconductor layer and the first semiconductor layer and provided across the pixel separation section, the shared coupling section being in contact with a plurality of the electric charge accumulation sections, in which coupling between each of the electric charge accumulation sections and the shared coupling section includes three-dimensional coupling.

(2)

The solid-state imaging device according to (1), in which the coupling between each of the electric charge accumulation sections and the shared coupling section is performed in a coupling form including a form in which coupling is not performed by using only planar surfaces parallel to a light incidence surface of the solid-state imaging device, but coupling is performed by using planar surfaces or curved surfaces crossing the light incidence surface.

(3)

The solid-state imaging device according to (1) or (2), in which
- a portion of the pixel separation section on the second semiconductor layer side is provided at a position receding from a surface of the first semiconductor layer on the second semiconductor layer side, the portion of the pixel separation section being sandwiched between the two electric charge accumulation sections adjacent each other, and
- a side surface of each of the electric charge accumulation sections is in contact with the shared coupling section.

(4)

The solid-state imaging device according to (3), in which a whole of the side surface of the electric charge accumulation section closer to the pixel separation section is in contact with the shared coupling section.

(5)

The solid-state imaging device according to (3), in which the side surface of the electric charge accumulation section includes a tapered shape, a recessed shape, or a protruding shape.

(6)

The solid-state imaging device according to any one of (1) to (5), further including:
- a first substrate including the first semiconductor layer and a first wiring layer, the first wiring layer being provided with the shared coupling section;
- a second substrate including the second semiconductor layer and a second wiring layer, the second wiring layer being opposed to the first substrate with the second semiconductor layer interposed in between; and
- a third substrate that is opposed to the first substrate with the second substrate interposed in between, the third substrate including a circuit that is electrically coupled to the second semiconductor layer.

(7)

The solid-state imaging device according to (6), further including a through electrode that electrically couples the shared coupling section and the pixel transistor, the through electrode being provided in the first substrate and the second substrate.

(8)

The solid-state imaging device according to any one of (1) to (7), in which the shared coupling section has a size enough to cover a plurality of electric charge accumulation sections in a plan view, the plurality of electric charge accumulation sections sharing the shared coupling section.

(9)

The solid-state imaging device according to any one of (1) to (8), in which the shared coupling section includes polysilicon.

In a solid-state imaging device according to an embodiment of the present disclosure, a shared coupling section is provided across a pixel separation section. In addition, the shared coupling section is in contact with a plurality of electric charge accumulation sections. Coupling between each of the electric charge accumulation sections and the shared coupling section includes three-dimensional coupling. This makes it possible to increase contact area between each of the electric charge accumulation sections and the shared coupling section as compared with the contact area in a case where each of the electric charge accumulation sections and the shared coupling section have planar coupling. In addition, even in a case where a pixel is miniaturized, it is possible to suppress a decrease in coupling area between the shared coupling section and the electric charge accumulation sections. It is thus possible to suppress an increase in resistance components of a transfer path of signal charge. This makes it possible to suppress a restriction imposed to miniaturize the pixel and further increase a degree of design freedom.

This application claims the priority on the basis of Japanese Patent Application No. 2020-217951 filed with Japan Patent Office on Dec. 25, 2020, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A solid-state imaging device, comprising:
   a first semiconductor layer including, for each pixel of a plurality of pixels:
   a photoelectric conversion section; and
   an electric charge accumulation section, wherein
   the photoelectric conversion section is configured to generate signal charge, and
   the electric charge accumulation section is configured to accumulate the generated signal charge;
   a pixel separation section in the first semiconductor layer, wherein
   the pixel separation section is configured to partition a first pixel of the plurality of pixels from a second pixel of the plurality of pixels;
   a second semiconductor layer with a pixel transistor, wherein
   the second semiconductor layer is on a second semiconductor layer side of the first semiconductor layer,
   a portion of the pixel separation section on the second semiconductor layer side is at a position receding from a surface of the first semiconductor layer on the second semiconductor layer side, and
   the pixel transistor is configured to read out the signal charge of the electric charge accumulation section; and
   a shared coupling section between the second semiconductor layer and the first semiconductor layer, wherein
   the shared coupling section is across the pixel separation section,
   the shared coupling section is in contact with a plurality of electric charge accumulation sections,
   the plurality of electric charge accumulation sections include the electric charge accumulation section,
   a coupling between each of the plurality of electric charge accumulation sections and the shared coupling section is a three-dimensional coupling,
   the portion of the pixel separation section is between two electric charge accumulation sections of the plurality of electric charge accumulation sections,
   a first electric charge accumulation section of the two electric charge accumulation sections is adjacent to a second electric charge accumulation section of the two electric charge accumulation sections, and
   a side surface of each of the plurality of electric charge accumulation sections is in contact with the shared coupling section.

2. The solid-state imaging device according to claim 1, wherein
   a coupling form couples each of the plurality of electric charge accumulation sections and the shared coupling section, and the coupling form includes a form in which the coupling is not performed by use of only planar surfaces parallel to a light incidence surface of the solid-state imaging device, and the coupling is performed by use of planar surfaces crossing the light incidence surface or curved surfaces crossing the light incidence surface.

3. The solid-state imaging device according to claim 1, wherein
a whole of a side surface of a specific electric charge accumulation section, of the plurality of electric charge accumulation sections, is in contact with the shared coupling section.

4. The solid-state imaging device according to claim 1, wherein the side surface of the electric charge accumulation section includes one of a tapered shape, a recessed shape, or a protruding shape.

5. The solid-state imaging device according to claim 1, further comprising:
a first substrate including the first semiconductor layer and a first wiring layer, wherein
the first wiring layer is with the shared coupling section;
a second substrate including the second semiconductor layer and a second wiring layer, wherein
the second wiring layer is opposed to the first substrate with the second semiconductor layer interposed in between; and
a third substrate that is opposed to the first substrate with the second substrate interposed in between, wherein
the third substrate includes a circuit that is electrically coupled to the second semiconductor layer.

6. The solid-state imaging device according to claim 5, further comprising a through electrode configured to electrically couple the shared coupling section and the pixel transistor, wherein
the through electrode is in the first substrate and the second substrate.

7. The solid-state imaging device according to claim 1, wherein
the shared coupling section has a size to cover the plurality of electric charge accumulation sections in a plan view, and
the plurality of electric charge accumulation sections is configured to share the shared coupling section.

8. The solid-state imaging device according to claim 1, wherein the shared coupling section includes polysilicon.

* * * * *